US008951084B2

(12) United States Patent
Kwon et al.

(10) Patent No.: US 8,951,084 B2
(45) Date of Patent: Feb. 10, 2015

(54) METHOD OF FABRICATING LIGHTWEIGHT AND THIN LIQUID CRYSTAL DISPLAY, AND PROCESSING LINE FOR FABRICATING LIQUID CRYSTAL DISPLAY

(71) Applicant: LG Display Co., Ltd., Seoul (KR)

(72) Inventors: KiHyun Kwon, Pohang (KR);
YeongGeun Hwang, Gumi (KR);
JaeYoung Oh, Goyang (KR);
SangYoung Lee, Paju (KR);
ByeongKeun Kim, Ulsan (KR);
JinKyoung Kim, Chilgok-Gun (KR);
GiSang Hong, Paju (KR); EunJin Bae,
Daegu (KR)

(73) Assignee: LG Display Co., Ltd., Seoul (KR)

( * ) Notice: Subject to any disclaimer, the term of this patent is extended or adjusted under 35 U.S.C. 154(b) by 221 days.

(21) Appl. No.: 13/728,460

(22) Filed: Dec. 27, 2012

(65) Prior Publication Data

US 2013/0316609 A1    Nov. 28, 2013

(30) Foreign Application Priority Data

May 23, 2012  (KR) .................. 10-2012-0055028
Jun. 1, 2012   (KR) .................. 10-2012-0059409

(51) Int. Cl.
*G02F 1/1333* (2006.01)
*G02F 1/1341* (2006.01)

(52) U.S. Cl.
CPC ............ *G02F 1/1333* (2013.01); *G02F 1/1341* (2013.01); *G02F 2001/13415* (2013.01)
USPC ............................. 445/24; 349/153; 349/187

(58) Field of Classification Search
CPC .................. G02F 1/1333; G02F 2001/13415; G02F 1/1341
USPC ........................ 445/24–25; 349/69, 153, 187
See application file for complete search history.

(56) References Cited

U.S. PATENT DOCUMENTS

| 2002/0063834 | A1* | 5/2002 | Sawasaki et al. | 349/130 |
| 2003/0038914 | A1* | 2/2003 | Kim et al. | 349/153 |
| 2007/0164956 | A1* | 7/2007 | Araki et al. | 345/90 |
| 2007/0258025 | A1* | 11/2007 | Sawasaki et al. | 349/106 |

* cited by examiner

*Primary Examiner* — Elmito Breval
(74) *Attorney, Agent, or Firm* — Brinks Gilson & Lione

(57) ABSTRACT

In a method of fabricating a lightweight and thin liquid crystal display (LCD), when an auxiliary substrate is used to perform a process of a thin glass substrate, the auxiliary substrate is separated from the thin glass substrate by detaching an edge portion between the thin glass substrate and the auxiliary substrate using a knife and then injecting air into the edge portion using an air knife, so that the auxiliary substrate can be easily separated from a liquid crystal panel in a cell state, which is attached by completing the process. Further, it is possible to optimize the shape of a push pin for forming a point at which the detachment of the edge portion is started.

57 Claims, 41 Drawing Sheets

METHOD OF FABRICATING LIGHTWEIGHT AND THIN LIQUID CRYSTAL DISPLAY, AND PROCESSING LINE FOR FABRICATING LIQUID CRYSTAL DISPLAY

The present disclosure relates to subject matter contained in priority Korean Applications No. 10-2012-0055028, filed on May 23, 2012, and No. 10-2012-0059409, filed on Jun. 1, 2012, which are herein expressly incorporated by reference in its entirety.

BACKGROUND OF THE INVENTION

1. Field of the Invention

The present disclosure relates to a method of fabricating a liquid crystal display, and a processing line for fabricating a liquid crystal display. Particularly, the present disclosure relates to a method of fabricating a lightweight and thin liquid crystal display, and a processing line for fabricating a liquid crystal display.

2. Description of the Conventional Art

Recently, with the advent of information age, display fields for processing and displaying a large amount of information have been rapidly developed. Particularly, thin film transistor (TFT) liquid crystal displays (LCDs) having lightweight, thin and low-power characteristics have been developed as substitutes for existing cathode ray tubes (CRTs).

An LCD generally includes a color filter substrate, an array substrate, and a liquid crystal layer formed between the color filter substrate and the array substrate.

The color filter substrate includes a color filter configured with red (R), green (G) and blue (B) sub-color filters, a black matrix for dividing between the sub-color filters and blocking light passing through the liquid crystal layer, and a transparent common electrode for applying a voltage to the liquid crystal layer.

Gate lines and data lines arranged vertically and horizontally to defined pixel regions are formed on the array substrate. In this case, TFTs as switching elements are formed in intersection regions of the gate and data lines, and a pixel electrode is formed in each pixel region.

The color filter and array substrates configured as described above are attached together to face each other by a sealant formed along an outline of an image display region, thereby constituting a liquid crystal panel. The attachment of the color filter substrate and the array substrate is made through attachment keys formed on the color filter substrate or the array substrate.

Since the LCD is frequently used particularly for portable electronic devices, the size and weight of the LCD should be decreased to improve portability of the electronic devices. Moreover, as large-area LCDs have been fabricated in recent years, requirements of lightweight and thin LCDs are further increased.

Various methods can be used to decrease the thickness or weight of the LCD, but there is a limitation in reducing the number of essential components of the LCD due to its structure or current technology. Moreover, since the essential components have small weights, it is very difficult to decrease the thickness or weight of the LCD by decreasing the weights of the essential components.

Accordingly, studies have been actively conducted to develop a method for decreasing the thickness or weight of an LCD by decreasing the thicknesses of color filter and array substrates constituting the LCD. However, since a thin substrate should be used as the color filter or array substrate, the substrate may be warped or broken when the substrate is moved between a plurality of unit processes or when a unit process is performed on the substrate.

SUMMARY OF THE INVENTION

Therefore, an aspect of the detailed description is to provide a method of fabricating a lightweight and thin LCD and a processing line for fabricating an LCD, which can prevent breakdown of a thin glass substrate by performing a process of attaching an auxiliary substrate to the thin glass substrate.

Another aspect of the detailed description is to provide a method of fabricating a lightweight and thin LCD and a processing line for fabricating an LCD, which can easily separate an auxiliary substrate from a liquid crystal panel in a cell state, which is attached through an attachment process.

Still another aspect of the detailed description is to provide a method of fabricating a lightweight and thin LCD and a processing line for fabricating an LCD, which can optimize the shape of a push pin for forming a point at which the detachment of an edge portion of an auxiliary substrate is started in the separation of the auxiliary substrate.

Still another aspect of the detailed description is to provide a method of fabricating a lightweight and thin LCD and a processing line for fabricating an LCD, which can eliminate a failure caused by a foreign matter attached during a process in the separation of an auxiliary substrate.

To achieve these and other advantages and in accordance with the purpose of this specification, as embodied and broadly described herein, a method of fabricating a lightweight and thin LCD includes: providing first and second auxiliary substrates and first and second thin mother substrates; respectively attaching the first and second auxiliary substrates to the first and second thin mother substrates; performing an array process on the first thin mother substrate having the first auxiliary substrate attached thereto; performing a color filter process on the second thin mother substrate having the second auxiliary substrate attached thereto; attaching together the first thin mother substrate on which the array process is performed and the second thin mother substrate on which the color filter process is performed; providing a detaching apparatus having a table; loading the attached first and second substrates onto the table; detaching an edge portion between the second auxiliary substrate and the second thin mother substrate, using first and second knives; separating the second auxiliary substrate from the attached first and second thin mother substrates; vertically reversing the first and second thin mother substrates having the second auxiliary substrate separated therefrom; detaching an edge portion between the first auxiliary substrate and the first thin mother substrate, using the first and second knives; and separating the first auxiliary substrate from the attached first and second thin mother substrates.

In one exemplary embodiment, the method may further including forming corner cuts by cutting corners of the first and second auxiliary substrates and the first and second thin mother substrates at an inclined angle, after providing the first and second auxiliary substrates and the first and second thin mother substrates.

In one exemplary embodiment, as at least two corners of the first and second thin mother substrates are cut further inward than those of the first and second auxiliary substrates, corner portions of the first and second auxiliary substrates may be exposed, thereby forming push pin regions.

In one exemplary embodiment, the method may further include forming a knife entry space between the second auxiliary substrate and the second thin mother substrate by upwardly pressing the push pin region with a predetermined pressure, using a push pin, after loading the attached first and second thin mother substrates onto the table.

In one exemplary embodiment, the edge portion between the second auxiliary substrate and the second thin mother substrate may be detached by entering the first and second knives into the knife entry space between the second auxiliary substrate and the second thin mother substrate, and moving the first and second knives from one direction to the other direction of the table.

In one exemplary embodiment, the detaching apparatus may have a plurality of vacuum pads and a vacuum pad plate that vertically moves the plurality of vacuum pads.

In one exemplary embodiment, the method may further include attaching the plurality of vacuum pads to a surface of the second auxiliary substrate, after detaching the edge portion between the second auxiliary substrate and the second thin mother substrate.

In one exemplary embodiment, an air knife entry space may be formed between the second auxiliary substrate and the second thin mother substrate by ascending the vacuum pads or the vacuum pad plate.

In one exemplary embodiment, the second auxiliary substrate may be separated from the attached first and second thin mother substrates by spraying air while entering an air knife into the air knife entry space between the second auxiliary substrate and the second thin mother substrate.

In one exemplary embodiment, the method may further include forming a knife entry space between the first auxiliary substrate and the first thin mother substrate by upwardly pressing the push pin region with a predetermined pressure, using a push pin, after reversing the first and second thin mother substrates having the second auxiliary substrate separated therefrom.

In one exemplary embodiment, the edge portion between the first auxiliary substrate and the first thin mother substrate may be detached by entering the first and second knives into the knife entry space between the first auxiliary substrate and the first thin mother substrate, and moving the first and second knives from one direction to the other direction of the table.

In one exemplary embodiment, air may be sprayed through air holes provided in the first and second knives while the first and second knives are moving.

In one exemplary embodiment, the method may further include attaching the plurality of vacuum pads to a surface of the first auxiliary substrate, after detaching the edge portion between the first auxiliary substrate and the first thin mother substrate.

In one exemplary embodiment, an air knife entry space may be formed between the first auxiliary substrate and the first thin mother substrate by ascending the vacuum pads or the vacuum pad plate.

In one exemplary embodiment, the first auxiliary substrate may be separated from the attached first and second thin mother substrates by spraying air while entering the air knife into the air knife entry space between the first auxiliary substrate and the first thin mother substrate.

In one exemplary embodiment, when the first and second knives are mounted at one end of the table, one edge portion between the second auxiliary substrate and the second thin mother substrate or one edge portion between the first auxiliary substrate and the first thin mother substrate may be detached by moving one of the first and second knives in the longitudinal direction of the table, and the moved one of the first and second knives may return to an original position.

In one exemplary embodiment, upper and lower edge portions between the second auxiliary substrate and the second thin mother substrate or upper and lower edge portions between the first auxiliary substrate and the first thin mother substrate may be detached by moving the first and second knives in the lateral direction of the table, and the moved first and second knives may return to original positions, respectively.

In one exemplary embodiment, when two pairs of first and second knives are respectively mounted at front and rear ends of the table, left and right edge portions between the second auxiliary substrate and the second thin mother substrate or left and right edge portions between the first auxiliary substrate and the first thin mother substrate may be detached by moving one of the first and second knives at each of the front and rear ends in the longitudinal direction of the table, and the moved one of the first and second knives at each of the front and rear ends may return to an original position.

In one exemplary embodiment, upper and lower edge portions between the second auxiliary substrate and the second thin mother substrate or upper and lower edge portions between the first auxiliary substrate and the first thin mother substrate may be detached by the first and second knives at each of the front and rear ends by half in the lateral direction of the table, and the moved first and second knives at each of the front and rear ends may return to original positions, respectively.

In one exemplary embodiment, the contact surface of the push pin contacting the push pin region may have a triangular shape, a combined shape of a circle and a triangle, a rectangular shape or a circular shape.

In one exemplary embodiment, the method may further include, after forming the push pin region, recognizing ends of the first and second auxiliary substrates through an observation apparatus such as a charge-coupled device (CCD) camera; and aligning a push pin at a position set by moving the push pin in the directions of x and y axes, in consideration of the positions of the recognized ends of the first and second auxiliary substrates.

In one exemplary embodiment, the method may further include, after forming the push pin region, recognizing ends of the first and second auxiliary substrates through an observation apparatus such as a CCD camera; and aligning a push pin at a position set by moving the push pin in the directions of −x and −y axes, in consideration of the positions of the recognized ends of the first and second auxiliary substrates.

In one exemplary embodiment, after a push pin is aligned by recognizing ends of the first and second thin mother substrates or the first and second auxiliary substrates, the edge portion between the second auxiliary substrate and the second thin mother substrate or between the first auxiliary substrate and the first thin mother substrate may be detached by moving the aligned push pin in the direction of z axis.

In one exemplary embodiment, after a push pin is aligned by recognizing ends of the first and second thin mother substrates or the first and second auxiliary substrates, the edge portion between the second auxiliary substrate and the second thin mother substrate or between the first auxiliary substrate and the first thin mother substrate may be detached by alternately moving the aligned push pin in the directions of z and −z axes.

In one exemplary embodiment, after a push pin is aligned by recognizing ends of the first and second thin mother substrates or the first and second auxiliary substrates, the edge portion between the second auxiliary substrate and the second thin mother substrate or between the first auxiliary substrate and the first thin mother substrate may be detached by alternately moving the aligned push pin in the directions of z and −z axes, and sequentially increasing a moving distance.

In one exemplary embodiment, a foreign matter existing between the second auxiliary substrate and the second thin mother substrate may be removed, and simultaneously, the edge portion between the second auxiliary substrate and the second thin mother substrate may be detached, by entering a thin film, instead of the first and second knives, into a corner space between the second auxiliary substrate and the second thin mother substrate and moving the thin film from one direction to the other direction of the table.

In one exemplary embodiment, a foreign matter existing between the first auxiliary substrate and the first thin mother substrate may be removed, and simultaneously, the edge portion between the first auxiliary substrate and the first thin mother substrate may be detached, by entering a thin film, instead of the first and second knives, into a corner space between the first auxiliary substrate and the first thin mother substrate and moving the thin film from one direction to the other direction of the table.

In one exemplary embodiment, the process of removing the foreign matter and detaching the edge portion may be performed by spraying air through air holes provided in the thin film while the thin film is moving.

In one exemplary embodiment, the separation of the second or first auxiliary substrate may be performed using the thin film and air spray.

In one exemplary embodiment, after the adhesive force of the existing foreign matter is weakened by spraying a cooling material onto a front surface of the second or first auxiliary substrate or a side surface between the second auxiliary substrate and the second thin mother substrate or between the first auxiliary substrate and the first thin mother substrate, the separation of the second or first auxiliary substrate may be performed using the thin film and air spray, instead of the first and second knives.

In one exemplary embodiment, after the adhesive force of the existing foreign matter is weakened by spraying a cooling material onto a front surface of the second or first auxiliary substrate or a side surface between the second auxiliary substrate and the second thin mother substrate or between the first auxiliary substrate and the first thin mother substrate and simultaneously applying heat to its lower portion, the separation of the second or first auxiliary substrate may be performed using the thin film and air spray, instead of the first and second knives.

In one exemplary embodiment, heat corresponding to a temperature ranging from normal temperature to 80° C. may be applied to the lower portion including the first and second thin mother substrates.

In one exemplary embodiment, the foreign matter may be physically removed by moving the first and second knives into a space between the second auxiliary substrate and the second thin mother substrate or between the first auxiliary substrate and the first thin mother substrate along the direction in which the detachment of the edge portion is performed.

In one exemplary embodiment, the method may further include sensing pressure using a sensor when the vacuum pads or the vacuum pad plate is ascended in the process of separating the second or first auxiliary substrate.

In one exemplary embodiment, the method may further include deciding whether the pressure sensed by the sensor is abnormal, and when the pressure is abnormal, displaying an alarm that a foreign matter has been generated and occurrence of the foreign matter on a monitor or the like.

In one exemplary embodiment, when a foreign matter is generated, the foreign matter at the portion, where the pressure is abnormal, may be removed using laser, and the separation process of the second or first auxiliary substrate may be then continued.

In one exemplary embodiment, the method may further include inspecting a foreign matter along edges of the second auxiliary substrate and the second thin mother substrate or edges of the first auxiliary substrate and the first thin mother substrate.

In one exemplary embodiment, the method may further include, when a foreign matter is generated, displaying an alarm that a foreign matter has been generated and occurrence of the foreign matter on a monitor or the like.

In one exemplary embodiment, a foreign matter at the portion, where the foreign matter is detected, may be removed using laser, and the process of inspecting and removing the foreign matter may be performed on all the edges of the second auxiliary substrate and the second thin mother substrate or all the edges of the first auxiliary substrate and the first thin mother substrate.

In one exemplary embodiment, after the process of removing the foreign matter is completed, the separation process of the second or first auxiliary substrate may be performed.

To achieve these and other advantages and in accordance with the purpose of this specification, as embodied and broadly described herein, a processing line for fabricating an LCD includes: an attachment line for first and second auxiliary substrates, configured to respectively attach first and second auxiliary substrates to first and second thin mother substrates; a processing line for first and second thin mother substrates, configured to respectively perform an array process and a color filter process on the first and second thin mother substrates having the first and second auxiliary substrates attached thereto; an attachment line for first and second thin mother substrates configured to attach together the first and second thin mother substrates on which the array and the color filter process are performed, respectively, to face each other; a detachment line for first and second auxiliary substrates, configured to detach the first and second auxiliary substrates from the attached first and second substrates (hereinafter, referred to as a liquid crystal panel); and a test line for first and second auxiliary substrates and liquid crystal panel, configured to test the detached first and second auxiliary substrates and the liquid crystal panel, wherein the detachment line is configured with an in-line.

In one exemplary embodiment, the detachment line may include at least one loader configured to load the liquid crystal panel; at least one first detacher configured to detach the first auxiliary substrate from the liquid crystal panel loaded by the loader; a reverser configured to vertically reverse the liquid crystal panel having the first auxiliary substrate detached therefrom; at least one second detacher configured to detach the second auxiliary substrate from the reversed liquid crystal panel; a first unloader configured to unload the first and second auxiliary substrates respectively detached by the first and second detachers; and a second unloader configured to unload the liquid crystal panel having the first and second auxiliary substrates detached therefrom.

In one exemplary embodiment, the detachment line may further include a buffer that arbitrarily keeps the first and second auxiliary substrates respectively detached by the first and second detachers before being unloaded by the first unloader.

In one exemplary embodiment, a transport means such as a conveyor belt may be provided inside the detachment line so that a corresponding process is performed by a processing apparatus while the loaded liquid crystal panel and the loaded first and second auxiliary substrates are moved by the transport means.

In one exemplary embodiment, the processing line may further include a first robot provided between the loader and the first detacher so as to transfer the liquid crystal panel loaded by the loader to the first detacher while moving between the loader and the first detacher.

In one exemplary embodiment, the processing line may further include a second robot provided among the first detacher, the second detacher and the reverser so as to transfer the liquid crystal panel and the first and second auxiliary substrates, of which processes are finished in each processing apparatus, to a subsequent process while moving among the first detacher, the second detacher and the reverser.

In one exemplary embodiment, the processing line may further include a third robot configured to transfer the first and second auxiliary substrates and the liquid crystal panel, respectively unloaded by the first and second unloaders, to the test line.

In one exemplary embodiment, the test line may further include first and second cassettes configured to respectively keep the first and second auxiliary substrates and the liquid crystal panel transferred through the third robot; and first and second testers configured to respectively test the first and second auxiliary substrates and the liquid crystal panel, kept in the first and second cassettes.

In one exemplary embodiment, the processing line may further include a washing line for first and second auxiliary substrates, provided between the detachment line and the test line so as to wash the detached first and second auxiliary substrates.

In one exemplary embodiment, the detachment line may further include at least one loader configured to load the liquid crystal panel; at least one first detacher configured to detach the first auxiliary substrate from the liquid crystal panel loaded by the loader; a reverser configured to vertically reverse the liquid crystal panel having the first auxiliary substrate detached therefrom; at least one second detacher configured to detach the second auxiliary substrate from the reversed liquid crystal panel; and an unloader configured to unload the liquid crystal panel having the first and second auxiliary substrates detached therefrom.

In one exemplary embodiment, the detachment line may further include a buffer that arbitrarily keeps a liquid crystal panel having the first auxiliary substrate detached therefrom and a liquid crystal panel having the first and second auxiliary substrates detached therefrom before the liquid crystal panels are respectively transferred to the first and second detachers and the washing line.

In one exemplary embodiment, a transport means such as a conveyor belt may be provided inside the detachment line so that a corresponding process is performed by a processing apparatus while the loaded liquid crystal panel and the loaded first and second auxiliary substrates are moved by the transport means.

In one exemplary embodiment, the washing line may further include a first tester configured to inspect whether a foreign matter remains on the detached first and second auxiliary substrates; and at least one washer configured to remove a foreign matter when the foreign matter remains.

In one exemplary embodiment, the processing line may further include a first robot provided between the loader and the first and second detachers so as to transfer the liquid crystal panel loaded by the loader to the first and second detachers while moving between the loader and the first and second detachers.

In one exemplary embodiment, the processing line may further include a second robot provided among the first detacher, the second detacher, the reverser and the unloader so as to transfer the liquid crystal panel and the first and second auxiliary substrates, of which processes are finished in each processing apparatus, to a subsequent process while moving among the first detacher, the second detacher, the reverser and the unloader.

In one exemplary embodiment, the test line may further include first and second cassettes configured to respectively keep the first and second auxiliary substrates and the liquid crystal panel, transferred through a third robot; and second and third testers configured to respectively test the first and second auxiliary substrates and the liquid crystal panel, kept in the first and second cassettes.

In one exemplary embodiment, the test line may further include first and second cassettes configured to respectively keep the first and second auxiliary substrates and the liquid crystal panel, transferred through third and fourth robots; and second and third testers configured to respectively test the first and second auxiliary substrates and the liquid crystal panel, kept in the first and second cassettes.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated.

Recently, as the use of liquid crystal displays (LCDs) is diversified, interest in a lightweight and thin LCD has been increased, and interest in decreasing the thickness of a substrate occupying a large part of a liquid crystal panel has also been increased. In a 3D or touch panel, a retarder or protective substrate for a touch function is added to a liquid crystal panel, and therefore, requirements of decreasing the thickness of a substrate are further increased. However, since a thin substrate has poor physical characteristics of warp, rigidity, etc., there is a limitation in performing processes on the thin substrate.

In order to solve such a problem, attempts have been made to develop a method of performing a process of attaching an auxiliary substrate to a thin glass substrate and separating the auxiliary substrate from the thin glass substrate after the process is completed.

Hereinafter, exemplary embodiments of a method of fabricating a lightweight and thin LCD will be described in detail with reference to the accompanying drawings so that those skilled in the art to which the present disclosure pertains can easily carry out the present disclosure. The present disclosure can be embodied in various forms, but is not limited to the embodiments described herein.

Figure 1:
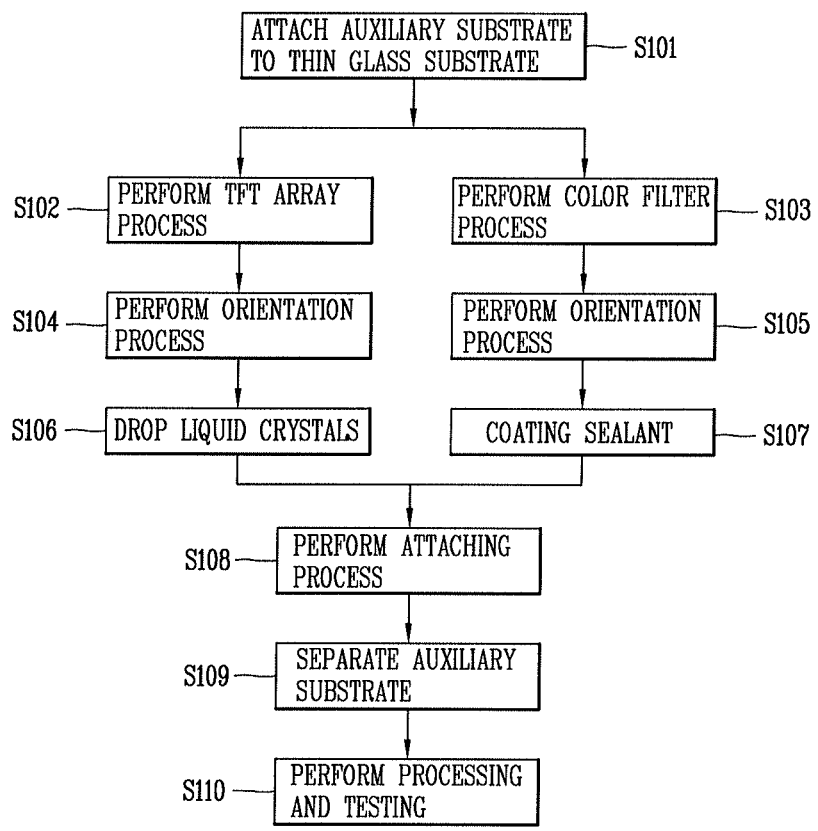
FIG. 1 is a flowchart schematically illustrating a method of fabricating a lightweight and thin LCD according to a first exemplary embodiment.

FIG. 1 is a flowchart schematically illustrating a method of fabricating a lightweight and thin LCD according to a first exemplary embodiment.

In FIG. 1, a method of fabricating an LCD when forming a liquid crystal layer through a liquid crystal dispensing process is described as an example. However, the present disclosure is not limited thereto, and can be applied to a method of fabricating an LCD when forming a liquid crystal layer through a liquid crystal injection process.

The process of fabricating the LCD can be divided into a driving element array process of forming a driving element on a lower array substrate, a color filter process of forming a color filter on an upper color filter substrate, and a cell process.

As described above, there are various components that have influence on the thickness or weight of the LCD. However, the color filter substrate or the array substrate made of glass is the heaviest component among these components of the LCD. Thus, in order to decrease the thickness or weight of the LCD, it is most efficient to decrease the thickness or weight of the glass substrate.

The method of decreasing the thickness or weight of the glass substrate includes a method of decreasing the thickness of the glass substrate by etching the glass substrate and a method of using a thin glass substrate. The first method is to decrease the thickness of the glass substrate by additionally performing a glass etching process after a cell is completed.

Accordingly, the array process, the color filter process and the cell process are performed using a thin glass substrate having a thickness of about 0.1 t to 0.4 t. In this case, the processes are performed by attaching an auxiliary substrate to the thin glass substrate, so that it is possible to minimize warping of the thin glass substrate and to prevent breakdown of the thin glass substrate in a movement of the thin glass substrate. Here, the term 't' means millimeter (mm). For example, 0.1 t means a thickness of 0.1 mm, and 0.4 t means a thickness of 0.4 mm. Hereinafter, for convenience of illustration, 'mm' is denoted by 't.'

That is, when being introduced into a related art processing line for fabricating an LCD, the thin glass substrate having the thickness of about 0.1 t to 0.4 t is largely warped, and therefore, drooping of the thin glass substrate is serious. Hence, it is problematic to move the thin glass substrate using a moving means such as a cassette. Further, when being loaded into or unloaded from a unit processing apparatus, the warping of the thin glass substrate is suddenly generated by even a small impact, and therefore, a positioning error frequently occurs. As a result, it is substantially impossible to perform processes due to an increase in breakdown failure caused by collision, etc.

Accordingly, the auxiliary substrate is attached to the thin glass substrate having the thickness of 0.1 t to 0.4 t before being introduced into the processing line, so that the thin glass substrate can have a warping characteristic identical to or further improved than that of a glass substrate having a thickness of about 0.7 t, which is used in a related art LCD, thereby preventing a problem such as drooping of the glass substrate in a movement or unit process of the glass substrate.

First, before a thin glass substrate having a thickness of 0.1 t to 0.4 t is introduced into the processing line including the array process and the color filter process, an auxiliary substrate having a thickness of about 0.3 t to 0.7 t is attached to the thin glass substrate having the thickness of 0.1 t to 0.4 t (S101). However, the present disclosure is not limited to the thickness of the thin glass substrate and the auxiliary substrate.

The attachment of the thin glass substrate and the auxiliary substrate may be performed by contacting the two substrates with each other under a vacuum state. In this case, the attachment force between the two substrates may be derived from an electrostatic force, vacuum force, surface tension, etc.

In this case, the attachment force between the thin glass substrate and the auxiliary substrate is reduced by plasma-treating the auxiliary substrate using fluorine, etc. or by forming a concavo-convex pattern on the auxiliary substrate, so that the auxiliary substrate can be easily detached from the thin glass substrate. This will be described in detail with the accompanying drawings.

FIGS. 2A to 2D are exemplary views schematically illustrating some processes in the method, in which an attaching and detaching process of a thin glass substrate and a plasma-treated auxiliary substrate is described as an example.

In FIGS. 2A to 2D, the attachment force between the auxiliary substrate and the thin glass substrate is reduced by performing a plasma treatment on an entire surface of the auxiliary substrate, so that the auxiliary substrate can be easily detached from the thin glass substrate.

Figure 2A:
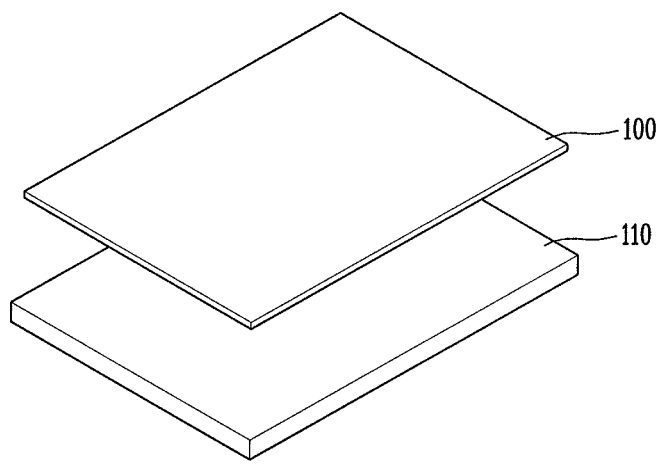
FIGS. 2A to 2D are exemplary views schematically illustrating some processes in the method.

As shown in FIG. 2A, there are prepared, for example, a thin glass substrate 100 having a thickness of about 0.1 t to 0.4 and an auxiliary substrate 110 having a thickness of about 0.3 t to 0.7 t.

Here, the thin glass substrate 100 may be a large-area mother substrate on which a plurality of color filter substrates for a color filter process are disposed or a large-area mother substrate on which a plurality of array substrates for an array process are disposed.

Figure 2B:
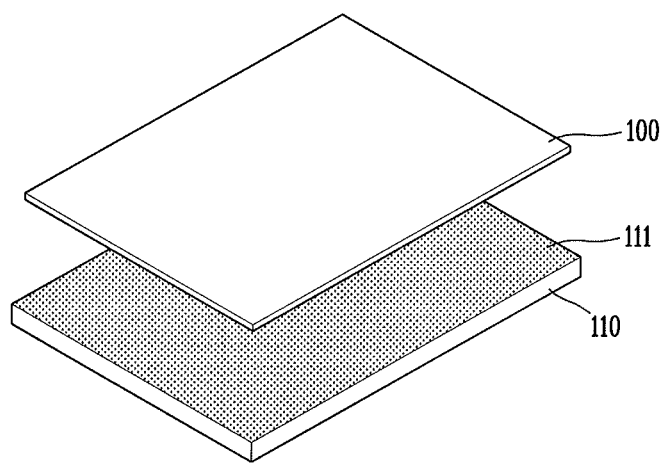

Next, as shown in FIG. 2B, a plasma treatment using fluorine, etc. is performed on an entire surface 111 of the auxiliary substrate 110 so as to facilitate detachment of the auxiliary substrate 110.

In a case where the plasma treatment using the fluorine is performed on the auxiliary substrate 110 as described above, the fluorine may increase the surface roughness of the auxiliary substrate 110 by etching the surface 111 of the auxiliary substrate 110 or may deteriorate the attachment force caused by the contact of the auxiliary substrate 110 with the thin glass substrate 100 by changing chemical properties of the surface 111 of the auxiliary substrate 110.

Figure 2C:
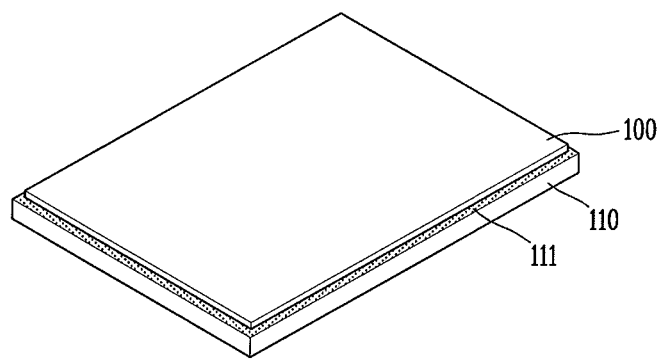

Next, as shown in FIG. 2C, the plasma-treat auxiliary substrate 110 is attached to the thin glass substrate 100. In a case where a glass substrate is used as the auxiliary substrate 110, the attachment between the thin glass substrate 100 and the auxiliary substrate 110 can be performed by contacting the two substrates 100 and 110 with each other under a vacuum state. In this case, the attachment force between the two substrates 100 and 110 may be derived from an electrostatic force, vacuum force, surface tension, etc.

In a processing panel in the state in which the thin glass substrate 100 having the thickness of 0.1 t to 0.4 t and the auxiliary substrate 110 having a thickness of 0.3 t to 0.7 t are attached together, the thin glass substrate 100 and the auxiliary substrate 110, constituting the processing panel, are made of the same glass material, so that their thermal expansion coefficients according to temperature are equal to each other. Thus, there is no problem such as warping of the processing panel due to the difference in thermal expansion coefficient when a unit process is performed, etc.

The thin glass substrate 100 has the thickness of 0.1 t to 0.4 t in itself, but the warping of the thin glass substrate 100 is remarkably reduced as the processing panel is configured by attaching the auxiliary substrate 110 to the thin glass substrate 100. The warping of the thin glass substrate 100 is identical to or less than that of a related art glass substrate having a thickness of 0.7 t. Thus, there is no problem in performing a unit process for the LCD.

Subsequently, a color filter process or array process described later is performed on the thin glass substrate 100 to which the auxiliary substrate 110 is attached, thereby forming a thin film transistor (TFT) or color filter layer as a driving element in each panel region.

Figure 2D:
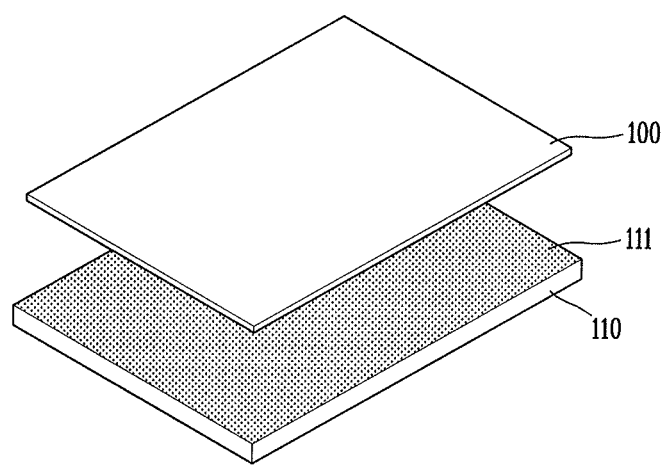

After the predetermined process is completed, the auxiliary substrate 110 is necessarily separated from the thin glass substrate 100 as shown in FIG. 2D. In this case, the plasma treatment is performed on the entire surface 111 of the auxiliary substrate 110, and thus the detachment of the auxiliary substrate 110 from the thin glass substrate 100 can be easily performed.

That is, in a case where the attachment force between the thin glass substrate 100 and the auxiliary substrate 110 is strong, it is difficult to physically separated the auxiliary substrate 110 from the thin glass substrate 100, and therefore, a warping phenomenon may occur in the thin glass substrate 100 in the separation of the auxiliary substrate 110 from the thin glass substrate 100. However, in a case where the plasma treatment is performed on the entire surface 111 of the auxiliary substrate 110, the attachment force between the thin glass substrate 100 and the auxiliary substrate 110 is lowered so that the detachment of the auxiliary substrate 110 from the thin glass substrate can be easily performed.

The auxiliary substrate 100 detached from the thin glass substrate 100 as described above can be recycled in the performance of a new process by being attached to a new glass substrate.

Meanwhile, the method of performing the plasma treatment on the auxiliary substrate 110 may be a partial processing method as well as the entire processing method described above.

FIGS. 3A to 3D are other exemplary views schematically illustrating some processes in the method, in which an attaching and detaching process of a thin glass substrate and a plasma-treated auxiliary substrate is described as an example.

In FIGS. 3A to 3D, the attachment force between the auxiliary substrate and the thin glass substrate is reduced by performing a plasma treatment on a predetermined portion of the auxiliary substrate, so that the auxiliary substrate can be easily detached from the thin glass substrate.

Figure 3A:
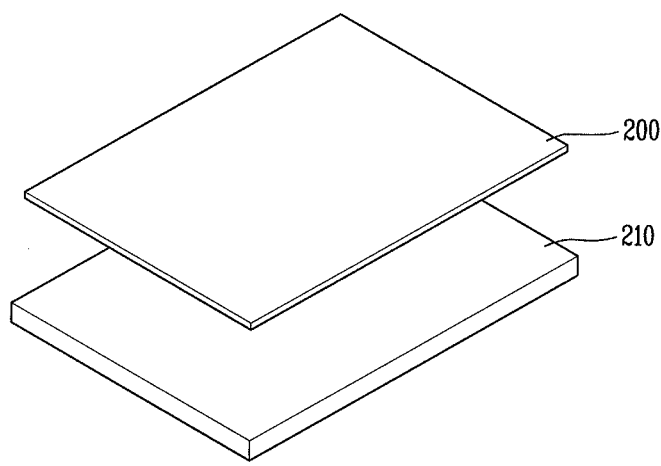
FIGS. 3A to 3D are other exemplary views schematically illustrating some processes in the method.

As shown in FIG. 3A, there are prepared, for example, a thin glass substrate 100 having a thickness of about 0.1 t to 0.4 and an auxiliary substrate 110 having a thickness of about 0.3 t to 0.7 t.

Here, the thin glass substrate 100 may be a large-area mother substrate on which a plurality of color filter substrates for a color filter process are disposed or a large-area mother substrate on which a plurality of array substrates for an array process are disposed.

Figure 3B:
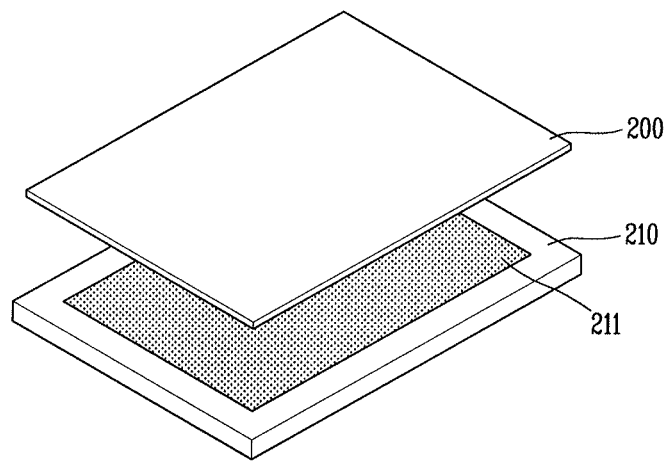

Next, as shown in FIG. 3B, a plasma treatment using fluorine, etc. is performed on a partial surface 111' of the auxiliary substrate 110 so as to facilitate detachment of the auxiliary substrate 110. Although it has been illustrated in FIG. 3b that the fluorine-treatment is performed on the partial surface 111' at the center of the auxiliary substrate 110, the present disclosure is not limited thereto.

In a case where the fluorine treatment is performed on the auxiliary substrate 110 as described above, the fluorine may increase the surface roughness of the auxiliary substrate 110 by etching the partial surface 111' of the auxiliary substrate 110 or may deteriorate the attachment force caused by the contact of the auxiliary substrate 110 with the thin glass substrate 100 by changing chemical properties of the surface 111 of the auxiliary substrate 110. Particularly, as the fluorine treatment is performed on only the partial surface 111' of the auxiliary substrate 110, the attachment between the thin glass substrate 100 and the auxiliary substrate 110 is performed in a region where the two substrates 100 and 110 can come in contact with each other, and the detachment of the auxiliary substrate 110 from the thin glass substrate 100 can be easily performed due to the fluorine-treated region, i.e., the partial surface 111'.

Figure 3C:
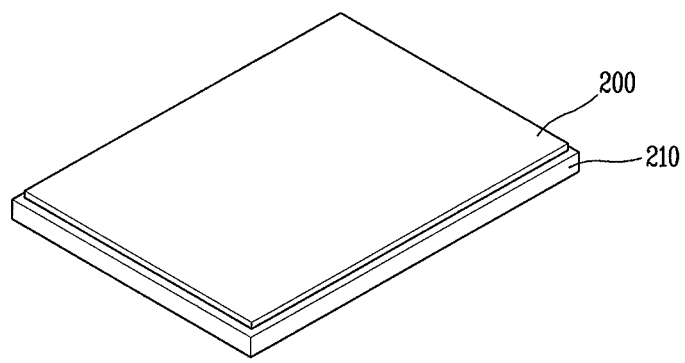
Figure 3D:
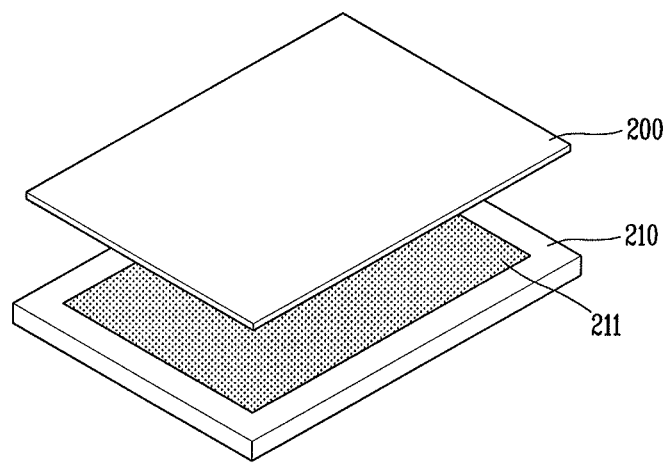

Next, as shown in FIG. 3C, the plasma-treated auxiliary substrate 110 is attached to the thin glass substrate 100. In a case where a glass substrate is used as the auxiliary substrate 110, the attachment between the thin glass substrate 100 and the auxiliary substrate 110 can be performed by contacting the two substrates 100 and 110 with each other under a vacuum state. In this case, the attachment force between the two substrates 100 and 110 may be derived from an electrostatic force, vacuum force, surface tension, etc.

Subsequently, a color filter process or array process described later is performed on the thin glass substrate 100 to which the auxiliary substrate 110 is attached, thereby forming a TFT or color filter layer as a driving element in each panel region.

After the predetermined process is completed, the auxiliary substrate 110 is necessarily separated from the thin glass substrate 100 as shown in FIG. 2D. In this case, the plasma treatment is performed on the partial surface 111' of the auxiliary substrate 110, and thus the detachment of the auxiliary substrate 110 from the thin glass substrate 100 can be easily performed.

Meanwhile, although the case where the attachment force between the auxiliary substrate and the thin glass substrate is reduced by performing the plasma treatment on the auxiliary substrate so that the detachment of the auxiliary substrate from the thin glass substrate can be easily performed has been described as an example, the present disclosure is not limited thereto. That is, the attachment force between the auxiliary substrate and the thin glass substrate may be reduced by forming a concavo-convex pattern on the auxiliary substrate. This will be described in detail with reference to the accompanying drawings.

FIGS. 4A to 4D are still other exemplary views schematically illustrating some processes in the method, in which an attaching and detaching process of a thin glass substrate and an auxiliary substrate having a concavo-convex pattern formed thereon is described as an example.

In FIGS. 4A to 4D, the attachment force between the auxiliary substrate and the thin glass substrate is reduced by forming a concavo-convex pattern on a predetermined portion of the auxiliary substrate, so that the auxiliary substrate can be easily detached from the thin glass substrate.

Figure 4A:
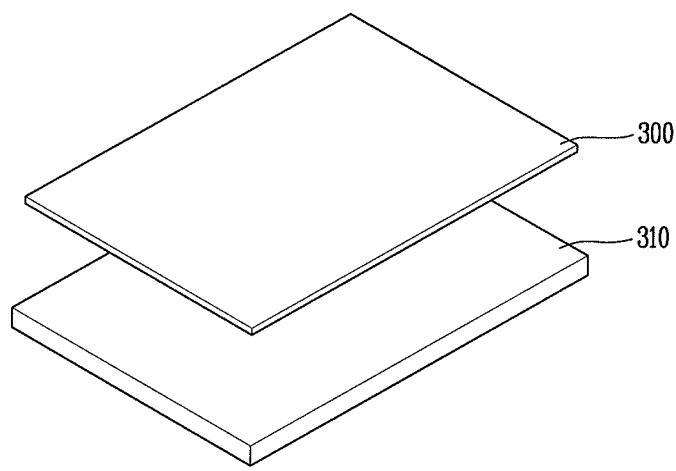
FIGS. 4A to 4D are still other exemplary views schematically illustrating some processes in the method.

As shown in FIG. 4A, there are prepared, for example, a thin glass substrate 100 having a thickness of about 0.1 t to 0.4 and an auxiliary substrate 110 having a thickness of about 0.7 t.

Here, the thin glass substrate 100 may be a large-area mother substrate on which a plurality of color filter substrates for a color filter process are disposed or a large-area mother substrate on which a plurality of array substrates for an array process are disposed.

Figure 4B:
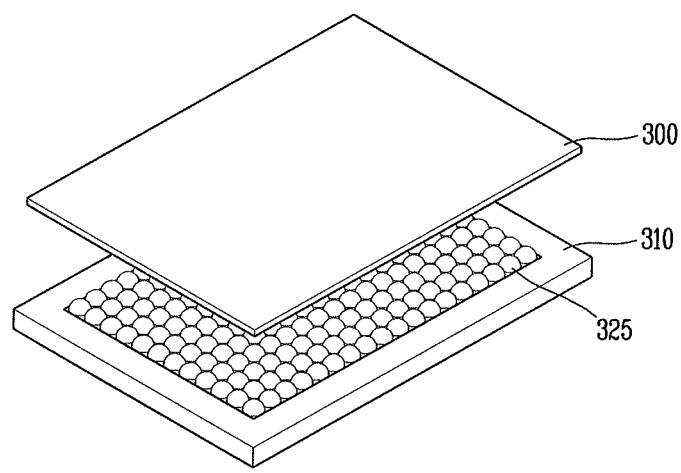

Next, as shown in FIG. 4B, a concavo-convex pattern 125 is formed on a partial surface of the auxiliary substrate 110 so as to facilitate detachment of the auxiliary substrate 110. Although it has been illustrated in FIG. 3b that the concavo-convex pattern 125 on the partial surface at the center of the auxiliary substrate 110, the present disclosure is not limited thereto.

The method of forming the concavo-convex pattern 125 includes a method of patterning an inorganic insulation layer, a method of patterning an organic insulation layer, a method of etching $SiO_2$ at a low temperature, a laser patterning method, etc.

In a case where the concavo-convex pattern 125 is formed on the auxiliary substrate 110, the attachment force caused by the contact of the auxiliary substrate 110 with the thin glass substrate 100 may be deteriorated as the surface roughness increases. Particularly, as the concavo-convex pattern 125 is formed on only the partial surface of the auxiliary substrate 110, the attachment between the thin glass substrate 100 and the auxiliary substrate 110 is performed in a region where the two substrates 100 and 110 can come in contact with each other, and the detachment of the auxiliary substrate 110 from the thin glass substrate 100 can be easily performed due to the region where the concavo-convex pattern 125 is formed.

Figure 4C:
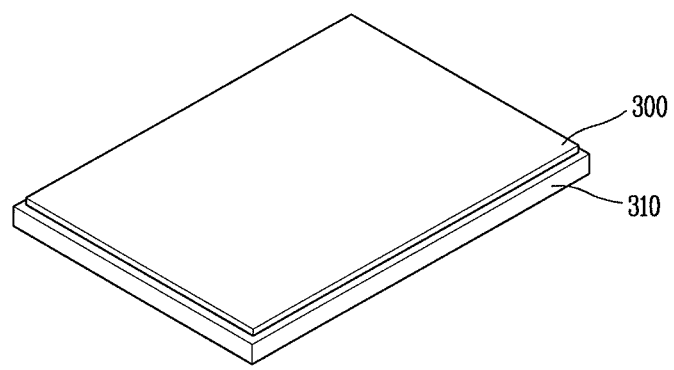
Figure 4D:
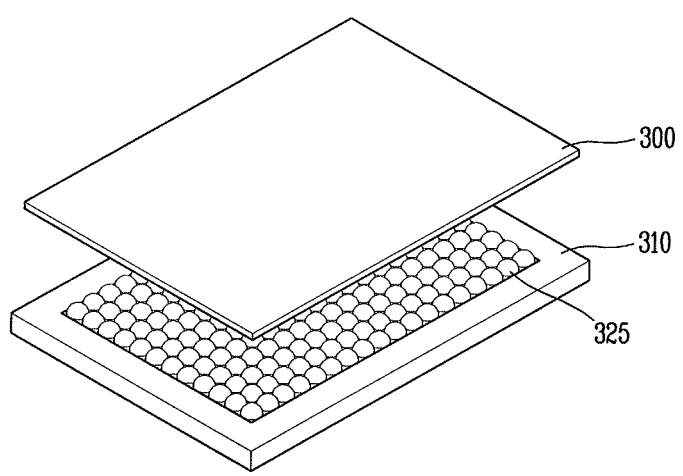

Next, as shown in FIG. 4C, the plasma-treat auxiliary substrate 110 having the concavo-convex pattern 125 formed thereon is attached to the thin glass substrate 100. In a case where a glass substrate is used as the auxiliary substrate 110, the attachment between the thin glass substrate 100 and the auxiliary substrate 110 can be performed by contacting the two substrates 100 and 110 with each other under a vacuum state. In this case, the attachment force between the two substrates 100 and 110 may be derived from an electrostatic force, vacuum force, surface tension, etc.

In a processing panel in the state in which the thin glass substrate 100 having the thickness of 0.1 t to 0.4 t and the auxiliary substrate 110 having a thickness of 0.3 t to 0.7 t are attached together, the thin glass substrate 100 and the auxiliary substrate 110, constituting the processing panel, are made of the same glass material, so that their thermal expansion coefficients according to temperature are equal to each other. Thus, there is no problem such as warping of the processing panel due to the difference in thermal expansion coefficient when a unit process is performed, etc.

The thin glass substrate 100 has the thickness of 0.1 t to 0.4 t in itself, but the warping of the thin glass substrate 100 is remarkably reduced as the processing panel is configured by attaching the auxiliary substrate 110 to the thin glass substrate

100. The warping of the thin glass substrate 100 is identical to or less than that of a related art glass substrate having a thickness of 0.7 t. Thus, there is no problem in performing a unit process for the LCD.

Subsequently, a color filter process or array process described later is performed on the thin glass substrate 100 to which the auxiliary substrate 110 is attached, thereby forming a TFT or color filter layer as a driving element in each panel region.

After the predetermined process is completed, the auxiliary substrate 110 is necessarily separated from the thin glass substrate 100 as shown in FIG. 2D. In this case, the concavo-convex pattern 125 is formed on the partial surface of the auxiliary substrate 110, and thus the detachment of the auxiliary substrate 110 from the thin glass substrate 100 can be easily performed.

The auxiliary substrate 100 detached from the thin glass substrate 100 as described above can be recycled in the performance of a new process by being attached to a new glass substrate.

However, the present disclosure is not limited to the aforementioned method of attaching the auxiliary substrate to the thin glass substrate, and the auxiliary substrate may be attached to the thin glass substrate under a vacuum state without an adhesive or surface treatment. In this case, the two substrates may be attached together by an electrostatic force, vacuum force, van der Waals force, surface tension, etc.

Meanwhile, although will be described later, a method of holding an upper portion of the auxiliary substrate or thin glass substrate using a vacuum pad and then lifting the auxiliary substrate or thin glass substrate may be used as the detaching method applicable to the above process. In this case, the attachment force between the two substrates is not large due to the plasma treatment performed on the surface of the auxiliary substrate or the concavo-convex pattern formed on the surface of the auxiliary substrate, and thus the detachment of the auxiliary substrate from the thin glass substrate can be easily performed. In order to more easily perform the detachment, air may be injected into a gap between the auxiliary substrate and the thin glass substrate, which is made by a knife.

After the auxiliary substrate is attached to the thin glass substrate, a plurality of gate, a plurality of data lines and TFTs are formed on a thin glass substrate for an array substrate (hereinafter, referred to as an array substrate for convenience of illustration), to which the auxiliary substrate described above is attached, through an array process (S102). Here, the gate and data lines are arranged on the array substrate so as to define pixel regions, and the TFT as a driving element is connected to the gate and data lines in each pixel region. Through the array process, pixel electrodes are formed on the array substrate. Here, the pixel electrode is connected to the TFT so as to drive a liquid crystal layer as a signal is applied to the pixel electrode through the TFT.

Further, a color filter layer and a common electrode are formed on a thin glass substrate for a color filter substrate (hereinafter, referred to as a color filter substrate for convenience of illustration), to which the auxiliary substrate described above is attached, through a color filter process (S103). Here, the color filter layer is configured with red, green and blue sub-color filters for implementing colors. In a case where an in-plane switching (IPS) mode LCD is fabricated, the common electrode is formed on the array substrate on which the pixel electrodes are formed through the array process.

Subsequently, orientation layers are respectively printed on the color filter substrate and the array substrate, and a rubbing treatment is then performed on the orientation layers so as to provide an anchoring force or surface fixing force (i.e., pretilt angle and orientation direction) to liquid crystal molecules of the liquid crystal layer formed between the color filter substrate and the array substrate (S104 and S105).

A predetermined sealing pattern is formed on the rubbing-treated color filter substrate by coating a sealant on the color filter substrate, and simultaneously, the liquid crystal layer is formed by dropping liquid crystals on the array substrate (S106 and S107).

Meanwhile, the color filter substrate and the array substrate are formed on large-area mother substrates, respectively. In other words, a plurality of panel regions on each large-scale mother substrate, and a TFT as a driving element or color filter layer is formed in each panel region.

In this case, the dropping method is a method of dropping or dispensing liquid crystals, using a dispenser, in an image display region of a large-area first mother substrate having a plurality of array substrates arranged thereon or a large-area second mother substrate having a plurality of color filter substrates arranged thereon, and allowing the liquid crystals to be equally distributed over the entire image display region by pressure for attaching together the first and second mother substrates.

Therefore, in a case where the liquid crystal layer is formed in the liquid crystal panel using the dropping method, a seal pattern is necessarily formed in a closed pattern surrounding the outline of the image display region so as to prevent the liquid crystals from leaking to the outside of the image display region.

In the dropping method, the liquid crystals can be dropped for a short time as compared with the vacuum injection method, and the liquid crystal layer can be very quickly formed even when the size of the liquid crystal panel becomes large. Since only the required quantity of liquid crystals is dropped on the first mother substrate, it is possible to prevent an increase in unit cost of the liquid crystal panel due to the disuse of high-priced liquid crystals in the vacuum injection method, thereby improving price competitiveness.

Subsequently, the first and second mother substrates are attached together by the sealant by applying the pressure in the state in which the first and second mother substrates are aligned, and simultaneously, the liquid crystals dropped through the application of the pressure are equally distributed over the entire liquid crystal panel (S108). Through such a process, a plurality of liquid crystal panels each having the liquid crystal layer formed therein are formed on the first and second mother substrates, and the large-area first and second mother substrates each having the plurality of liquid crystal panels formed thereon are separated from the auxiliary substrate. Then, the mother substrate is separated into a plurality of liquid crystal panels through a processing and cutting process, and each liquid crystal panel is tested, thereby fabricating an LCD (S109 and S110).

In this case, as described above, the auxiliary substrate is separated from the liquid crystal panel by cutting an edge portion between the auxiliary substrate and the thin glass substrate using a knife and then injecting air into the cut edge portion between the auxiliary substrate and the thin glass substrate using an air knife. If push pin regions are formed using corner cuts formed at corners of the substrates, the separation of the auxiliary substrate from the thin glass substrate using the knife and air injection can be easily performed. This will be described in detail with reference to the accompanying drawings.

Figure 5A:
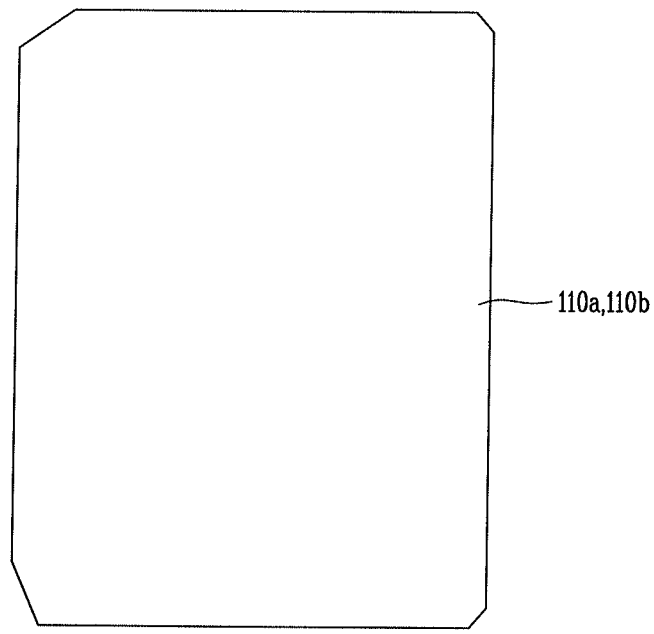
FIGS. 5A and 5B are plan views schematically illustrating first and second auxiliary substrates and first and second mother substrates, which have corner cuts.
Figure 5B:
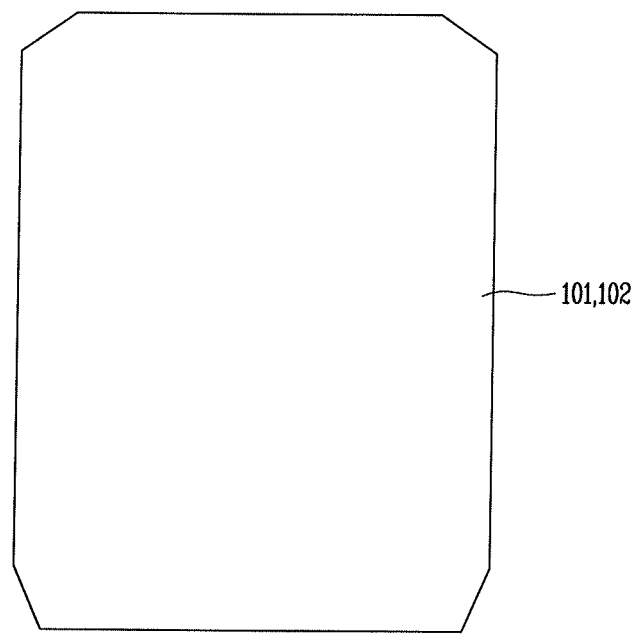
Figure 5C:
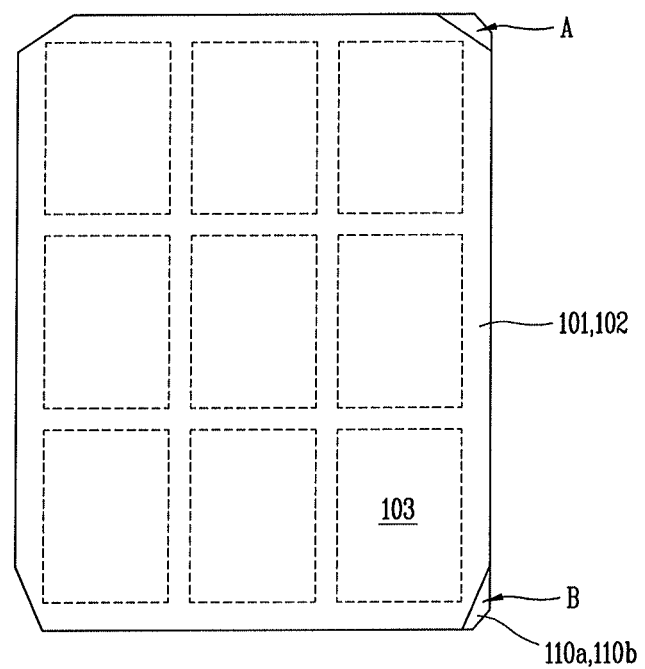
FIG. 5C is a plan view schematically illustrating the first and second mother substrates in a state in which push pin regions are formed by attaching the first and second auxiliary substrates having corner cuts to the first and second mother substrates.
Figure 6A:
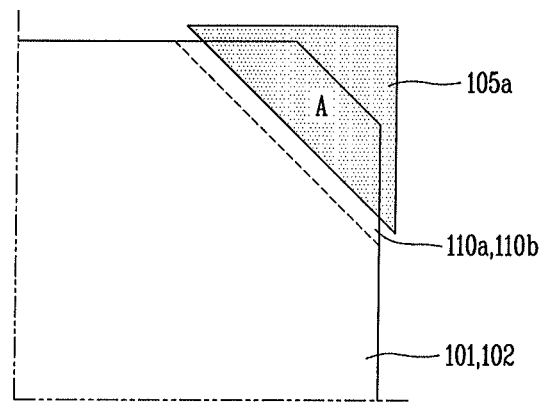
FIGS. 6A to 6D are exemplary sectional views illustrating the shape of a push pin applied to a push pin region A.
Figure 6B:
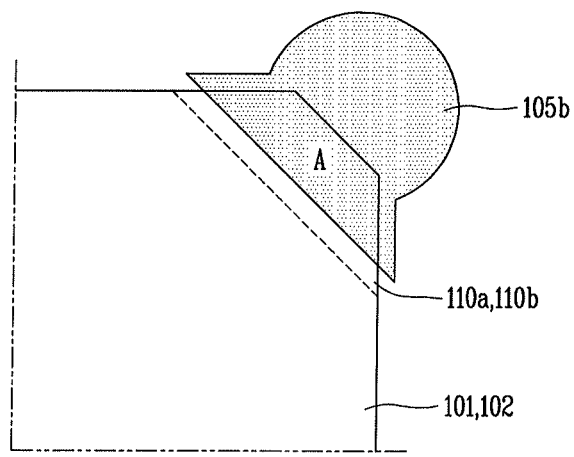
Figure 6C:
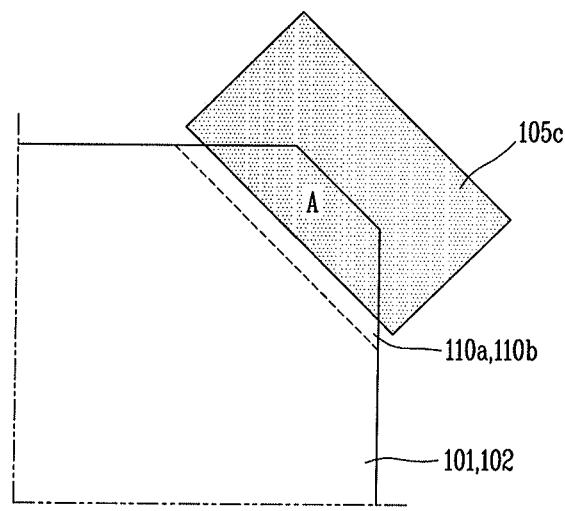
Figure 6D:
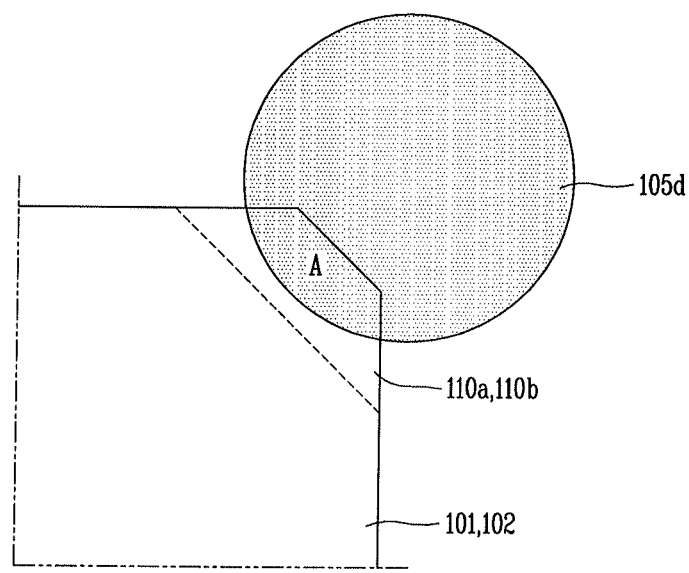
Figure 7A:
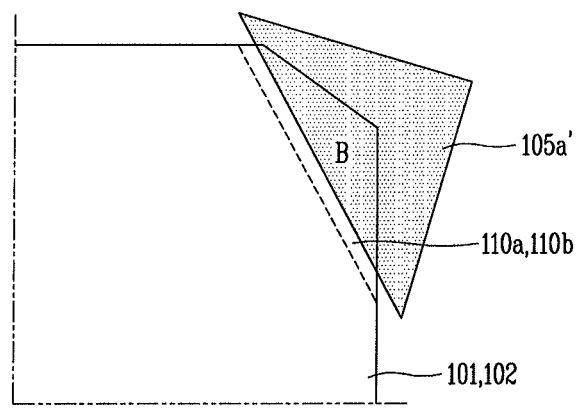
FIGS. 7A to 7D are exemplary sectional views illustrating the shape of another push pin applied to a push pin region B.
Figure 7B:
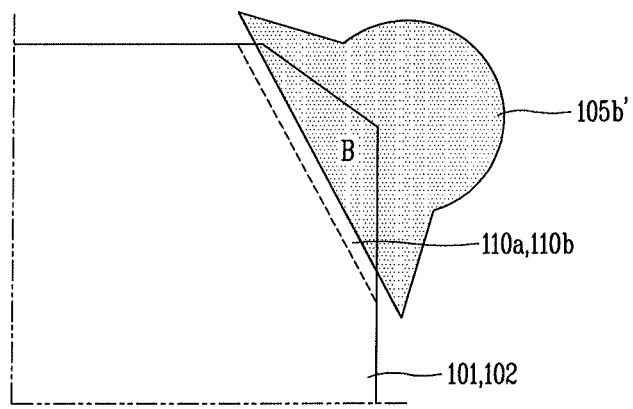
Figure 7C:
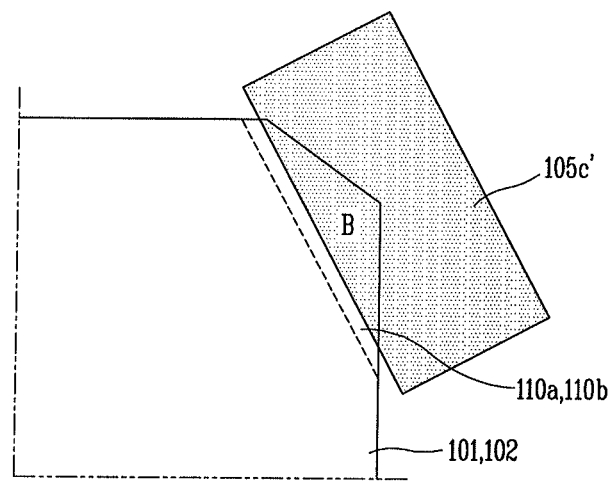
Figure 7D:
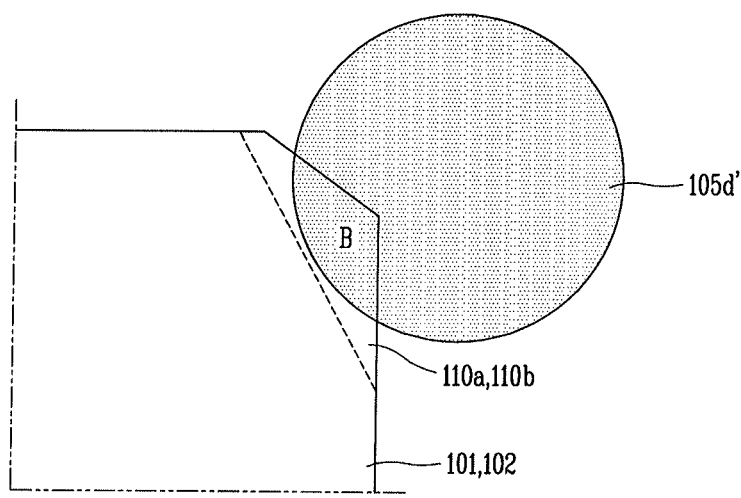

FIGS. 5A and 5B are plan views schematically illustrating first and second auxiliary substrates and first and second mother substrates, which have corner cuts. FIG. 5C is a plan view schematically illustrating the first and second mother substrates in a state in which push pin regions are formed by attaching the first and second auxiliary substrates having corner cuts to the first and second mother substrates.

Referring to these figures, before thin glass substrates having a thickness of 0.1 t to 0.4 t, i.e., first and second mother substrates 101 and 102 are introduced to a processing line, first and second auxiliary substrates 110a and 110b having a thickness of 0.3 t to 0.7 t are attached to the respective first and second mother substrates 101 and 102 as described above, so that the first and second mother substrates 101 and 102 can have a warping characteristic identical to or further improved than that of the glass substrate having a thickness of about 0.7 t, which is used in the related art LCD, thereby preventing a problem such as drooping of the glass substrate in the movement or unit process of the glass substrate.

In this case, corners of the first and second mother substrates 101 and 102 and the auxiliary substrates 110 in an attached state, in which a plurality of liquid crystal panels 103 are arranged, are cut at a predetermined inclined angle, which is referred to as corner cuts.

Particularly, as at least two corners of the first and second mother substrates 101 and 102 are cut further inward than those of the first and second auxiliary substrates 110a and 110b for the purpose of direction distinction and subsequent processes, corner regions of the first and second auxiliary substrates 110a and 110b are exposed. The corner regions may be respectively used as push pin regions A and B in which push pins are applied in order to start the separation process of the first and second auxiliary substrates 110a and 110b.

In this case, the contact surfaces of the push pins for starting the separation process of the first and second auxiliary substrates may have, for example, an O-ring shape, and a push method using the push pins is as follows.

First, the first and second mother substrates attached together in the state in which the first and second auxiliary substrates are attached to the respective first and second mother substrates are loaded and aligned with the push pins, and then moved upward in the state in which the push pins are fixed.

In a state in which a separate push process is not established as described above, misalignment may occur in the push process, and therefore, corners of the first and second mother substrates or the first and second auxiliary substrates may be damaged.

Further, the O-ring shaped push pin has a small contact area with the first and second auxiliary substrates, and therefore, the push process may be unstably performed.

Accordingly, in another example, the shape of a push pin for forming a start point of the detachment of an edge portion is optimized to the shape of the push pin region, and the push method is established. This will be described in detail with reference to the accompanying drawings.

FIGS. 6A to 6D are exemplary sectional views illustrating the shape of a push pin applied to a push pin region A.

FIGS. 7A to 7D are exemplary sectional views illustrating the shape of another push pin applied to another push pin region B.

Referring to these figures, as at least two corners of the first and second mother substrates 101 and 102 are cut further inward than those of the first and second auxiliary substrates 110a and 110b for the purpose of direction distinction and subsequent processes as described above, corner regions of the first and second auxiliary substrates 110a and 110b are exposed. The corner regions may be used as push pin regions A and B in which push pins 105a to 105d and 105a' to 105d' are applied in order to start the separation process of the first and second auxiliary substrates 110a and 110b.

In this case, the contact area of each of the push pins 105a to 105d and 105a' to 105d' may be optimized to the shape of the exposed push pin region A or B so that the contact area with the push pin region A or B are maximized. For example, each of the push pins 105a to 105d and 105a' to 105d' may have a triangular shape, a combined shape of a circle and a triangle, a rectangular shape or a circular shape.

Figure 8A:
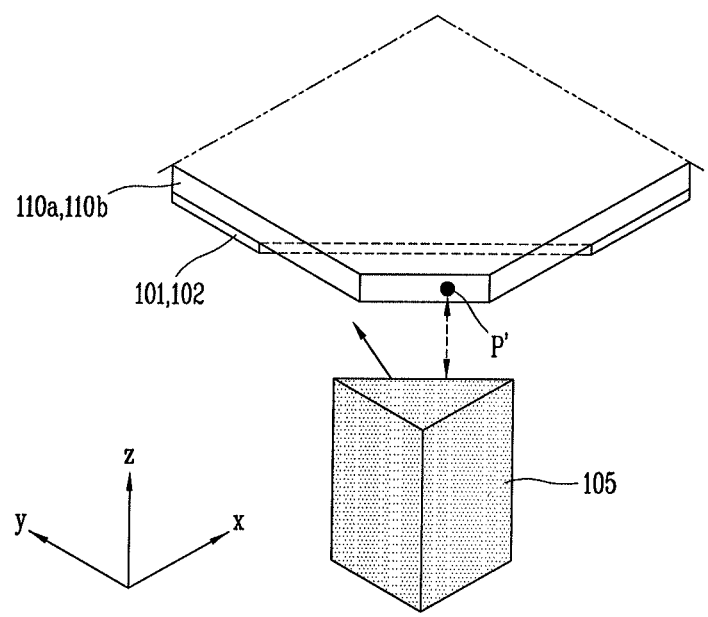
FIGS. 8A and 8B are exemplary perspective views illustrating a method of recognizing an end of a thin glass substrate or auxiliary substrate.
Figure 8B:
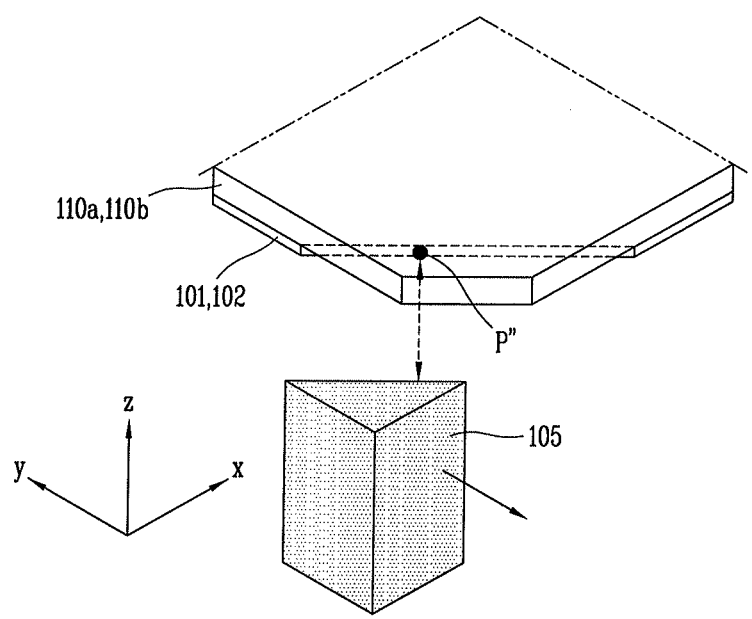

FIGS. 8A and 8B are exemplary perspective views illustrating a method of recognizing an end of a thin glass substrate or auxiliary substrate, which illustrates a method of achieving the stability of the detaching process by increasing the success rate of a push pin application process and reducing misalignment.

In FIG. 8A, a method of recognizing ends of the first and second auxiliary substrates is shown as an example. In FIG. 8B, a method of recognizing ends of the first and second mother substrates is shown as an example.

First, as shown in FIG. 8A, an end P' of the first or second auxiliary substrate 110a or 110b is recognized through an observation apparatus (not shown) such as a charge-coupled device (CCD) camera.

Subsequently, the push pin 105 is aligned at a predetermined position by being moved to x and y axes in consideration of the position of the recognized end P' of the first or second auxiliary substrate 110a or 110b. Alternatively, as shown in FIG. 8B, an end P'' of the first or second mother substrate 101 or 102 may be recognized through the observation apparatus (not shown) such as the CCD camera.

Subsequently, the push pin 105 is aligned at a predetermined position by being moved to -x and -y axes in consideration of the position of the recognized end P''' of the first or second mother substrate 101 or 102.

Figure 9A:
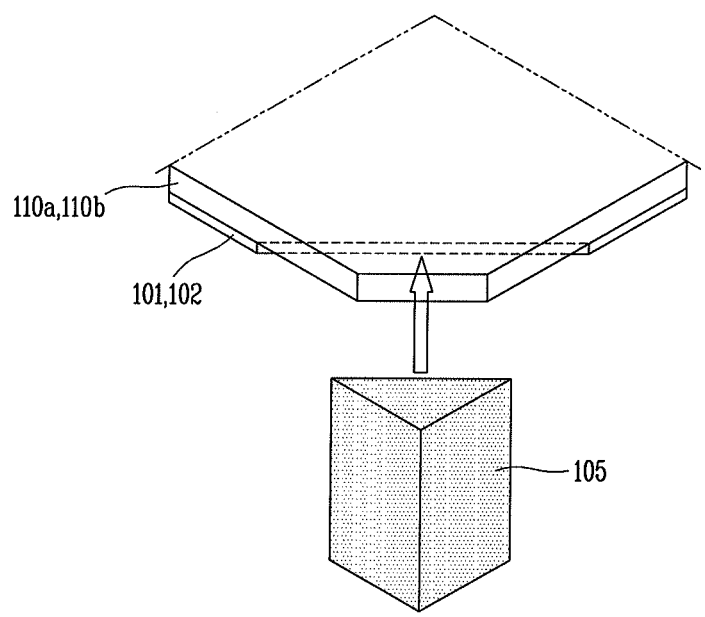
FIGS. 9A to 9C are exemplary perspective views illustrating a method of pushing a push pin after recognizing an end of a thin glass substrate or auxiliary substrate.
Figure 9B:
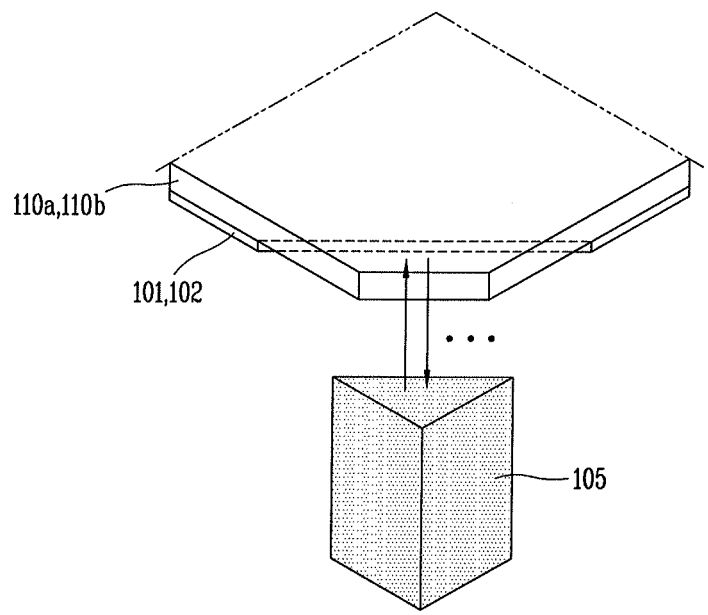
Figure 9C:
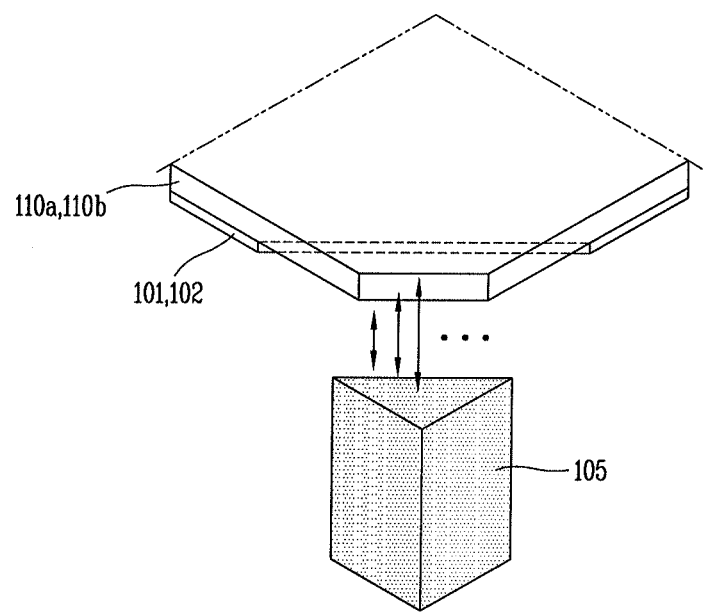

FIGS. 9A to 9C are exemplary perspective views illustrating a method of pushing a push pin after recognizing an end of a thin glass substrate or auxiliary substrate.

After the push pins are aligned by recognizing the ends of the first and second mother substrates or the first and second auxiliary substrates using the method described above, as an example, the separation process of the first and second auxiliary substrates 110a and 110b may be started by moving the aligned push pin 105 in the direction of a z-axis as shown in FIG. 9A.

As another example, the separation process of the first and second auxiliary substrates 110a and 110b may be started by alternately moving the aligned push pin 105 in the directions of z and -z axes as shown in FIG. 9B (pulse method).

As still another example, the separation process of the first and second auxiliary substrates 110a and 110b may be started by alternately moving the aligned push pin 105 in the directions of the z and -z axes and sequentially increasing a moving distance as shown in FIG. 9C (sequential pulse method).

Hereinafter, the entire process of separating the auxiliary substrate from the liquid crystal panel in a cell state, which is attached through the attachment process, will be described in detail with reference to the accompanying drawings.

Figure 10:
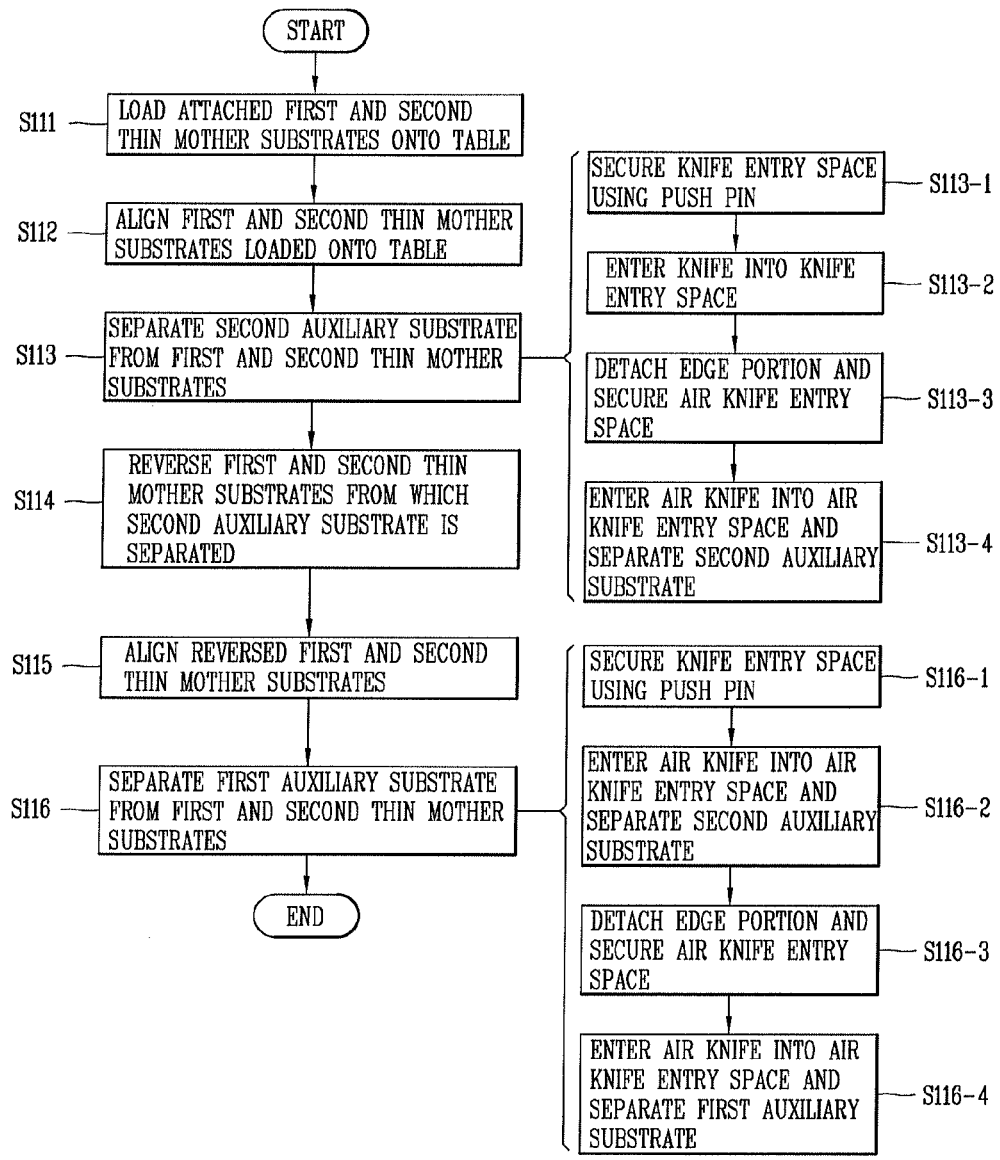
FIG. 10 is an exemplary flowchart illustrating a process of separating an auxiliary substrate according to the first exemplary embodiment.

FIG. 10 is an exemplary flowchart illustrating a process of separating an auxiliary substrate according to the first exemplary embodiment.

Figure 11:
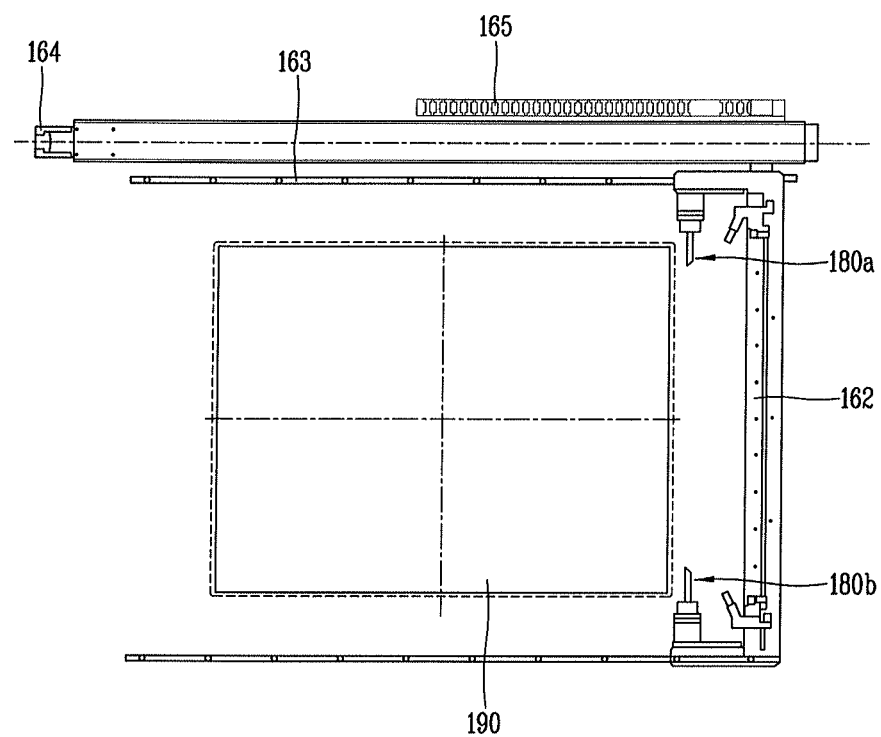
FIG. 11 is a plan view schematically illustrating the configuration of a lower portion of a detaching apparatus.

FIG. 11 is a plan view schematically illustrating the configuration of a lower portion of a detaching apparatus.

Figure 12A:
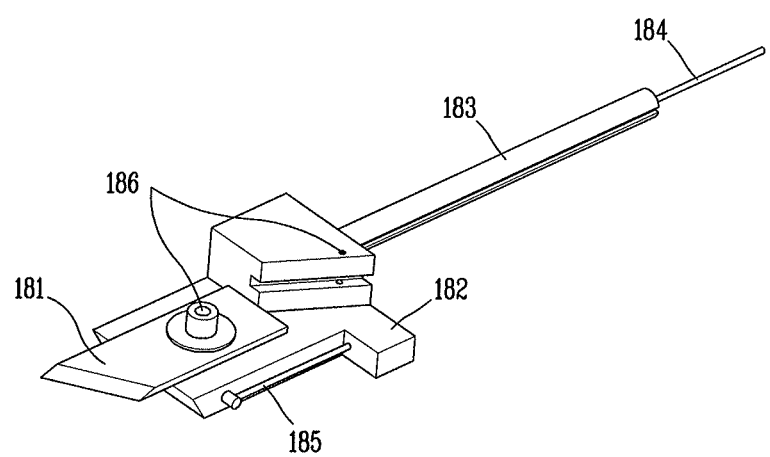
FIGS. 12A and 12B are views schematically illustrating the configuration of a knife.
Figure 12B:
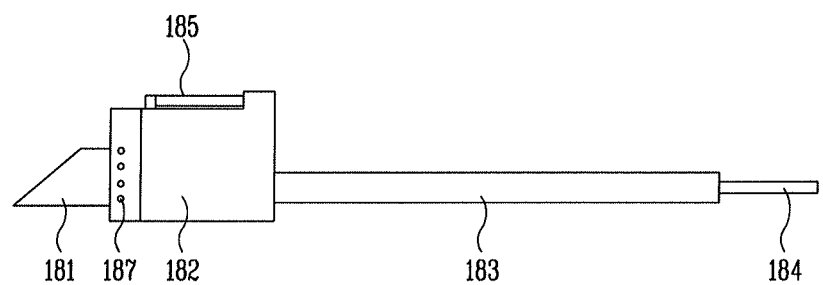
Figure 13A:
FIGS. 13A to 13D are exemplary views illustrating shapes of blades in the knife shown in FIGS. 12A and 12B.
Figure 13B:
Figure 13C:
Figure 13D:

FIGS. 12A and 12B are views schematically illustrating the configuration of a knife. FIGS. 13A to 13D are exemplary views illustrating shapes of blades in the knife shown in FIGS. 12A and 12B.

Figure 14:
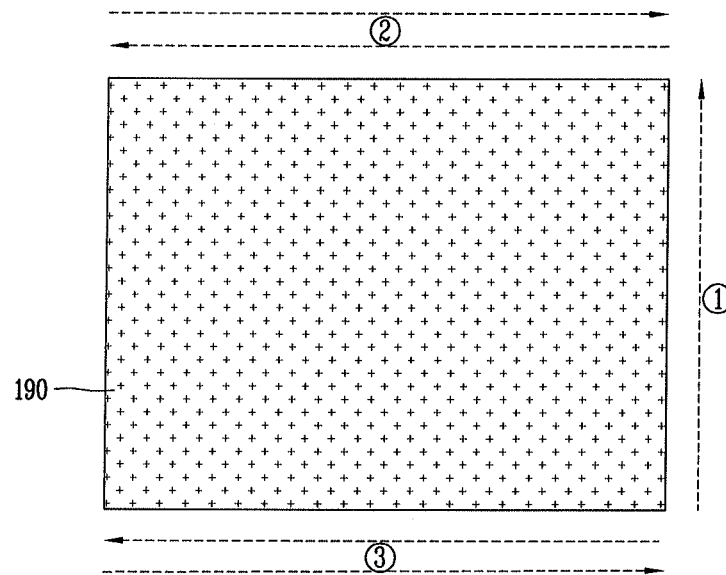
FIG. 14 is an exemplary view illustrating an order of a process of detaching edge portions using a knife.
Figure 15:
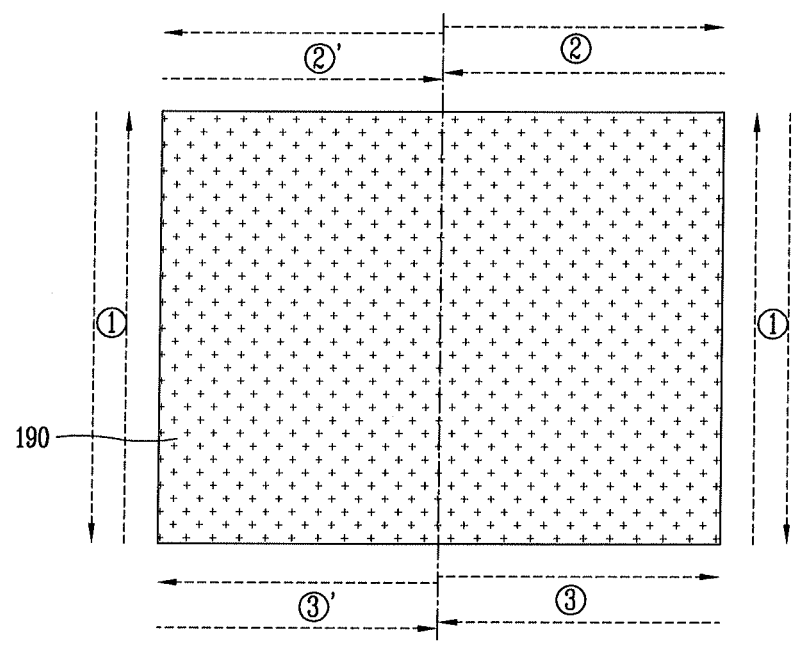
FIG. 15 is another exemplary view illustrating an order of a process of detaching edge portions using a knife.

FIG. 14 is an exemplary view illustrating an order of a process of detaching edge portions using a knife. FIG. 15 is another exemplary view illustrating an order of a process of detaching edge portions using a knife.

Figure 16A:
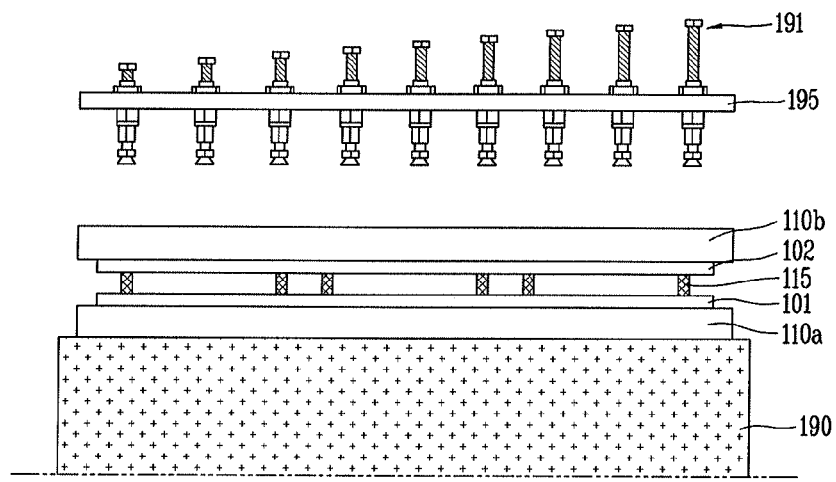
FIGS. 16A to 16P are exemplary views sequentially illustrating the process of separating the auxiliary substrate in the method according to the first exemplary embodiment.
Figure 16B:
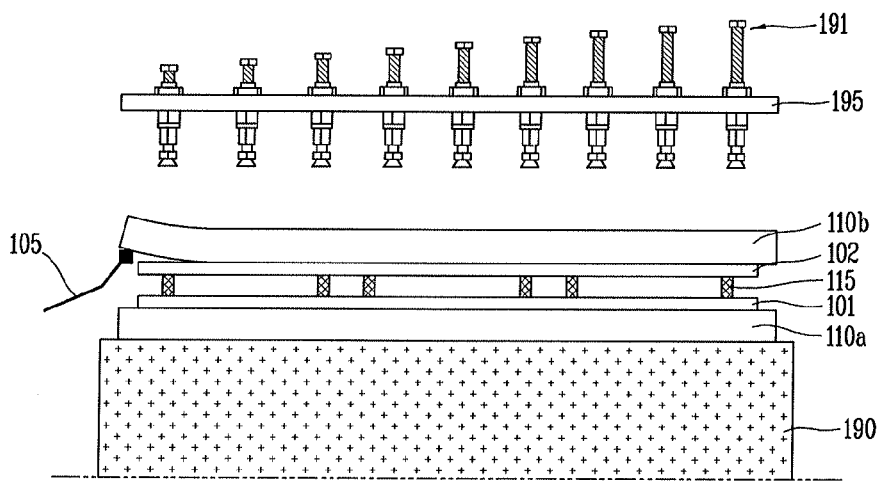
Figure 16C:
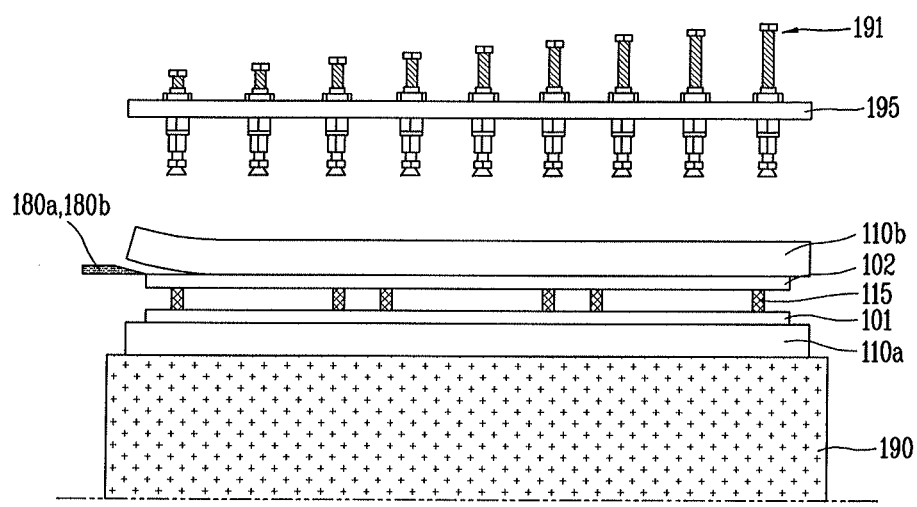
Figure 16D:
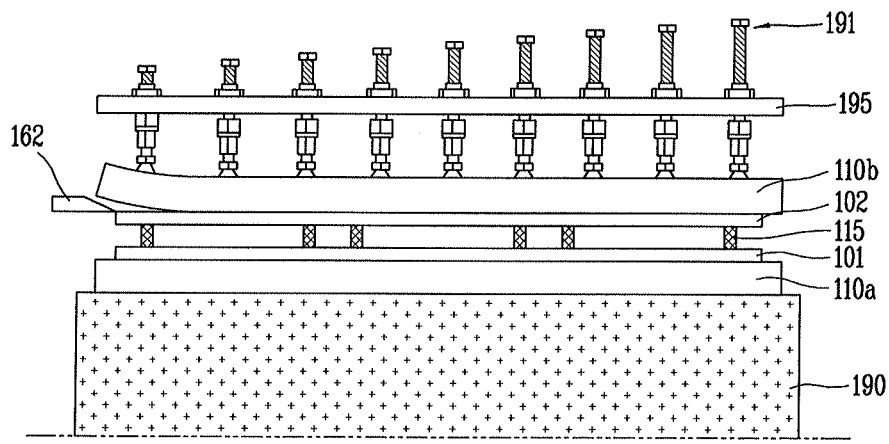
Figure 16E:
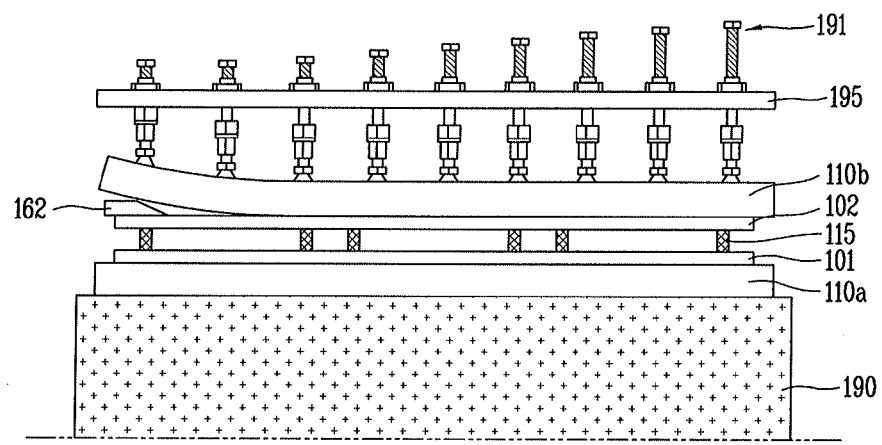
Figure 16F:
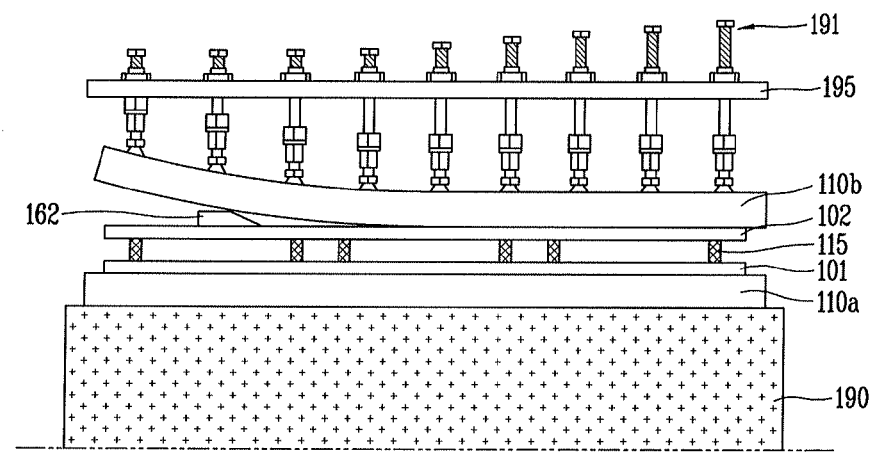
Figure 16G:
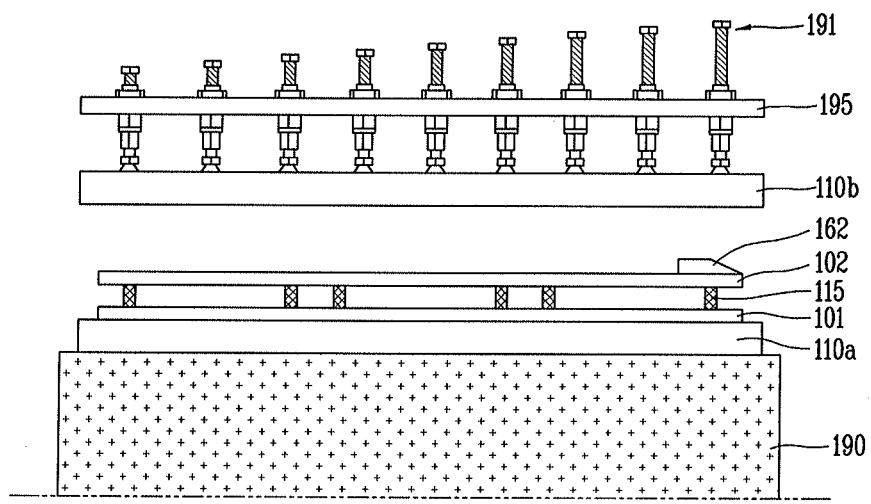
Figure 16H:
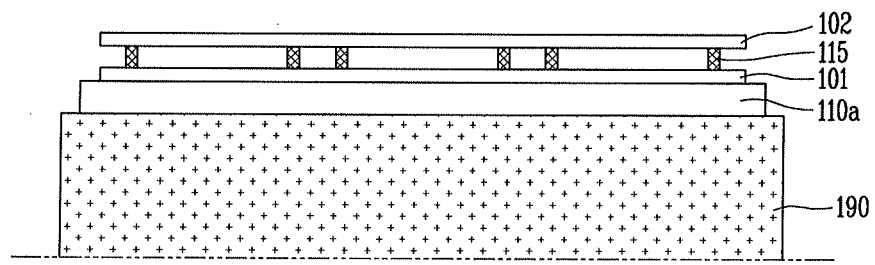
Figure 16I:
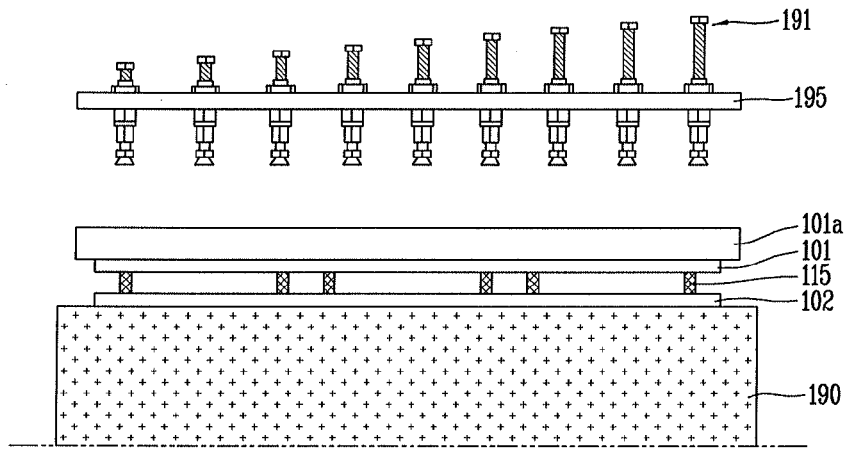
Figure 16J:
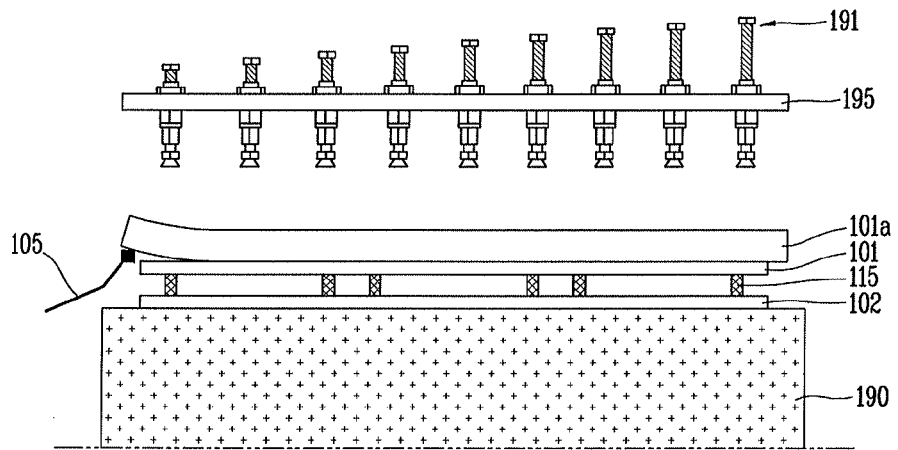
Figure 16K:
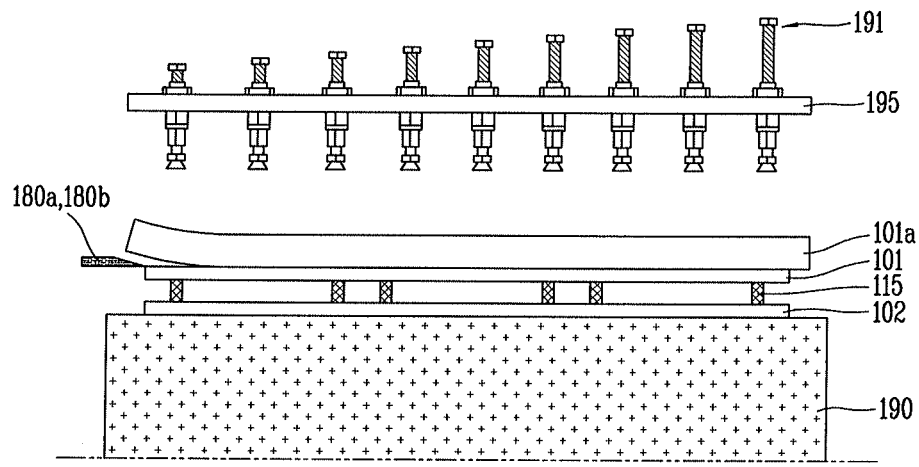
Figure 16L:
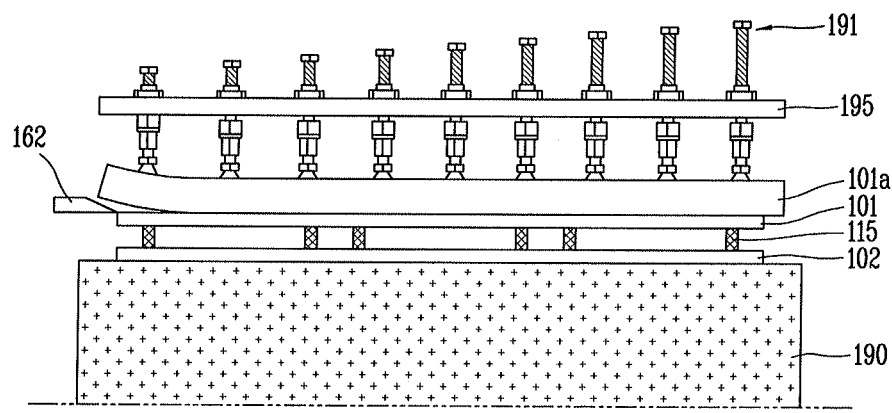
Figure 16M:
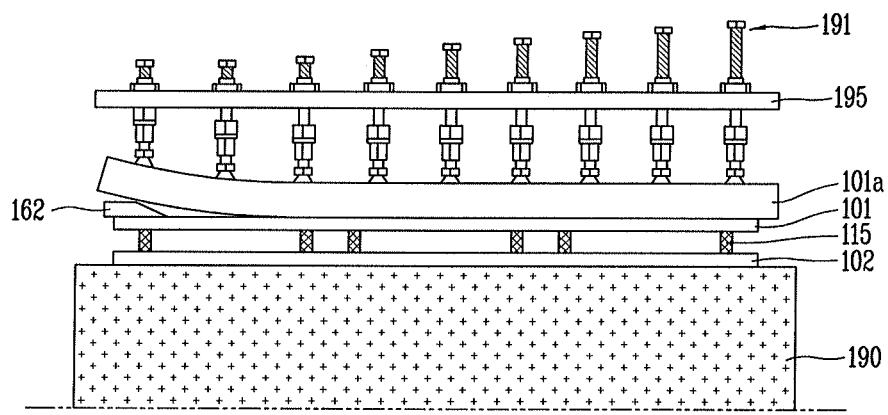
Figure 16N:
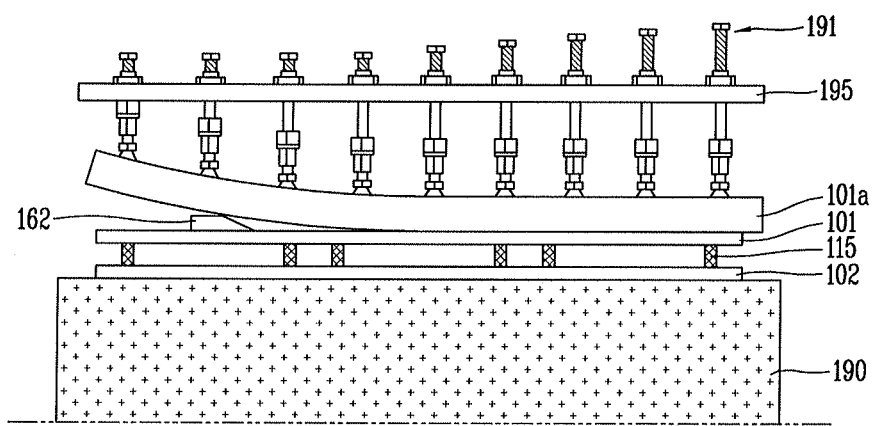
Figure 16O:
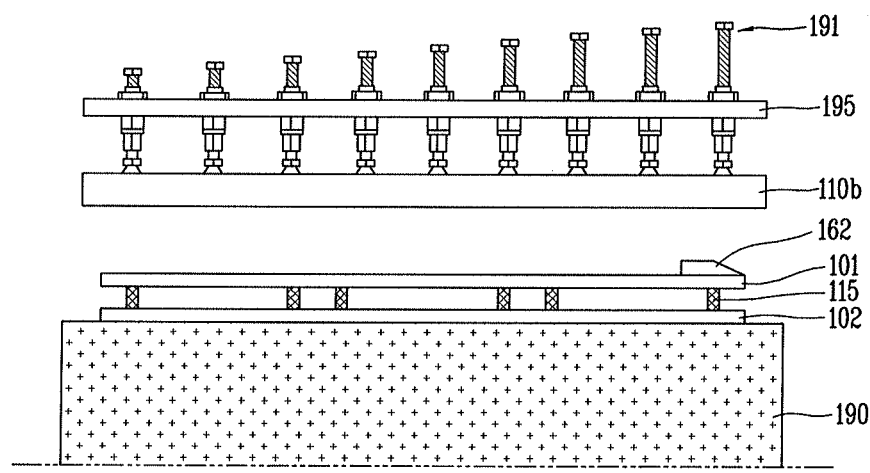
Figure 16P:
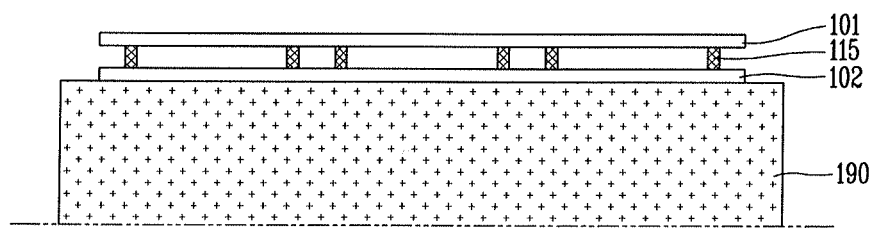

FIGS. 16A to 16P are exemplary views sequentially illustrating the process of separating the auxiliary substrate in the method according to the first exemplary embodiment.

As shown in FIG. 16A, the first and second auxiliary substrates 110a and 110b are necessarily separated from the respective first and second mother substrates 101 and 102 attached through the processes described above for the purpose of subsequent process. To this end, the attached first and second mother substrates 101 and 102 are loaded onto a table 190 of the detaching apparatus (S111).

In this case, the attached first and second mother substrates 101 and 102 may be in a state in which the second mother substrate 102 having the color filter substrates formed thereon is stacked on the first mother substrate 101 having the TFT array substrates formed thereon. However, the present disclosure is not limited thereto, and the attached first and second mother substrates 101 and 102 may be in a state in which the first mother substrate 101 having the TFT array substrates formed thereon is stacked on the second mother substrate 102 having the color filter substrates formed thereon.

In this case, the first mother substrate 101 having the TFT array substrates formed thereon and the second mother substrate 102 having the color filter substrates formed thereon may be configured with the thin glass substrates having a thickness of 0.1 t or 0.4 t. In this case, the first and second auxiliary substrates 110a and 110b having a thickness of about 0.3 t to 0.7 t, on which a predetermined plasma treatment is performed or a predetermined concave-convex pattern is formed, may be attached to the first and second mother substrates 101 and 102, respectively. However, the present disclosure is not limited to the thickness of the first and second mother substrates 101 and 102 and the first and second auxiliary substrates 110a and 110b.

The attachment of the first or second mother substrate 101 or 102 and the first or second auxiliary substrate 110a or 110b may be performed by contacting the two substrates 101 and 110a or 102 and 110b with each other under a vacuum state. In this case, the attachment force between the two substrates 101 and 110a or 102 and 110b may be derived from an electrostatic force, vacuum force, surface tension, etc.

In this case, the first and second mother substrates 101 and 120 are loaded onto the table 190, for example, so that the second auxiliary substrate 110b to be separated faces upward, and a vacuum pad unit including a plurality of vacuum pads 191 and a vacuum pad plate 195 for supporting the plurality of vacuum pads 191 is mounted above the loaded first and second mother substrates 101 and 102.

The configuration of the detaching apparatus will be described in detail with reference to FIG. 11. The detaching apparatus may include first and second knives 180a and 180b respectively positioned at the left and right (or front and rear ends) of the table 190 so as to separate the first and second auxiliary substrates 110a and 110b, and an air knife 162 disposed long in the longitudinal direction between the first and second knives 180a and 180b.

In addition, the detaching apparatus may include a linear motion (LM) guide 163 for the rectilinear motion of the first and second knives 180a and 180b and the air knife 162, a servo motor 164 positioned at one side of the table 190 so as to transmit power, and a cable veyor 165.

Although not shown in this figure, the detaching apparatus may further include an alignment unit for performing alignment between the vacuum pad unit and the first and second mother substrates 101 and 102 loaded onto the table, a vacuum pad transfer unit for vertically moving the vacuum pad unit, a vacuum chuck for fixing the aligned first and second mother substrates 101 and 102, etc.

The first and second mother substrates 101 and 102 loaded onto the table 190 of the detaching apparatus configured as described above are aligned with the upper vacuum pad unit through the alignment unit described above (S112).

Next, as shown in FIG. 16B, a knife entry space is formed between the second auxiliary substrate 110b and the thin glass substrate, i.e., the second mother substrate 102 by upwardly pressing a push pin region exposed at a corner of the second auxiliary substrate 110b with a predetermined pressure, using the push pin 105 having a triangular shape, a combined shape of a circle and a triangle, a rectangular shape or a circular shape (S113-1).

Next, as shown in FIG. 16C, the edge portion between the second auxiliary substrate 110b and the second mother substrate 102 is detached by entering the first and second knives 180a and 180b into the corner space between the second auxiliary substrate 110b and the second mother substrate 102, i.e., the knife entry space, and moving the first and second knives 180a and 180b from one direction to the other direction, so that an entry space for the air knife is secured (S113-2 and S113-3).

In this case, air is sprayed through air holes provided with the first and second knives 180a and 180b while moving the first and second knives 180a and 180b, so that the entry space for the air knife can be smoothly secured.

The air holes may be installed in the first and second knives 180a and 180b, or may be installed separately from the first and second knives 180a and 180b.

The configuration of the first or second knife 180a or 180b will be described in detail with reference to FIGS. 12A and 12B. Each of the first and second knives 180a and 180b includes a knife blade 181 having a thickness of about 0.1 t, a body 182 for holding the knife blade 181, and an extending portion extended from the body 182 so as to surround a pipe 184.

In this case, the pipe 184 is a path along which the injected air moves, and the air moved into the body 182 through the pipe 184 is sprayed through a plurality of air holes 187 formed in a lower surface of the body 182 via an air pipe 185. In FIGS. 12A and 12B, a case where the air holes 187 are formed in the lower surface of the body 182 is shown as an example, but the present disclosure is not limited thereto. That is, the air holes 187 may be formed in on side surface of the body 182.

The knife blade 181 is fixed to an upper surface of the body 182 by a predetermined bolt 186, and the shape of the knife blade 181, as shown in FIGS. 13A to 13D, may be formed in various shapes such as a rectangular shape, a diagonal shape, a triangular shape and a circular shape.

The knife blade 181 may be formed of not only metal such as steel use stainless (SUS) but also plastic such as polyethylene terephthalate (PET) or high density poly ethylene (HDPE).

The process of detaching edge portions using the first and second knives configured as described above may be performed in an order shown in FIG. 14 or 15. However, the present disclosure is not limited to the order of the detaching process, shown in FIG. 14 or 15.

FIG. 14 will be described as an example. In a case where two knives are respectively mounted at the left and right of a front end of the table 190, one edge portion between the second auxiliary substrate and the second mother substrate is detached by moving one of the two knives in a longitudinal direction (direction ①) of the table 190, and the moved knife is returned to the original position. Then, upper and lower edge portions are respectively detached by moving the two knives in lateral directions (directions ② and ③) of the table 190, and the moved knives are respectively returned to the original directions. Alternatively, FIG. 15 will be described as an example. In a case where two knives are respectively mounted at front and rear ends of the table 190, left and right edge portions between the second auxiliary substrate and the second mother substrate are respectively detached by moving the knives at the front and rear ends in longitudinal directions (directions ① and ①') of the table, and the moved knives are respectively returned to the original positions. Then, the upper and lower edge portions are respectively detached by moving the two knives by half in lateral directions (directions ② or ②' and ③ or ③') of the table 190, and the moved knives are respectively returned to the original positions.

After the edge portions between the second auxiliary substrate and the second mother substrate are detached using the knives, the vacuum pads 191 are attached to the surface of the second auxiliary substrate 110b by descending the vacuum pad plate 195 and actuating the vacuum of the vacuum pads 191.

Subsequently, as shown in FIGS. 16D to 16H, the detachment of the second auxiliary substrate 110b is performed by entering the air knife 162 into the space formed between the second auxiliary substrate 110b and the second mother substrate 102 while sequentially ascending the vacuum pad plate 195 by 10 mm, 20 mm, . . . and spraying air into the space formed between the second auxiliary substrate 110b and the second mother substrate 102 (S113-4). However, the present disclosure is not limited to the detaching method of the second auxiliary substrate 110b, described above.

Subsequently, as shown in FIG. 16I, the first and second mother substrates 101 and 102 having the second substrate 110b separated from the second mother substrate 102 are vertically reversed and then loaded onto the table 190 of the detaching apparatus.

That is, the first and second mother substrates 101 and 102 are loaded onto the table 190 so that the first auxiliary substrate 110a to be separated faces upward, and the vacuum pad unit described above is mounted above the loaded first and second mother substrates 101 and 102.

The first and second mother substrates 101 and 102 loaded onto the table 190 of the detaching apparatus are aligned with the upper vacuum pad unit through the alignment unit described above (S115).

Subsequently, as shown in FIG. 16J, a knife entry space is formed between the first auxiliary substrate 110a and the thin glass substrate, i.e., the first mother substrate 101 by upwardly pressing a push pin region exposed at a corner of the first auxiliary substrate 110a with a predetermined pressure, using the push pin 105 (S116-1).

Next, as shown in FIG. 16K, the edge portion between the first auxiliary substrate 110a and the first mother substrate 101 is detached by entering the first and second knives 180a and 180b into the corner space between the first auxiliary substrate 110a and the first mother substrate 101, i.e., the knife entry space, and moving the first and second knives 180a and 180b from one direction to the other direction, so that an entry space for the air knife is secured (S116-2 and S116-3).

In this case, air is sprayed through air holes provided with the first and second knives 180a and 180b while moving the first and second knives 180a and 180b, so that the entry space for the air knife can be smoothly secured.

As described above, the air holes may be installed in the first and second knives 180a and 180b, or may be installed separately from the first and second knives 180a and 180b.

The process of detaching edge portions using the first and second knives configured as described above may be performed in an order shown in FIG. 14 or 15. However, the present disclosure is not limited to the order of the detaching process, shown in FIG. 14 or 15.

As described above, FIG. 14 will be described as an example. In a case where two knives are respectively mounted at the left and right of a front end of the table 190, one edge portion between the first auxiliary substrate and the first mother substrate is detached by moving one of the two knives in a longitudinal direction (direction ①) of the table 190, and the moved knife is returned to the original position. Then, upper and lower edge portions are respectively detached by moving the two knives in lateral directions (directions ② and ③) of the table 190, and the moved knives are respectively returned to the original directions. Alternatively, FIG. 15 will be described as an example. In a case where two knives are respectively mounted at front and rear ends of the table 190, left and right edge portions between the first auxiliary substrate and the first mother substrate are respectively detached by moving the knives at the front and rear ends in longitudinal directions (directions ① and ①') of the table, and the moved knives are respectively returned to the original positions. Then, the upper and lower edge portions are respectively detached by moving the two knives by half in lateral directions (directions ② or ②' and ③ or ③') of the table 190, and the moved knives are respectively returned to the original positions.

After the edge portions between the first auxiliary substrate and the first mother substrate are detached using the knives, the vacuum pads 191 are attached to the surface of the first auxiliary substrate 110a by descending the vacuum pad plate 195 and actuating the vacuum of the vacuum pads 191.

Subsequently, as shown in FIGS. 16L to 16P, the detachment of the first auxiliary substrate 110a is performed by entering the air knife 162 into the space formed between the first auxiliary substrate 110a and the first mother substrate 101 while sequentially ascending the vacuum pad plate 195 by 10 mm, 20 mm, . . . and spraying air into the space formed between the first auxiliary substrate 110a and the first mother substrate 101 (S116-4). However, the present disclosure is not limited to the detaching method of the first auxiliary substrate 110a, described above.

In the method according to the first exemplary embodiment, the edge portions between the thin glass substrate and the auxiliary substrate are detached using the knives, and the air is sprayed between the thin glass substrate and the auxiliary substrate through the air knife, so that the auxiliary substrate can be easily separated from the liquid crystal panel in the cell state, which is attached through the attachment process. As a result, the processes can be stably performed, thereby improving the price competitiveness of the LCD.

Moreover, in the method according to the first exemplary embodiment, the shape of the push pin for forming the point at which the detachment of the edge portions of the auxiliary substrate is started in the separation of the auxiliary substrate is optimized, thereby improving the success rate of the push pin application process. As a result, the damage of the thin glass substrate and the auxiliary substrate can be reduced in the detachment of the auxiliary substrate.

Meanwhile, in the first exemplary embodiment, the detachment of the edge portion is performed through the movement of the knives before the auxiliary substrate is detached from the mother substrate through the vacuum pad unit and the air knife, so that it is possible to physically remove a foreign matter existing on side surfaces between the auxiliary substrate and the thin glass substrate. For reference, in a case where the detachment of the auxiliary substrate using the air knife is performed in the state in which the detachment of the edge portion using the knives is not performed, the curvature of the auxiliary substrate is increased due to strong air spray for the detachment, and therefore, it is highly likely that the substrates may be damaged.

In this case, if the foreign matter is not removed but remains before the detachment of the auxiliary substrate, the substrates, particularly the thin glass substrate may be damaged in the process of detaching the auxiliary substrate from the mother substrate through the vacuum pad unit and the air knife. That is, the foreign matter is a solution used in the color filter process, the array process or the cell process. Here, the solution penetrating between the auxiliary substrate and the thin glass substrate is not removed but remains. The foreign matter acts as an adhesive for allowing the auxiliary substrate and the mother substrate to be adhered to each other. Since the adhesive force of the foreign matter is stronger than the electrostatic attachment force, an inequality point between the forces is formed in the detachment of the auxiliary substrate, and therefore, the thin glass substrate may be damaged.

Accordingly, as another method in addition to the method of physically removing the foreign matter using the knives, in a second exemplary embodiment, the foreign matter attached between the auxiliary substrate and the thin glass substrate is previously removed using laser, thin film or liquid nitrogen, so that it is possible to eliminate a failure caused by the foreign matter in the detachment of the auxiliary substrate. This will be described in detail with reference to the accompanying drawing.

Figure 17:
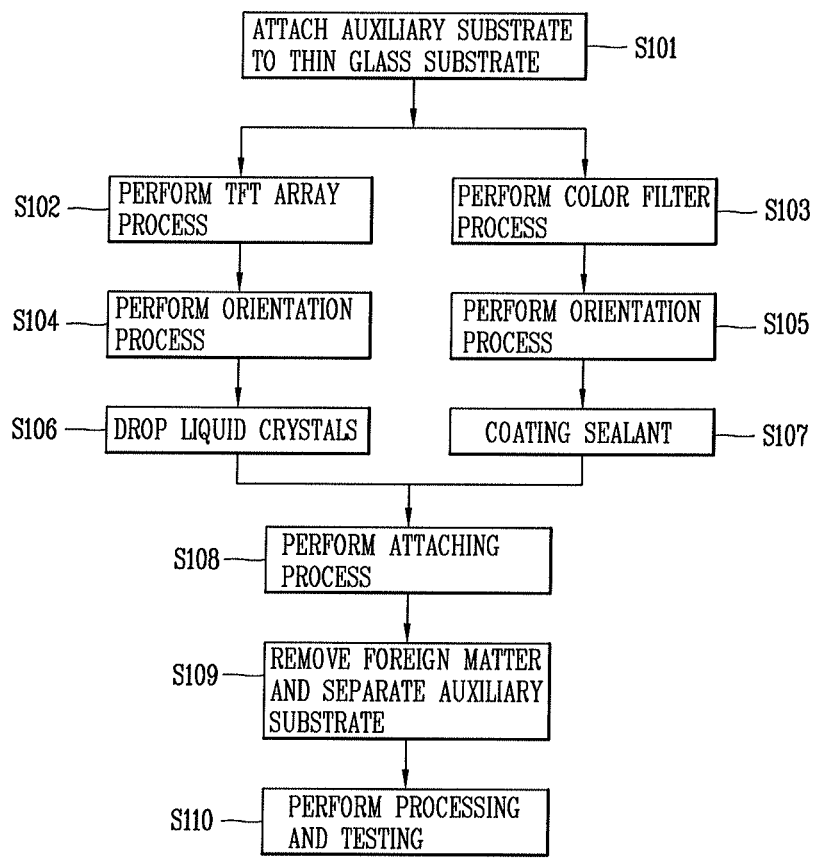
FIG. 17 is a flowchart schematically illustrating a method of fabricating a lightweight and thin LCD according to a second exemplary embodiment.

FIG. 17 is a flowchart schematically illustrating a method of fabricating a lightweight and thin LCD according to a second exemplary embodiment.

In FIG. 17, the method when a liquid crystal layer using the liquid crystal dropping method described above is shown as an example. However, the present disclosure is not limited thereto, and may be applied to the method when a liquid crystal layer is formed using the liquid crystal injection method.

The process of fabricating the LCD can be divided into a driving element array process of forming a driving element on a lower array substrate, a color filter process of forming a color filter on an upper color filter substrate, and a cell process.

As described above, the array process, the color filter process and the cell process are performed using a thin glass substrate having a thickness of about 0.1 t to 0.4 t. In this case, the processes are performed by attaching an auxiliary substrate to the thin glass substrate, so that it is possible to minimize warping of the thin glass substrate and to prevent breakdown of the thin glass substrate in a movement of the thin glass substrate.

First, before a thin glass substrate having a thickness of 0.1 t to 0.4 t is introduced into the processing line including the array process and the color filter process, an auxiliary substrate having a thickness of about 0.3 t to 0.7 t is attached to the thin glass substrate having the thickness of 0.1 t to 0.4 t (S201). However, the present disclosure is not limited to the thickness of the thin glass substrate and the auxiliary substrate.

The attachment of the thin glass substrate and the auxiliary substrate may be performed by contacting the two substrates with each other under a vacuum state. In this case, the attachment force between the two substrates may be derived from an electrostatic force, vacuum force, surface tension, etc.

In this case, the attachment force between the thin glass substrate and the auxiliary substrate is reduced by plasma-treating the auxiliary substrate using fluorine, etc. or by forming a concavo-convex pattern on the auxiliary substrate, so that the auxiliary substrate can be easily detached from the thin glass substrate. However, the present disclosure is not limited to the aforementioned method of attaching the auxiliary substrate to the thin glass substrate, and the auxiliary substrate may be attached to the thin glass substrate under a vacuum state without an adhesive or surface treatment. In this case, the two substrates may be attached together by an electrostatic force, vacuum force, van der Waals force, surface tension, etc.

After the auxiliary substrate is attached to the thin glass substrate, a plurality of gate, a plurality of data lines and TFTs are formed on an array substrate, to which the auxiliary substrate described above is attached, through an array process (S202). Here, the gate and data lines are arranged on the array substrate so as to define pixel regions, and the TFT as a driving element is connected to the gate and data lines in each pixel region. Through the array process, pixel electrodes are formed on the array substrate. Here, the pixel electrode is connected to the TFT so as to drive a liquid crystal layer as a signal is applied to the pixel electrode through the TFT.

Further, a color filter layer and a common electrode are formed on a thin glass substrate for a color filter substrate (hereinafter, referred to as a color filter substrate for convenience of illustration), to which the auxiliary substrate described above is attached, through a color filter process (S203). Here, the color filter layer is configured with red, green and blue sub-color filters for implementing colors. In a case where the IPS mode LCD is fabricated, the common electrode is formed on the array substrate on which the pixel electrodes are formed through the array process.

Subsequently, orientation layers are respectively printed on the color filter substrate and the array substrate, and a rubbing treatment is then performed on the orientation layers so as to provide an anchoring force or surface fixing force (i.e., pretilt angle and orientation direction) to liquid crystal molecules of the liquid crystal layer formed between the color filter substrate and the array substrate (S204 and S205).

A predetermined sealing pattern is formed on the rubbing-treated color filter substrate by coating a sealant on the color filter substrate, and simultaneously, the liquid crystal layer is formed by dropping liquid crystals on the array substrate (S206 and S207).

Meanwhile, the color filter substrate and the array substrate are formed on large-area mother substrates, respectively. In other words, a plurality of panel regions on each large-scale mother substrate, and a TFT as a driving element or color filter layer is formed in each panel region.

In this case, the dropping method is a method of dropping or dispensing liquid crystals, using a dispenser, in an image display region of a large-area first mother substrate having a plurality of array substrates arranged thereon or a large-area second mother substrate having a plurality of color filter substrates arranged thereon, and allowing the liquid crystals to be equally distributed over the entire image display region by pressure for attaching together the first and second mother substrates.

Therefore, in a case where the liquid crystal layer is formed in the liquid crystal panel using the dropping method, a seal pattern is necessarily formed in a closed pattern surrounding the outline of the image display region so as to prevent the liquid crystals from leaking to the outside of the image display region.

In the dropping method, the liquid crystals can be dropped for a short time as compared with the vacuum injection method, and the liquid crystal layer can be very quickly formed even when the size of the liquid crystal panel becomes large. Since only the required quantity of liquid crystals is dropped on the first mother substrate, it is possible to prevent an increase in unit cost of the liquid crystal panel due to the disuse of high-priced liquid crystals in the vacuum injection method, thereby improving price competitiveness.

Subsequently, the first and second mother substrates are attached together by the sealant by applying the pressure in the state in which the first and second mother substrates are aligned, and simultaneously, the liquid crystals dropped through the application of the pressure are equally distributed over the entire liquid crystal panel (S208). Through such a process, a plurality of liquid crystal panels each having the liquid crystal layer formed therein are formed on the first and second mother substrates, and the large-area first and second mother substrates each having the plurality of liquid crystal panels formed thereon are separated from the auxiliary substrate. Then, the mother substrate is separated into a plurality of liquid crystal panels through a processing and cutting process, and each liquid crystal panel is tested, thereby fabricating an LCD (S209 and S210).

In the second exemplary embodiment, a foreign matter existing on side surfaces between the auxiliary substrate and the thin glass substrate is removed using laser, thin film or liquid nitrogen before the auxiliary substrate is detached from the thin glass substrate. After the foreign matter is removed, the auxiliary substrate is separated from the liquid crystal panel using the substantially same method as the first exemplary embodiment. Hereinafter, the process of removing the foreign matter and separating the auxiliary substrate will be described in detail with the accompanying drawings.

Figure 18:
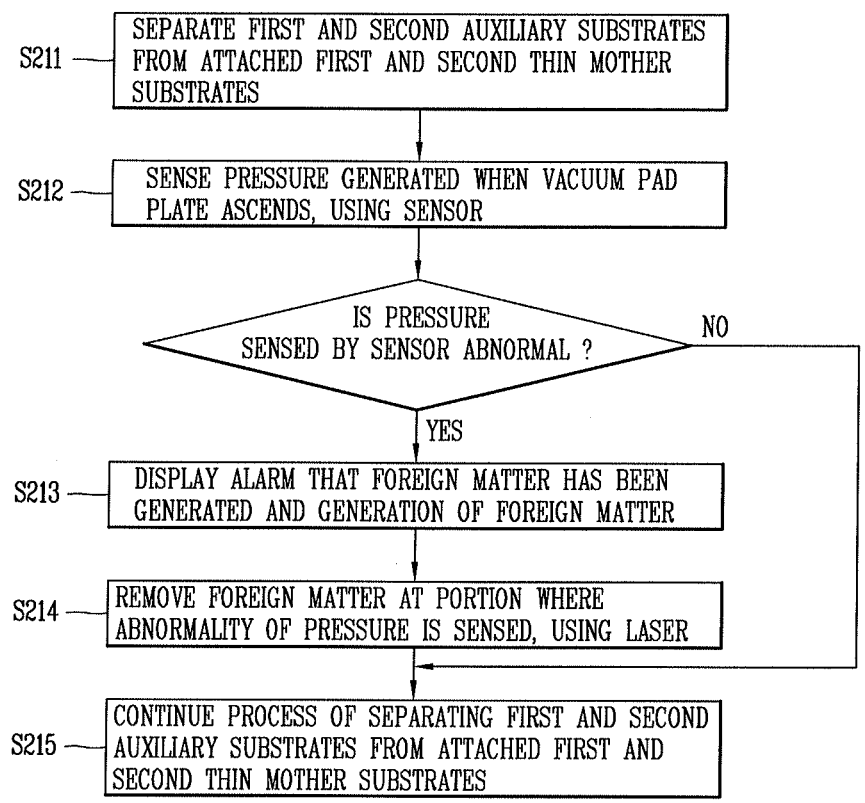
FIG. 18 is an exemplary flowchart sequentially illustrating a process of removing a foreign matter and separating an auxiliary substrate in the method according to the second exemplary embodiment shown in FIG. 17.

FIG. 18 is an exemplary flowchart sequentially illustrating a process of removing a foreign matter and separating an auxiliary substrate in the method according to the second exemplary embodiment shown in FIG. 17. Since the detaching method of lifting the auxiliary substrate is sequentially performed from any one portion of the substrates to the entire substrates, a portion at which pressure suddenly increases is detected by sensing the force for lifting the auxiliary substrate, i.e., the pressure using a sensor, and a foreign matter at the portion is removed.

That is, when the vacuum pad or vacuum pad plate ascends in the process of separating the first and second auxiliary substrates from the attached first and second mother substrates, pressure according to the ascent of the vacuum pad or vacuum pad plate is sensed by the sensor (S211 and S212). In this case, the pressure is sensed along the detaching direction by the sensor.

In this case, it is decided whether the pressure sensed by the sensor is abnormal. In a case where the pressure sensed by the sensor is abnormal, an alarm that the foreign matter has been generated and the generation of the foreign matter are displayed on a monitor, etc. (S213). The portion at which the pressure sensed by the sensor is abnormal is a portion at which the adhesive force is strong by the foreign matter as an inequality point between forces in the detachment of the auxiliary substrate.

In a case where the foreign matter is generated, the foreign matter existing at the portion where the abnormality of the pressure is sensed by the sensor is removed (S214).

After the foreign matter is removed, the process of separating the first and second auxiliary substrates from the attached first and second mother substrates is continued (S215).

Figure 19:
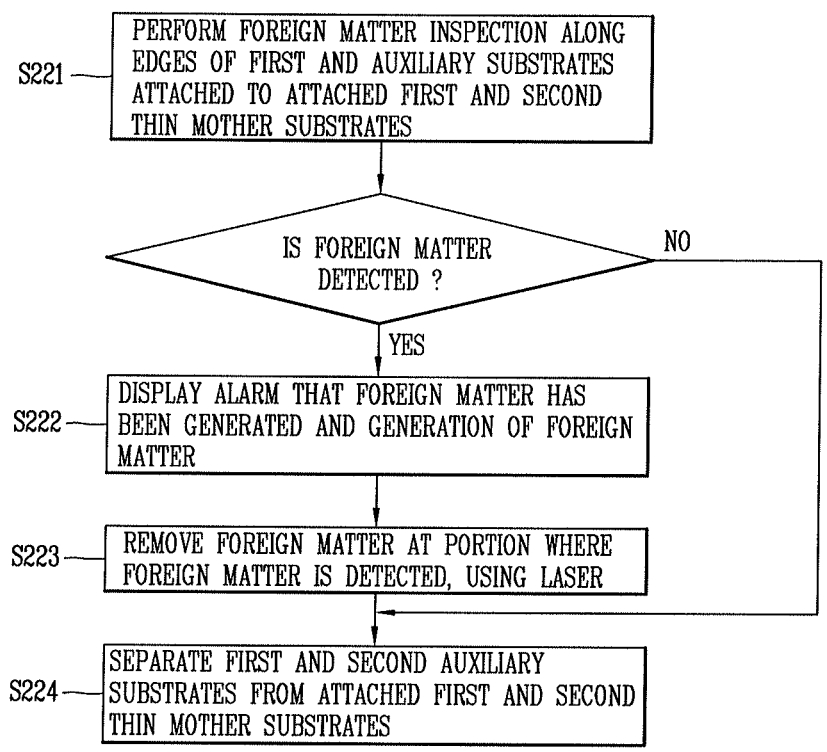
FIG. 19 is another exemplary flowchart sequentially illustrating a process of removing a foreign matter and separating an auxiliary substrate in the method according to the second exemplary embodiment shown in FIG. 17.

FIG. 19 is another exemplary flowchart sequentially illustrating a process of removing a foreign matter and separating an auxiliary substrate in the method according to the second exemplary embodiment shown in FIG. 17, in which before the detachment of the auxiliary substrate is performed, foreign matter inspection is performed along attached edges using an inspector, and a foreign matter is immediately removed at a portion where a foreign matter is generated.

To this end, foreign inspection is performed along edges of the first and second auxiliary substrates attached to the attached first and second mother substrates through a predetermined inspector (S221).

In a case where a foreign matter is generated, an alarm that the foreign matter has been generated and the generation of the foreign matter are displayed on a monitor, etc. (S222). Then, the foreign matter is removed using laser, and the process of inspecting and removing the foreign matter is performed on all surfaces of the attached edges (S223).

After the removal of the foreign matter is completed, the process of separating the first and second auxiliary substrates from the attached first and second mother substrates is performed (S224).

Figure 20:
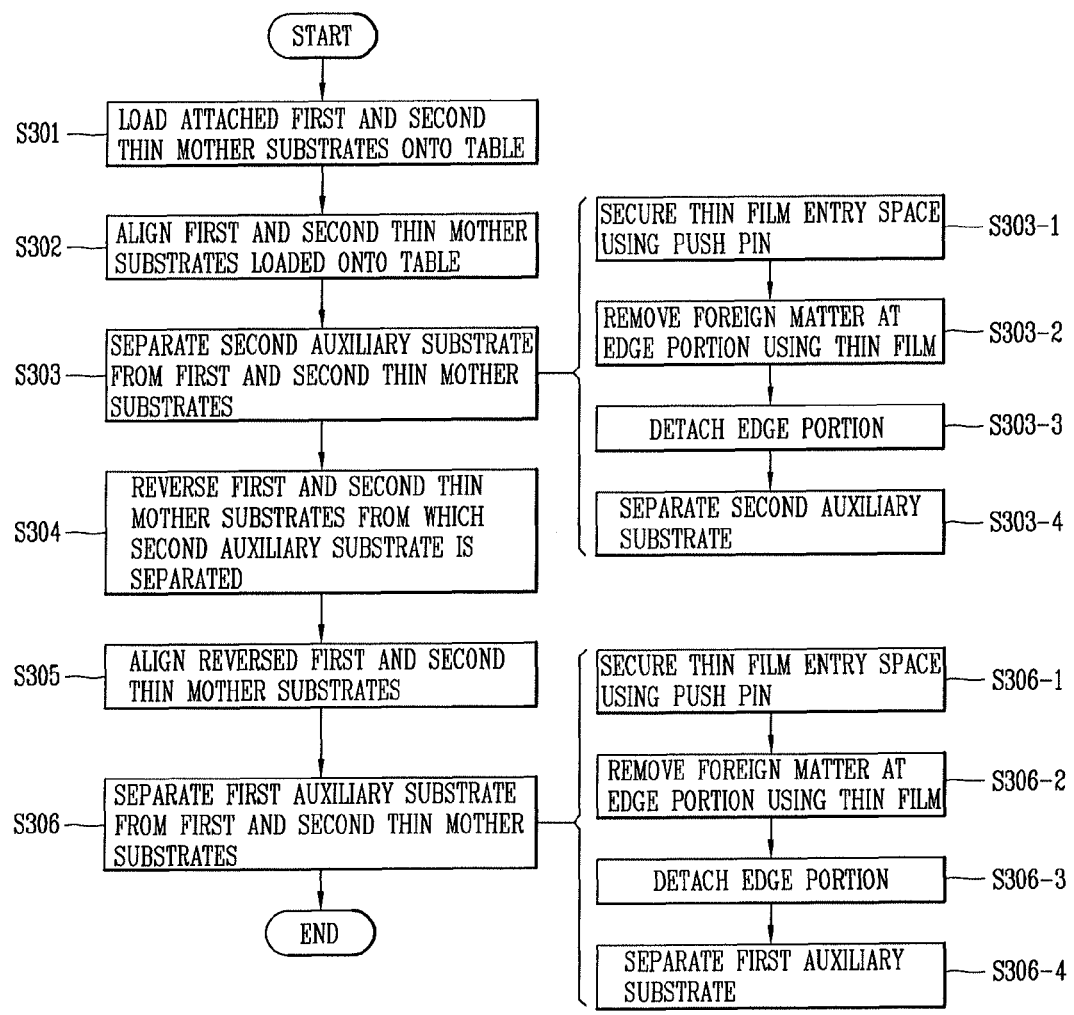
FIG. 20 is still another exemplary flowchart sequentially illustrating a process of removing a foreign matter and separating an auxiliary substrate in the method according to the second exemplary embodiment shown in FIG. 17.

FIG. 20 is still another exemplary flowchart sequentially illustrating a process of removing a foreign matter and separating an auxiliary substrate in the method according to the second exemplary embodiment shown in FIG. 17, in which a foreign matter existing between the first and second auxiliary substrates and the first and second mother substrates is removed using a thin film, and simultaneously, edge portions between the first and second auxiliary substrates and the first and second mother substrates are detached.

First, the first and second mother substrates attached together through the processes described above are loaded on the table of the detaching apparatus (S301).

As described above, the attached first and second mother substrates may be in a state in which the second mother substrate having the color filter substrates formed thereon is stacked on the first mother substrate having the TFT array substrates formed thereon. However, the present disclosure is not limited thereto, and the attached first and second mother substrates may be in a state in which the first mother substrate having the TFT array substrates formed thereon is stacked on the second mother substrate having the color filter substrates formed thereon.

In this case, the first mother substrate having the TFT array substrates formed thereon and the second mother substrate having the color filter substrates formed thereon may be configured with the thin glass substrates having a thickness of 0.1 t or 0.4 t. In this case, the first and second auxiliary substrates having a thickness of about 0.3 t to 0.7 t, on which a predetermined plasma treatment is performed or a predetermined concave-convex pattern is formed, may be attached to the first and second mother substrates, respectively. However, the present disclosure is not limited to the thickness of the first and second mother substrates and the first and second auxiliary substrates.

In this case, the first and second mother substrates are loaded onto the table, for example, so that the second auxiliary substrate to be separated faces upward.

The first and second mother substrates loaded onto the table of the detaching apparatus as described above are aligned with the detaching apparatus through the alignment unit (S302).

Next, a thin film entry space is formed between the second auxiliary substrate and the thin glass substrate, i.e., the second mother substrate by upwardly pressing a push pin region exposed at a corner of the second auxiliary substrate with a predetermined pressure, using the push pin (S303-1). However, the present disclosure is not limited thereto, and the process of forming the thin film entry space may not be performed.

Next, the foreign matter existing between the second auxiliary substrate and the second mother substrate is removed by entering a thin film having a thickness of 0.001 mm to 1.0 mm into the corner space between the second auxiliary substrate and the second mother substrate, i.e., the thin film entry space, and moving the thin film from one direction to the other direction, and simultaneously, the edge portion between the second auxiliary substrate and the second mother substrate is detached (S303-2 and S303-3). However, the present disclosure is not limited thereto, and only the process of removing the foreign matter may be performed.

In order to minimize damage such as scratch with respect to the substrates made of glass, the thin film may be made of a material such as polyethylene terephthalate (PET), polyvinyl chloride (PVC), polyethylene (PE), polycarbonate (PC), low density polyethylene (LDPE), high density polyethylene (HDPE) or ethylene vinyl acetate (EVA), which has a Mohs solidity of 3 or less.

In a case where a physical force is applied to the thin film, the thin film penetrates between the substrates so that the auxiliary substrate is separated from the mother substrate. Since the thin film comes in surface contact with the substrates, vertical shaking is decreased in the detachment of the auxiliary substrate, and thus impact applied to the substrates will be reduced.

In this case, air is sprayed through an air hole provided in the thin film while moving the thin film, so that the process of removing the foreign matter and detaching the edge portion can be smoothly performed.

The air hole may be formed in the thin film or may be formed separately from the thin film.

After, the foreign matter existing between the second auxiliary substrate and the second mother substrate is removed using the thin film, and simultaneously, the edge portion is detached, the detachment of the second auxiliary substrate is performed using the thin film and air spray (S303-4). In a case where only the thin film is used, a strong force is required to perform the detachment, and therefore, the substrates may be damaged. Thus, the air spray is performed together with the thin film, so that it is possible to minimize the damage of the substrates and to increase a detaching speed. In this case, the thin film primarily separates the second auxiliary substrate from the second mother substrate, and the air spray secondarily promotes the separation of the second auxiliary substrate. Hence, the pressure generated by the air spray can be used less than that in the first embodiment described above. Thus, the curvature of the second auxiliary substrate for securing an air path can be increased, and the probability of damage of the substrates due to the inequality of alignment can be lowered. However, the present disclosure is not limited to the detaching method using the thin film.

Subsequently, the first and second mother substrates having the second auxiliary substrate separated therefrom is vertically reversed, and the reversed first and second mother substrates is then loaded onto the table of the detaching apparatus (S304).

That is, the first and second mother substrates are loaded onto the table of the detaching apparatus so that the first auxiliary substrate faces upward.

The first and second mother substrates loaded onto the table of the detaching apparatus as described above are aligned with the detaching apparatus through the alignment unit described above (S305).

Subsequently, a thin film entry space is formed between the first auxiliary substrate and the thin glass substrate, i.e., the first mother substrate by upwardly pressing a push pin region exposed at a corner of the first auxiliary substrate with a predetermined pressure, using the push pin 105 described above (S306-1). However, the present disclosure is not limited thereto, and the process of forming the thin film entry space may not be performed.

Next, the foreign matter existing between the second auxiliary substrate and the second mother substrate is removed by entering the thin film having into the corner space between the first auxiliary substrate and the first mother substrate, i.e., the thin film entry space, and moving the thin film from one direction to the other direction, and simultaneously, the edge portion between the first auxiliary substrate and the first mother substrate is detached (S306-2 and S306-3). However, the present disclosure is not limited thereto, and only the process of removing the foreign matter may be performed.

In this case, air is sprayed through an air hole provided in the thin film while moving the thin film, so that the process of removing the foreign matter and detaching the edge portion can be smoothly performed.

The air hole may be formed in the thin film or may be formed separately from the thin film.

After, the foreign matter existing between the first auxiliary substrate and the first mother substrate is removed using the thin film, and simultaneously, the edge portion is detached, the detachment of the first auxiliary substrate is performed using the thin film and air spray (S306-4). In a case where only the thin film is used as described above, a strong force is required to perform the detachment, and therefore, the substrates may be damaged. Thus, the air spray is performed together with the thin film, so that it is possible to minimize the damage of the substrates and to increase a detaching speed. However, the present disclosure is not limited to the detaching method using the thin film.

Figure 21:
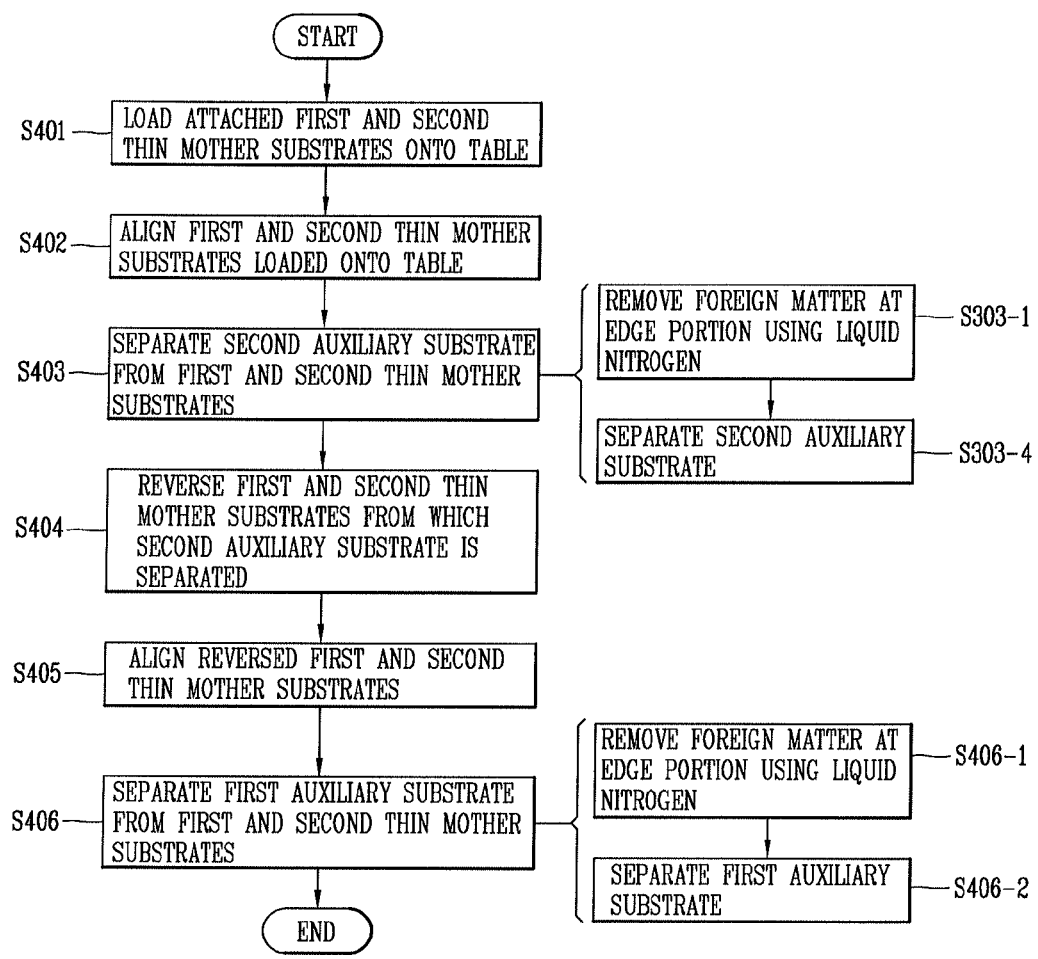
FIG. 21 is still another exemplary flowchart sequentially illustrating a process of removing a foreign matter and separating an auxiliary substrate in the method according to the second exemplary embodiment shown in FIG. 17.

FIG. 21 is still another exemplary flowchart sequentially illustrating a process of removing a foreign matter and separating an auxiliary substrate in the method according to the second exemplary embodiment shown in FIG. 17, in which the adhesive force of the foreign matter existing between the first and second auxiliary substrates and the first and second mother substrates is weakened by spraying liquid nitrogen.

First, the first and second mother substrates attached together through the processes described above are loaded on the table of the detaching apparatus (S401).

In this case, the first and second mother substrates are loaded onto the table, for example, so that the second auxiliary substrate to be separated faces upward.

The first and second mother substrates loaded onto the table of the detaching apparatus as described above are aligned with the detaching apparatus through the alignment unit (S402).

Next, the adhesive force of the existing foreign matter is weakened by spraying liquid nitrogen of −196° C. onto the front surface of the second auxiliary substrate or side surfaces between the second auxiliary substrate and the second mother substrate, and the detachment of the secondary auxiliary substrate is then performed using the thin film and air (S403-1 and S403-2).

In this case, the cooling material sprayed onto the front surface of the second auxiliary substrate or side surfaces between the second auxiliary substrate and the second mother substrate may include a cooling material such as dry ice of −78.5° C. which can cause thermal contraction stress to the foreign matter, as well as the liquid nitrogen.

In a case where the liquid nitrogen is sprayed between the first and second auxiliary substrates and the first and second mother substrates, both the substrates and the foreign matter are cooled and contracted. In this case, the thermal contraction coefficients of the substrates and the foreign matter are different from each other. Hence, stress is generated inside the foreign matter held between the substrates, and thus it can be expected that the adhesive force of the foreign matter with respect to the substrates will be weakened.

If the adhesive force of the foreign matter is weakened using the liquid nitrogen as described above, it is possible to prevent damage of the substrate in the detachment of the auxiliary substrate.

In a case where only the thin film is used in the detachment of the second auxiliary substrate as described above, a strong force is required to perform the detachment, and therefore, the substrates may be damaged. Thus, the air spray is performed together with the thin film, so that it is possible to minimize the damage of the substrates and to increase a detaching speed. However, the present disclosure is not limited to the detaching method using the thin film.

Subsequently, the first and second mother substrates having the second auxiliary substrate separated therefrom is vertically reversed, and the reversed first and second mother substrates is then loaded onto the table of the detaching apparatus (S404).

That is, the first and second mother substrates are loaded onto the table of the detaching apparatus so that the first auxiliary substrate faces upward.

The first and second mother substrates loaded onto the table of the detaching apparatus as described above are aligned with the detaching apparatus through the alignment unit described above (S405).

Subsequently, the adhesive force of the existing foreign matter is weakened by spraying a cooling material of −10° C. such as the liquid nitrogen or dry ice, which can cause thermal contraction stress to the foreign matter, onto the front surface of the first auxiliary substrate or side surfaces between the first auxiliary substrate and the first mother substrate, and the detachment of the first auxiliary substrate is then performed using the thin film and air (S406-1 and S406-2).

Figure 22:
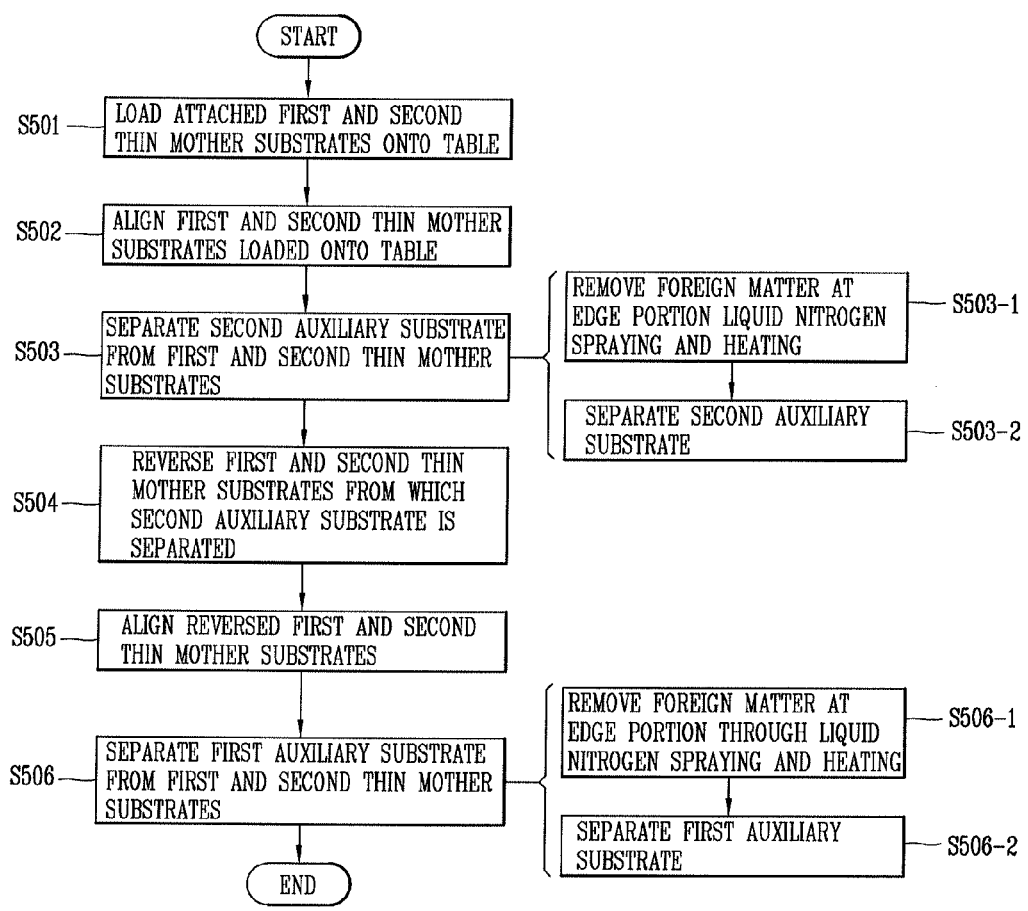
FIG. 22 is still another exemplary flowchart sequentially illustrating a process of removing a foreign matter and separating an auxiliary substrate in the method according to the second exemplary embodiment shown in FIG. 17.

FIG. 22 is still another exemplary flowchart sequentially illustrating a process of removing a foreign matter and separating an auxiliary substrate in the method according to the second exemplary embodiment shown in FIG. 17, in which the adhesive force of the foreign matter existing between the first and second auxiliary substrates and the first and second mother substrates is weakened by spraying liquid nitrogen and simultaneously applying heat.

First, the first and second mother substrates attached together through the processes described above are loaded on the table of the detaching apparatus (S501).

In this case, the first and second mother substrates are loaded onto the table, for example, so that the second auxiliary substrate to be separated faces upward.

The first and second mother substrates loaded onto the table of the detaching apparatus as described above are aligned with the detaching apparatus through the alignment unit (S502).

Next, the adhesive force of the existing foreign matter is weakened by spraying liquid nitrogen of −196° C. onto the front surface of the second auxiliary substrate or side surfaces between the second auxiliary substrate and the second mother substrate and simultaneously applying heat to its lower portion including the second mother substrate, and the detachment of the secondary auxiliary substrate is then performed using the thin film and air (S503-1 and S503-2).

In this case, the cooling material sprayed onto the front surface of the second auxiliary substrate or side surfaces between the second auxiliary substrate and the second mother substrate may include a cooling material such as dry ice of −78.5° C. which can cause thermal contraction stress to the foreign matter, as well as the liquid nitrogen. In addition, heat corresponding to the temperature ranging from normal temperature to 80° C. may be applied to the lower portion including the second mother substrate.

In a case where the liquid nitrogen is sprayed onto the first and second auxiliary substrates having the foreign matter, and simultaneously, the heat is applied to the lower portion, i.e., the first and second mother substrates, the first and second auxiliary substrates are cooled and contracted, and the first and second mother substrates are expanded. Hence, stress is generated inside the foreign matter held between the substrates, and thus it can be expected that the adhesive force of the foreign matter with respect to the substrates will be weakened.

In a case where only the thin film is used in the detachment of the second auxiliary substrate as described above, a strong force is required to perform the detachment, and therefore, the substrates may be damaged. Thus, the air spray is performed together with the thin film, so that it is possible to minimize the damage of the substrates and to increase a detaching speed. However, the present disclosure is not limited to the detaching method using the thin film.

Subsequently, the first and second mother substrates having the second auxiliary substrate separated therefrom is vertically reversed, and the reversed first and second mother substrates is then loaded onto the table of the detaching apparatus (S504).

That is, the first and second mother substrates are loaded onto the table of the detaching apparatus so that the first auxiliary substrate faces upward.

The first and second mother substrates loaded onto the table of the detaching apparatus as described above are aligned with the detaching apparatus through the alignment unit described above (S505).

Subsequently, the adhesive force of the existing foreign matter is weakened by spraying a cooling material of −10° C. such as the liquid nitrogen or dry ice, which can cause thermal contraction stress to the foreign matter, onto the front surface of the first auxiliary substrate or side surfaces between the first auxiliary substrate and the first mother substrate and simultaneously applying, to the first mother substrate, the heat corresponding to the temperature ranging from normal temperature to 80° C., and the detachment of the first auxiliary substrate is then performed using the thin film and air (S506-1 and S506-2).

Meanwhile, the detaching line for detaching the auxiliary substrate from the liquid crystal panel in the cell state, which is attached through the attachment process, is configured with one in-line, so that the detaching process can be quickly performed.

That is, the detaching line for detaching the auxiliary substrate from the liquid crystal panel in the cell state, which is attached through the attachment process, is configured with one in-line, so that it is possible to reduce fabrication cost and to simplify the fabrication process of the LCD. The detaching line includes a plurality of separate processing apparatuses. However, processes through the plurality of processing apparatuses are configured with the one consecutive in-line, and thus the detachment of the auxiliary substrate is consecutively performed without any pause.

Further, the whole processes including a reversing process for detaching an auxiliary substrate from one surface of the liquid crystal panel and then detaching another auxiliary substrate from the opposite surface of the liquid crystal panel can be automated, thereby improving efficiency and stability.

Hereinafter, the configuration of a processing line including a detaching line of an auxiliary substrate will be described in detail with reference to the accompanying drawings.

Figure 23:
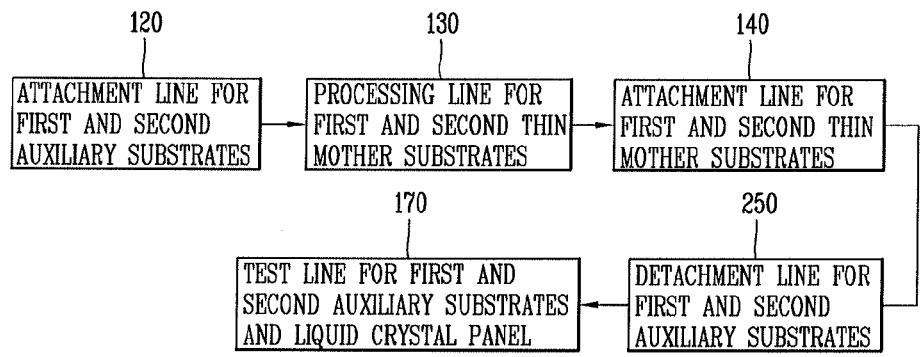
FIG. 23 is a view schematically illustrating the configuration of a processing line for fabricating a lightweight and thin LCD according to a first exemplary embodiment.

FIG. 23 is a view schematically illustrating the configuration of a processing line for fabricating a lightweight and thin LCD according to a first exemplary embodiment.

Figure 24:
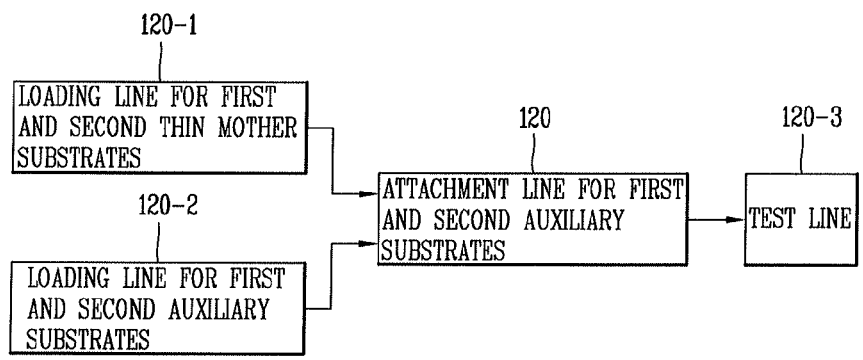
FIG. 24 is a view schematically illustrating the configuration of a substrate attachment line in the processing line according to the first exemplary embodiment shown in FIG. 23.

FIG. 24 is a view schematically illustrating the configuration of a substrate attachment line in the processing line according to the first exemplary embodiment shown in FIG. 23.

Referring to FIG. 23, the processing line according to the first exemplary embodiment may be configured to include an attachment line 120 for first and second auxiliary substrates, on which first and second auxiliary substrates are respectively attached to first and second mother substrates, a processing line 130 for first and second mother substrates, on which an array process and a color filter process are performed on each of the first and second mother substrates to which the respective first and second auxiliary substrates are attached, an attachment line 140 for first and second mother substrates, on which the first and second mother substrates, each on which the array process and the color filter process are performed, are attached together to face each other, a detachment line 150 for first and second auxiliary substrates, on which the first and second auxiliary substrates are respectively detached from the attached first and second mother substrates (hereinafter, referred to as a liquid crystal panel), and a test line 170 for first and second auxiliary substrates and liquid crystal panel, on which the detached first and second auxiliary substrates and the liquid crystal panel are tested.

Here, a loading line and a test line may be additionally configured before and after the attachment line 120. In this case, referring to FIG. 24, the substrate attachment line is configured to include a loading line 120-1 for first and second mother substrates, on which thin glass substrates having a thickness of about 0.1 t to 0.4 t are loaded as first and second mother substrates, a loading line 120-2 for first and second auxiliary substrates, on which auxiliary substrates made of glass having a thickness of about 0.3 t to 0.7 t are loaded as first and second auxiliary substrates, the attachment line 120 for first and second auxiliary substrates, on which the first and second auxiliary substrates loaded through the loading line 120-2 are respectively attached to the first and second mother substrates loaded through the loading line 120-1, and a test line 120-3 on which it is inspected whether attachment of the first and second auxiliary substrates is exactly performed by testing the first and second mother substrates to which the respective first and second auxiliary substrates are attached.

Each of the loading line 120-1, the loading line 120-2, the attachment line 120 and the test line 120-3 is configured with one or a plurality of processing apparatuses, and a corresponding process is performed on the loaded first and second mother substrates or the loaded first and second auxiliary substrates by each processing apparatus of a corresponding line. In this case, a transport means such as a conveyor belt is provided inside each line so that the corresponding process is performed on the loaded first and second mother substrates or the loaded first and second auxiliary substrates by the corresponding processing apparatus while being moved by the transport means.

Although not shown in FIG. 24, a transfer mean such as a robot is provided among the loading line 120-1, the loading line 120-2 and the attachment line 120 and the test line 120-3 so that the first and second mother substrates or the first and second auxiliary substrates, of which process is finished in each line, are transferred to a subsequent process. In this case, the robot provided among the loading line 120-1, the loading line 120-2 and the attachment line 120 and the test line 120-3 is controlled by a control means so that the processes are consecutively performed on the first and second mother substrates loaded into the loading line 120-1 and the first and second auxiliary substrates loaded into the loading line 120-2 through the loading line 120-1, the loading line 120-2 and the attachment line 120 and the test line 120-3 without any pause. In other words, the first and second auxiliary substrates loaded into the loading line 120-2 are respectively attached to the first and second mother substrates loaded into the loading line 120-1 through the consecutive processes.

In addition, a transfer means such as a robot is provided among the attachment line 120, the processing line 130, the attachment line 140, the detachment line 150 and the test line 170 so that the first and second mother substrates, the liquid crystal panel or the first and second auxiliary substrates, of which process is finished in each line, are transferred to a subsequent process.

The first and second auxiliary substrates may be configured as bare-shaped glass substrates. The attachment of the first or second mother substrate and the first or second auxiliary substrate may be performed by contacting the two substrates with each other under a vacuum state. In this case, the attachment force between the two substrates may be derived from electrostatic force, vacuum force, surface tension, attraction between molecules, etc.

As described above, the attachment forces of the first and second auxiliary substrates with the first and second mother substrates are reduced by performing plasma treatment using fluorine, etc. on the first and second auxiliary substrates, by performing surfactant treatment on the first and second auxiliary substrates or by forming a concavo-convex pattern on the first and second auxiliary substrates, so that the first and second auxiliary substrates can be easily detached from the liquid crystal panel after the processes are completed.

Figure 25:
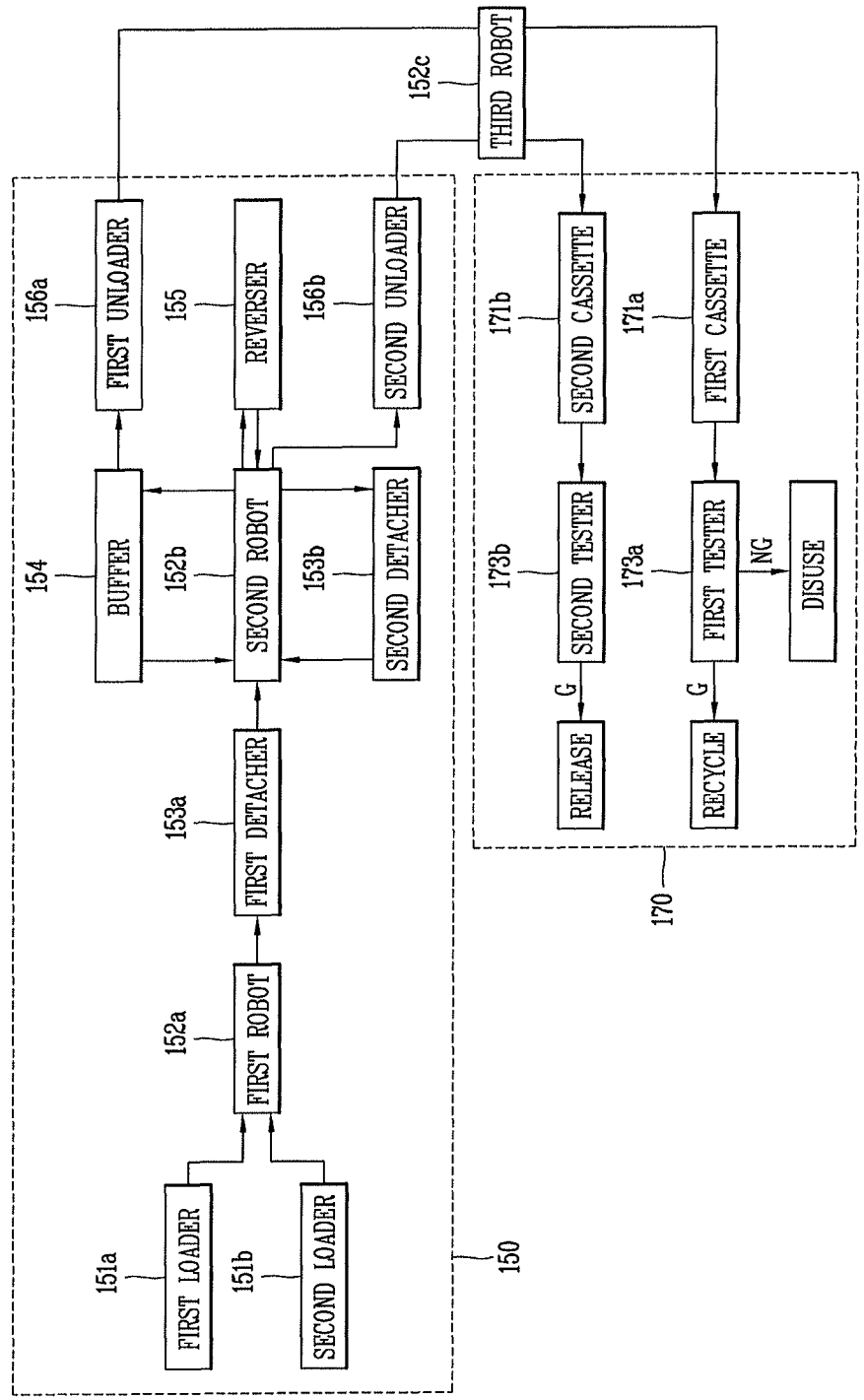
FIG. 25 is a view specifically illustrating the configuration of an auxiliary substrate detachment line in the processing line according to the first exemplary embodiment shown in FIG. 23.

FIG. 25 is a view specifically illustrating the configuration of an auxiliary substrate detachment line in the processing line according to the first exemplary embodiment shown in FIG. 23.

In FIG. 25, the configuration of an auxiliary substrate detachment line and a test line for first and second auxiliary substrate and liquid crystal panel when the detachment of first and second auxiliary substrates is performed, and the washing of the first and second auxiliary substrates is then not performed is shown as an example.

Referring to FIG. 25, the detachment line 150 according to the first exemplary embodiment includes first and second loaders 151a and 151b for loading the first and second mother substrates, i.e., the liquid crystal panel, attached by performing the array process and color filter process described above, a first detacher 153a for detaching the first auxiliary substrate from the liquid crystal panel loaded by the first and second loaders 151a and 151b, a reverser 155 for vertically reversing the liquid crystal panel having the first auxiliary substrate detached therefrom, a second detacher 153b for detaching the second auxiliary substrate from the reversed liquid crystal panel, a first unloader 156a for unloading the first and second auxiliary substrates respectively detached by the first and second detachers 153a and 153b, and a second unloader 156b for unloading the liquid crystal panel having the first and second auxiliary substrates detached therefrom.

In this case, the first and second auxiliary substrates respectively detached by the first and second detachers 153a and 153b may be arbitrarily kept in a buffer 154 before being unloaded by the first unloader 156a. The buffer 154 may have any form in which the detached first and second auxiliary substrates can be arbitrarily kept. For example, the buffer 154 may have various forms such as a cassette in which the detached first and second auxiliary substrates are accommodated.

The detachment line 150 according to the first exemplary embodiment shown in FIG. 25 is merely an example, and the present disclosure is not limited thereto. Various configurations of components are possible as well as the configuration of components described above, and each of the processing apparatuses such as the first and second detachers 153a and 153b may be configured in plural numbers.

For example, in a case where each of the first and second detachers 153a and 153b is configured with two or more detachers, the detachment of the first and second auxiliary substrates can be quickly performed. Further, the detachment of the first and second auxiliary substrates can be consecutively performed without any pause. That is, another liquid crystal panel loaded while a detachment process is performed in primary first and second detachers 153a and 153b is loaded onto secondary first and second detachers 153a and 153b, thereby quickly performing detachment processes.

A transport means such as a conveyor belt is provided inside the detachment line 150 configured as described above so that a corresponding process is performed on the loaded liquid crystal panel and first and second auxiliary substrates by the processing apparatus while being moved by the transport means.

A first robot 152a is provided between the first and second loaders 151a and 151b and the first detacher 153a. The first robot 152a transfers the liquid crystal display panel loaded by the first and second loaders 151a and 151b to the first detacher 153a by moving between the first and second loaders 151a and 151b and the first detacher 153a. Here, the first and second loaders 151a and 151b may be configured as robot arms. In this case, the liquid crystal panel may be transferred to the first detacher 153a in a state in which the liquid crystal panel accommodated in the cassette is mounted on the robot arm.

A second robot 125b is provided among the first detacher 153a, the buffer 154, the second detacher 153b and the reverser 155. The second robot 125b transfers the liquid crystal panel and first and second auxiliary substrates of which processes are finished by the respective processing apparatuses by moving among the first detacher 153a, the buffer 154, the second detacher 153b and the reverser 155.

The first and second robots 152a and 152b are controlled as traveling robots by a control means. Thus, the liquid crystal panel loaded by the first and second loaders 151a and 151b is transferred to the first detacher 153a so that the first auxiliary substrate on one surface of the liquid crystal panel is detached from the liquid crystal panel. The liquid crystal panel having the first auxiliary substrate detached therefrom is reversed by the reverser 155 so that the second auxiliary substrate on the opposite surface of the liquid crystal panel is detached from the liquid crystal panel. The reversed liquid crystal panel is transferred to the second detacher 153b so that the second auxiliary substrate is detached from the liquid crystal panel. The first and second auxiliary substrates detached from the liquid crystal panel as described above are transferred to the first unloader 156a so as to be transferred to the test line 170. The liquid crystal panel having both the first and second auxiliary substrates detached therefrom is transferred to the second unloader 156b so as to be transferred to the test line 170.

The first robot 152a automatically transfers the liquid crystal panel loaded by the first and second loaders 151a and 151b to the first detacher 153a, and the second robot 152b automatically transfers the liquid crystal panel having the first auxiliary substrate detached therefrom to the reverser 155 and the second detacher 153b, and automatically transfers the detached first and second auxiliary substrates and the liquid crystal panel to the respective first and second unloaders 156a and 156b, thereby performing consecutive processes.

The first and second unloaders 156a and 156b can change directions. Thus, the directions of the first and second auxiliary substrates and the liquid crystal panel, respectively unloaded by the first and second unloaders 156a and 156b, can be automatically changed to be transferred to the test line 170 through a third robot 152c.

In this case, the test line 170 includes first and second cassettes 171a and 171b for respectively keeping the first and second auxiliary substrates and the liquid crystal panel, transferred through the third robot 152c, and first and second testers 173a and 173b for respectively testing the first and second auxiliary substrates and the liquid crystal panel, kept in the first and second cassettes 171a and 171b.

The third robot 152c is configured as a multi-joint robot. The third robot 152c transfers, to the test line 170, the first and second auxiliary substrates and the liquid crystal panel, respectively unloaded by the first and second unloaders 156a and 156b of the detachment line 150.

In addition to the first and second robots 152a and 152b described above, the third robot 152c automatically transfers, to the test line 170, the first and second auxiliary substrates and the liquid crystal panel, respectively unloaded by the first and second unloaders 156a and 156b, thereby performing consecutive processes.

Although not shown in this figure, each of the first and second testers 173a and 173b is provided with a camera such as a CCD camera so as to inspect whether a foreign matter penetrates into the first and second auxiliary substrates or the liquid crystal panel and whether a crack or scratch exists in the first and second auxiliary substrates or the liquid crystal panel by photographing the first and second auxiliary substrates or the liquid crystal panel and then comparing the photographed image with a reference image. In addition, a failure of the first and second auxiliary substrates or the liquid crystal panel may be inspected by the operator's naked eye.

In a case where it is inspected that no foreign matter or failure exists in the first and second auxiliary substrates of which test has been finished, the first and second auxiliary substrates are recycled. In a case where it is inspected that a foreign matter or failure exists in the first and second auxiliary substrates, the first and second auxiliary substrates are disused. In a case where it is inspected that no foreign matter or failure exists in the liquid crystal panel, the liquid crystal panel is released.

The first and second auxiliary substrates detached from the liquid crystal panel as described above can be recycled. In this case, a washing process may be performed on the first and second auxiliary substrates so as to remove foreign matters remaining on the first and the second auxiliary substrates. This will be described in detail in a second embodiment.

Figure 26:
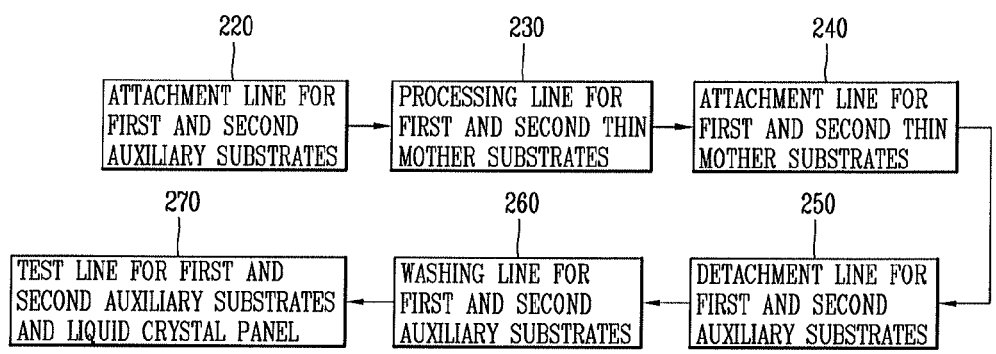
FIG. 26 is a view schematically illustrating the configuration of a processing line for fabricating a lightweight and thin LCD according to a second exemplary embodiment.

FIG. 26 is a view schematically illustrating the configuration of a processing line for fabricating a lightweight and thin LCD according to a second exemplary embodiment.

Figure 27:
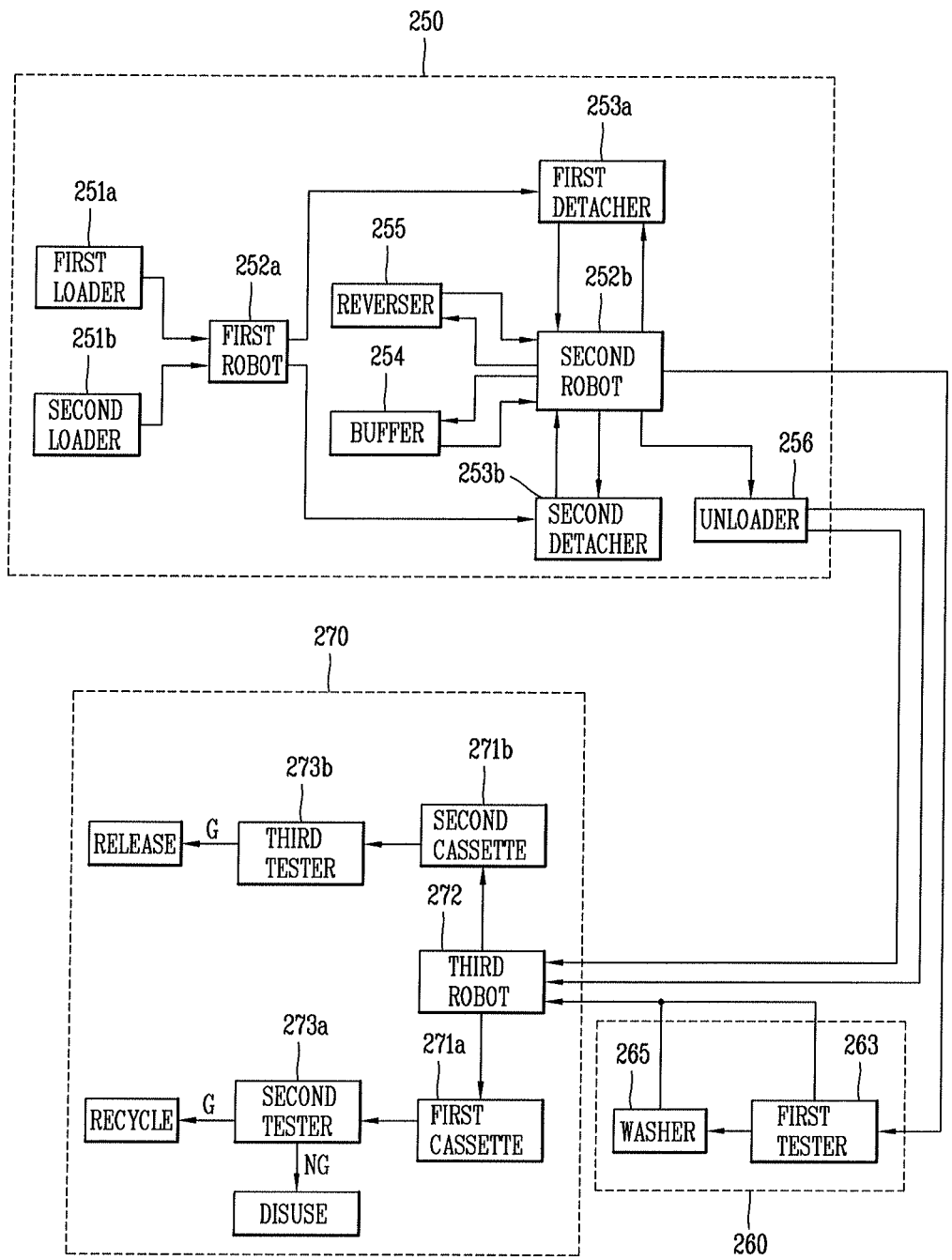
FIG. 27 is a view specifically illustrating the configuration of an auxiliary substrate detachment line in the processing line according to the second exemplary embodiment shown in FIG. 26.

FIG. 27 is a view specifically illustrating the configuration of an auxiliary substrate detachment line in the processing line according to the second exemplary embodiment shown in FIG. 26.

In FIG. 27, the configuration of an auxiliary substrate detachment line, a washing line for first and second auxiliary substrates and a test line for first and second substrates and liquid crystal panel when the detachment of first and second auxiliary substrates is performed, and the washing of one of the first and second auxiliary substrates, which is necessary for washing, is then performed is shown as an example.

Referring to FIG. 26, the processing line according to the second exemplary embodiment may be configured to include an attachment line 220 for first and second auxiliary substrates, on which first and second auxiliary substrates are respectively attached to first and second mother substrates, a processing line 230 for first and second mother substrates, on which an array process and a color filter process are performed on each of the first and second mother substrates to which the respective first and second auxiliary substrates are attached, an attachment line 240 for first and second mother substrates, on which the first and second mother substrates, each on which the array process and the color filter process are performed, are attached together to face each other, a detachment line 250 for first and second auxiliary substrates, on which the first and second auxiliary substrates are respectively detached from the attached first and second mother substrates, i.e., a liquid crystal panel, a washing line 260 for first and second auxiliary substrates, on which the detached first and second auxiliary substrates are washed, and a test line 270 for first and second auxiliary substrates and liquid crystal panel, on which the detached first and second auxiliary substrates and the liquid crystal panel are tested.

Although not shown in this figure, a loading line and a test line may be additionally configured before and after the attachment line 220. In this case, like the first exemplary embodiment described above, the substrate attachment line is configured to include a loading line for first and second mother substrates, on which thin glass substrates having a thickness of about 0.1 t to 0.4 t are loaded as first and second mother substrates, a loading line for first and second auxiliary substrates, on which auxiliary substrates made of glass having a thickness of about 0.3 t to 0.7 t are loaded as first and second auxiliary substrates, the attachment line 120 for first and second auxiliary substrates, on which the first and second auxiliary substrates loaded through the loading line are respectively attached to the first and second mother substrates loaded through the loading line, and a test line on which it is inspected whether attachment of the first and second auxiliary substrates is exactly performed by testing the first and second mother substrates to which the respective first and second auxiliary substrates are attached.

Each of the loading line, the loading line, the attachment line and the test line is configured with one or a plurality of processing apparatuses, and a corresponding process is performed on the loaded first and second mother substrates or the loaded first and second auxiliary substrates by each processing apparatus of a corresponding line. In this case, a transport means such as a conveyor belt is provided inside each line so that the corresponding process is performed on the loaded first and second mother substrates or the loaded first and second auxiliary substrates by the corresponding processing apparatus while being moved by the transport means.

Further, a transfer mean such as a robot is provided among the loading line, the loading line and the attachment line and the test line so that the first and second mother substrates or the first and second auxiliary substrates, of which process is finished in each line, are transferred to a subsequent process. In this case, the robot provided among the loading line, the loading line and the attachment line and the test line is controlled by a control means so that the processes are consecutively performed on the first and second mother substrates loaded into the loading line and the first and second auxiliary substrates loaded into the loading line through the loading line, the loading line and the attachment line and the test line without any pause. In other words, the first and second auxiliary substrates loaded into the loading line are respectively attached to the first and second mother substrates loaded into the loading line through the consecutive processes.

In addition, a transfer means such as a robot is provided among the attachment line 220, the processing line 230, the attachment line 240, the detachment line 250, the washing line 260 and the test line 270 so that the first and second mother substrates, the liquid crystal panel or the first and second auxiliary substrates, of which process is finished in each line, are transferred to a subsequent process.

Referring to FIG. 27, the detachment line 250 according to the second exemplary embodiment includes first and second loaders 251a and 251b for loading the first and second mother substrates, i.e., the liquid crystal panel, attached by performing the array process and color filter process described above, a first detacher 253a for detaching the first auxiliary substrate from the liquid crystal panel loaded by the first and second loaders 251a and 251b, a reverser 255 for vertically reversing the liquid crystal panel having the first auxiliary substrate detached therefrom, a second detacher 253b for detaching the second auxiliary substrate from the reversed liquid crystal panel, and an unloader 256 for unloading the liquid crystal panel having the first and second auxiliary substrates detached therefrom.

In this case, the first auxiliary substrate may be detached from the liquid crystal panel loaded by the first and second loaders 251a and 251b through the second detacher 253b, and the second auxiliary substrate may be detached from the liquid crystal panel reversed by the reverser 255 through the first detacher 253a. Thus, the detachment of the first and second auxiliary substrates is performed through the first and second detachers 253a and 253b using a method of minimizing a time for which the loaded liquid crystal panel and the liquid crystal display panel having the first auxiliary substrate detached therefrom wait according to whether the first and second detachers 253a and 253b are used.

The liquid crystal panel having the first auxiliary substrate detached therefrom and the liquid crystal panel having the first and second auxiliary substrates detached therefrom may be arbitrarily kept in a predetermined buffer 254 before being respectively transferred to the first and second detachers 253a and 253b and the washing line 260. The buffer 254 may have any form in which the liquid crystal panel having the first auxiliary substrate detached therefrom and the liquid crystal panel having the first and second auxiliary substrates detached therefrom can be arbitrarily kept. For example, the buffer 254 may have various forms such as a cassette in which the liquid crystal panel having the first auxiliary substrate detached therefrom and the liquid crystal panel having the first and second auxiliary substrates detached therefrom are accommodated.

The detachment line 250 according to the first exemplary embodiment shown in FIG. 27 is merely an example, and the present disclosure is not limited thereto. Various configurations of components are possible as well as the configuration of components described above, and each of the processing apparatuses such as the first and second detachers 253a and 253b may be configured in plural numbers.

For example, in a case where each of the first and second detachers 253a and 253b is configured with two or more detachers, the detachment of the first and second auxiliary substrates can be quickly performed. Further, the detachment of the first and second auxiliary substrates can be consecutively performed without any pause. That is, another liquid crystal panel loaded while a detachment process is performed in primary first and second detachers 253a and 253b is loaded onto secondary first and second detachers 253a and 253b, thereby quickly performing detachment processes.

A transport means such as a conveyor belt is provided inside the detachment line 250 configured as described above so that a corresponding process is performed on the loaded liquid crystal panel and first and second auxiliary substrates by the processing apparatus while being moved by the transport means.

A first robot 252a is provided between the first and second loaders 251a and 251b and the first and second detachers 253a and 253b. The first robot 252a transfers the liquid crystal panel loaded by the first and second loaders 251a and 251b to the first and second detachers 253a and 253b by moving between the first and second loaders 251a and 251b and the first and second detachers 253a and 253b. Here, the first and second loaders 251a and 251b may be configured as robot arms. In this case, the liquid crystal panel may be transferred to the first and second detachers 253a and 253b in a state in which the liquid crystal panel accommodated in the cassette is mounted on the robot arm.

A second robot 225b is provided among the first and second detachers 253a and 253b, the buffer 254, the reverser 255 and the unloader 256. The second robot 225b transfers the liquid crystal panel and first and second auxiliary substrates of which processes are finished by the respective processing apparatuses by moving among the first and second detachers 253a and 253b, the buffer 254, the reverser 255 and the unloader 256.

The first and second robots 252a and 252b are controlled as traveling robots by a control means. Thus, the liquid crystal panel loaded by the first and second loaders 251a and 251b is transferred to the first and second detachers 253a and 253b so that the first auxiliary substrate on one surface of the liquid crystal panel is detached from the liquid crystal panel. The liquid crystal panel having the first auxiliary substrate detached therefrom is reversed by the reverser 255 so that the second auxiliary substrate on the opposite surface of the liquid crystal panel is detached from the liquid crystal panel. The reversed liquid crystal panel is transferred to the first and second detachers 253a and 253b so that the second auxiliary substrate is detached from the liquid crystal panel. The liquid crystal panel having both the first and second auxiliary substrates detached therefrom as described above is transferred to the unloader 256 so as to be transferred to the test line 270. The first and second auxiliary substrates detached from the liquid crystal panel are transferred to the test line 270 via the washing line 260.

The first robot 252a automatically transfers the liquid crystal panel loaded by the first and second loaders 251a and 251b to the first and second detachers 253a and 253b, and the second robot 252b automatically transfers the liquid crystal panel having the first auxiliary substrate detached therefrom to the reverser 155 and the first and second detachers 253a and 253b, and automatically transfers the detached first and second auxiliary substrates and the liquid crystal panel respectively to the washing line 260 and the unloader 256, thereby performing consecutive processes.

In this case, the washing line 260 performs a washing process for removing foreign matters remaining on the first and second auxiliary substrates so as to recycle the first and second auxiliary substrates detached from the liquid crystal panel. To this end, the washing line 260 includes a first tester 263 for inspecting whether foreign matters remain on the detached first and second auxiliary substrates, and a washer 265 for removing foreign matters remaining on the first and second auxiliary substrates.

Here, a case where the washing process is performed on a pair of first and second auxiliary substrates among pairs of detached first and second auxiliary substrates, which are necessary for washing, in the washer 265 is described as an example.

The foreign matter remaining on the first and second auxiliary substrates is a chemical matter such as a photoresist, resin, etchant, stripper or developer, or a matter such as a conductive layer or inorganic layer, which is not removed and remains during a process.

The washing process of removing remaining foreign matters may be performed using various methods including chemical washing, laser irradiation, solid $CO_2$ spray, UV irradiation, etc.

In a case where the remaining foreign matter is an organic matter, the organic matter may be removed using basic solution such as 50% KOH, irradiation of laser of about 1500 nm, solid $CO_2$ spray, UV irradiation, etc.

In a case where the remaining foreign matter is an inorganic matter, the inorganic matter may be removed using irradiation of laser of about 1500 nm, solid $CO_2$ spray, UV irradiation, etc. In a case where the remaining foreign matter is a metal layer, the metal layer may be removed using an acidic or basic etchant, etc.

Although not shown in this figure, the first tester 263 is provided with a camera such as a CCD camera so as to inspect whether a foreign matter penetrates into the first and second auxiliary substrates by photographing the detached first and second auxiliary substrates and then comparing the photographed image with a reference image. In addition, a failure of the first and second auxiliary substrates may be inspected by the operator's naked eye.

In this case, the liquid crystal panel unloaded as described above is transferred to the test line 270, and the first and second auxiliary substrates washed through the washing line 260 are also transferred to the test line 270.

The test line 270 includes first and second cassettes 271a and 271b for respectively keeping the first and second auxiliary substrates and the liquid crystal panel, transferred through a third robot 272, and second and third testers 273b and 273c for respectively testing the first and second auxiliary substrates and the liquid crystal panel, kept in the first and second cassettes 271a and 271b.

The third robot 272 is configured as a multi-joint robot. The third robot 272 transfers, to the test line 270, the liquid crystal panel unloaded by the unloader 256 of the detachment line 250 and the first and second auxiliary substrates passing through the washing line 260.

In addition to the first and second robots 252a and 252b, the third robot 272 automatically transfers, to the test line 270, the liquid crystal panel unloaded by the unloader 256 and the first and second auxiliary substrates passing through the washing line 260, thereby performing consecutive processes.

Although not shown in this figure, each of the second and third testers 273b and 273c is provided with a camera such as a CCD camera so as to inspect whether a foreign matter penetrates into the first and second auxiliary substrates or the liquid crystal panel and whether a crack or scratch exists in the first and second auxiliary substrates or the liquid crystal panel by photographing the first and second auxiliary substrates or the liquid crystal panel and then comparing the photographed image with a reference image. In addition, a failure of the first and second auxiliary substrates or the liquid crystal panel may be inspected by the operator's naked eye.

In a case where it is inspected that no foreign matter or failure exists in the first and second auxiliary substrates of which test has been finished, the first and second auxiliary substrates are recycled. In a case where it is inspected that a foreign matter or failure exists in the first and second auxiliary substrates, the first and second auxiliary substrates are disused. In a case where it is inspected that no foreign matter or failure exists in the liquid crystal panel, the liquid crystal panel is released.

Figure 28:
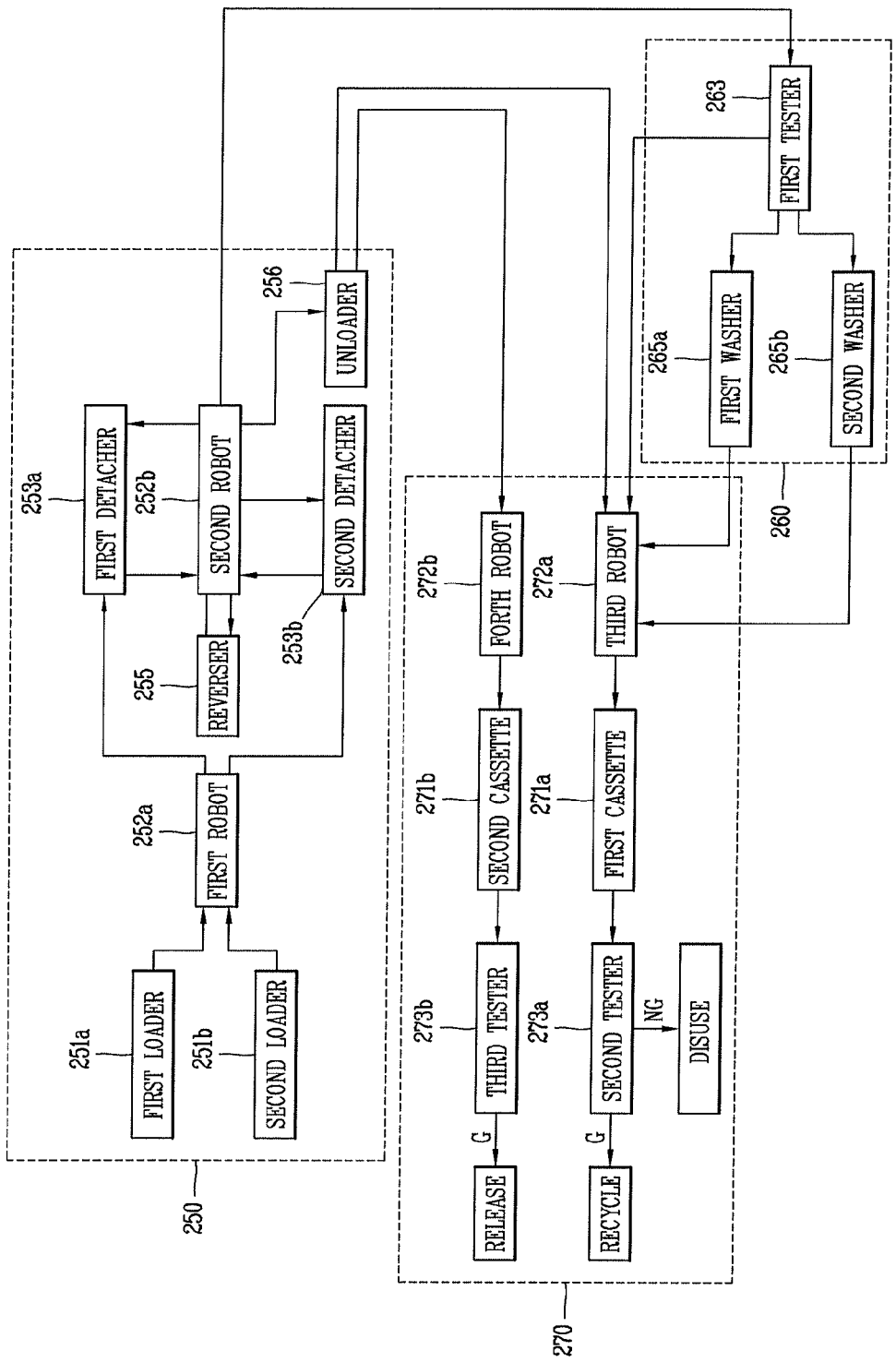
FIG. 28 is a view specifically illustrating the configuration of another auxiliary substrate detachment line in the processing line according to the second exemplary embodiment shown in FIG. 26.

FIG. 28 is a view specifically illustrating the configuration of another auxiliary substrate detachment line in the processing line according to the second exemplary embodiment shown in FIG. 26, in which a washing process is performed on both the first and second auxiliary substrates.

Referring to FIG. 28, the detachment line 250 according to the second exemplary embodiment includes first and second loaders 251a and 251b for loading the first and second mother substrates, i.e., the liquid crystal panel, attached by performing the array process and color filter process described above, a first detacher 253a for detaching the first auxiliary substrate from the liquid crystal panel loaded by the first and second loaders 251a and 251b, a reverser 255 for vertically reversing the liquid crystal panel having the first auxiliary substrate detached therefrom, a second detacher 253b for detaching the second auxiliary substrate from the reversed liquid crystal panel, and an unloader 256 for unloading the liquid crystal panel having the first and second auxiliary substrates detached therefrom.

In this case, the first auxiliary substrate may be detached from the liquid crystal panel loaded by the first and second loaders 251a and 251b through the second detacher 253b, and the second auxiliary substrate may be detached from the liquid crystal panel reversed by the reverser 255 through the first detacher 253a. Thus, the detachment of the first and second auxiliary substrates is performed through the first and second detachers 253a and 253b using a method of minimizing a time for which the loaded liquid crystal panel and the liquid crystal display panel having the first auxiliary substrate detached therefrom wait according to whether the first and second detachers 253a and 253b are used.

Although not shown in this figure, the liquid crystal panel having the first auxiliary substrate detached therefrom and the liquid crystal panel having the first and second auxiliary substrates detached therefrom may be arbitrarily kept in a predetermined buffer before being respectively transferred to the first and second detachers 253a and 253b and the washing line 260. The buffer may have any form in which the liquid crystal panel having the first auxiliary substrate detached therefrom and the liquid crystal panel having the first and second auxiliary substrates detached therefrom can be arbitrarily kept. For example, the buffer may have various forms such as a cassette in which the liquid crystal panel having the first auxiliary substrate detached therefrom and the liquid crystal panel having the first and second auxiliary substrates detached therefrom are accommodated.

The detachment line 250 according to the first exemplary embodiment shown in FIG. 28 is merely an example, and the present disclosure is not limited thereto. Various configurations of components are possible as well as the configuration of components described above, and each of the processing apparatuses such as the first and second detachers 253a and 253b may be configured in plural numbers.

For example, in a case where each of the first and second detachers 253a and 253b is configured with two or more detachers, the detachment of the first and second auxiliary substrates can be quickly performed. Further, the detachment of the first and second auxiliary substrates can be consecutively performed without any pause. That is, another liquid crystal panel loaded while a detachment process is performed in primary first and second detachers 253a and 253b is loaded onto secondary first and second detachers 253a and 253b, thereby quickly performing detachment processes.

A transport means such as a conveyor belt is provided inside the detachment line 250 configured as described above so that a corresponding process is performed on the loaded liquid crystal panel and first and second auxiliary substrates by the processing apparatus while being moved by the transport means.

A first robot 252a is provided between the first and second loaders 251a and 251b and the first and second detachers 253a and 253b. The first robot 252a transfers the liquid crystal panel loaded by the first and second loaders 251a and 251b to the first and second detachers 253a and 253b by moving between the first and second loaders 251a and 251b and the first and second detachers 253a and 253b. Here, the first and second loaders 251a and 251b may be configured as robot arms. In this case, the liquid crystal panel may be transferred to the first and second detachers 253a and 253b in a state in which the liquid crystal panel accommodated in the cassette is mounted on the robot arm.

A second robot 225b is provided among the first and second detachers 253a and 253b, the reverser 255 and the unloader 256. The second robot 225b transfers the liquid crystal panel and first and second auxiliary substrates of which processes are finished by the respective processing apparatuses by moving among the first and second detachers 253a and 253b, the reverser 255 and the unloader 256.

The first and second robots 252a and 252b are controlled as traveling robots by a control means. Thus, the liquid crystal panel loaded by the first and second loaders 251a and 251b is transferred to the first and second detachers 253a and 253b so that the first auxiliary substrate on one surface of the liquid crystal panel is detached from the liquid crystal panel. The liquid crystal panel having the first auxiliary substrate detached therefrom is reversed by the reverser 255 so that the second auxiliary substrate on the opposite surface of the liquid crystal panel is detached from the liquid crystal panel. The reversed liquid crystal panel is transferred to the first and second detachers 253a and 253b so that the second auxiliary substrate is detached from the liquid crystal panel. The liquid crystal panel having both the first and second auxiliary substrates detached therefrom as described above is transferred to the unloader 256 so as to be transferred to the test line 270. The first and second auxiliary substrates detached from the liquid crystal panel are transferred to the test line 270 via the washing line 260.

The first robot 252a automatically transfers the liquid crystal panel loaded by the first and second loaders 251a and 251b to the first and second detachers 253a and 253b, and the second robot 252b automatically transfers the liquid crystal panel having the first auxiliary substrate detached therefrom to the reverser 155 and the first and second detachers 253a and 253b, and automatically transfers the detached first and second auxiliary substrates and the liquid crystal panel respectively to the washing line 260 and the unloader 256, thereby performing consecutive processes.

In this case, the washing line 260 performs a washing process for removing foreign matters remaining on the first and second auxiliary substrates so as to recycle the first and second auxiliary substrates detached from the liquid crystal panel. To this end, the washing line 260 includes a first tester 263 for inspecting whether foreign matters remain on the detached first and second auxiliary substrates, and first and second washers 265*an* and 265*b* for removing foreign matters remaining on the first and second auxiliary substrates.

Here, a case where washing processes are respectively performed by the first and second washers 265*a* and 265*b* when the washing of both the detached first and second auxiliary substrates is required is described as an example.

The foreign matter remaining on the first and second auxiliary substrates is a chemical matter such as a photoresist, resin, etchant, stripper or developer, or a matter such as a conductive layer or inorganic layer, which is not removed and remains during a process.

The washing process of removing the remaining foreign matter is substantially identical to that described above.

Although not shown in this figure, the first tester 263 is provided with a camera such as a CCD camera so as to inspect whether a foreign matter penetrates into the first and second auxiliary substrates by photographing the detached first and second auxiliary substrates and then comparing the photographed image with a reference image. In addition, a failure of the first and second auxiliary substrates may be inspected by the operator's naked eye.

In this case, the liquid crystal panel unloaded as described above is transferred to the test line 270, and the first and second auxiliary substrates washed through the washing line 260 are also transferred to the test line 270.

The test line 270 includes first and second cassettes 271*a* and 271*b* for respectively keeping the first and second auxiliary substrates and the liquid crystal panel, transferred through third and fourth robots 272*a* and 272*b*, and second and third testers 273*b* and 273*c* for respectively testing the first and second auxiliary substrates and the liquid crystal panel, kept in the first and second cassettes 271*a* and 271*b*.

The third and fourth robots 272*a* and 272*b* are configured as multi-joint robots. The third and fourth robots 272*a* and 272*b* transfer, to the test line 270, the liquid crystal panel unloaded by the unloader 256 of the detachment line 250 and the first and second auxiliary substrates passing through the washing line 260.

In addition to the first and second robots 252*a* and 252*b*, the third and fourth robots 272*a* and 272*b* automatically transfer, to the test line 270, the liquid crystal panel unloaded by the unloader 256 and the first and second auxiliary substrates passing through the washing line 260, thereby performing consecutive processes.

Although not shown in this figure, each of the second and third testers 273*b* and 273*c* is provided with a camera such as a CCD camera so as to inspect whether a foreign matter penetrates into the first and second auxiliary substrates or the liquid crystal panel and whether a crack or scratch exists in the first and second auxiliary substrates or the liquid crystal panel by photographing the first and second auxiliary substrates or the liquid crystal panel and then comparing the photographed image with a reference image. In addition, a failure of the first and second auxiliary substrates or the liquid crystal panel may be inspected by the operator's naked eye.

In a case where it is inspected that no foreign matter or failure exists in the first and second auxiliary substrates of which test has been finished, the first and second auxiliary substrates are recycled. In a case where it is inspected that a foreign matter or failure exists in the first and second auxiliary substrates, the first and second auxiliary substrates are disused. In a case where it is inspected that no foreign matter or failure exists in the liquid crystal panel, the liquid crystal panel is released.

As described above, the detaching line for detaching the first and second auxiliary substrates from the liquid crystal panel in the cell state, which is attached through the attachment process, is configured with one in-line, so that it is possible to quickly perform the detaching process and to stably perform the detaching process, thereby improving price competitiveness of the LCD.

Further, the detached first and second auxiliary substrates can be recycled when processes are performed on thin glass substrates, thereby improving the utility of the first and second auxiliary substrates.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of fabricating a lightweight and thin liquid crystal display (LCD), comprising:
   providing first and second auxiliary substrates and first and second thin mother substrates;
   respectively attaching the first and second auxiliary substrates to the first and second thin mother substrates;
   performing an array process on the first thin mother substrate having the first auxiliary substrate attached thereto;
   performing a color filter process on the second thin mother substrate having the second auxiliary substrate attached thereto;
   attaching together the first thin mother substrate on which the array process is performed and the second thin mother substrate on which the color filter process is performed;
   providing a detaching apparatus having a table;
   loading the attached first and second thin mother substrates onto the table;
   detaching an edge portion between the second auxiliary substrate and the second thin mother substrate, using first and second knives;
   separating the second auxiliary substrate from the attached first and second thin mother substrates;
   vertically reversing the first and second thin mother substrates having the second auxiliary substrate separated therefrom;
   detaching an edge portion between the first auxiliary substrate and the first thin mother substrate, using the first and second knives; and separating the first auxiliary substrate from the attached first and second thin mother substrates.

2. The method of claim 1, further comprising forming corner cuts by cutting corners of the first and second auxiliary substrates and the first and second thin mother substrates at an inclined angle, after providing the first and second auxiliary substrates and the first and second thin mother substrates.

3. The method of claim 2, wherein, as at least two corners of the first and second thin mother substrates are cut further inward than those of the first and second auxiliary substrates, corner portions of the first and second auxiliary substrates are exposed, thereby forming push pin regions.

4. The method of claim 3, further comprising forming a knife entry space between the second auxiliary substrate and the second thin mother substrate by upwardly pressing the push pin region with a predetermined pressure, using a push pin, after loading the attached first and second thin mother substrates onto the table.

5. The method of claim 4, wherein the edge portion between the second auxiliary substrate and the second thin mother substrate is detached by entering the first and second knives into the knife entry space between the second auxiliary substrate and the second thin mother substrate, and moving the first and second knives from one direction to the other direction of the table.

6. The method of claim 5, wherein the detaching apparatus has a plurality of vacuum pads and a vacuum pad plate that vertically moves the plurality of vacuum pads.

7. The method of claim 6, further comprising attaching the plurality of vacuum pads to a surface of the second auxiliary substrate, after detaching the edge portion between the second auxiliary substrate and the second thin mother substrate.

8. The method of claim 7, wherein an air knife entry space is formed between the second auxiliary substrate and the second thin mother substrate by ascending the vacuum pads or the vacuum pad plate.

9. The method of claim 8, wherein the second auxiliary substrate is separated from the attached first and second thin mother substrates by spraying air while entering an air knife into the air knife entry space between the second auxiliary substrate and the second thin mother substrate.

10. The method of claim 9, wherein the first auxiliary substrate is separated from the attached first and second thin mother substrates by spraying air while entering the air knife into the air knife entry space between the first auxiliary substrate and the first thin mother substrate.

11. The method of claim 9, further comprising forming a knife entry space between the first auxiliary substrate and the first thin mother substrate by upwardly pressing the push pin region with a predetermined pressure, using a push pin, after reversing the first and second thin mother substrates having the second auxiliary substrate separated therefrom.

12. The method of claim 11, wherein the contact surface of the push pin contacting the push pin region has a triangular shape, a combined shape of a circle and a triangle, a rectangular shape or a circular shape.

13. The method of claim 12, further comprising: after forming the push pin region,
  recognizing ends of the first and second auxiliary substrates through an observation apparatus such as a charge-coupled device (CCD) camera; and
  aligning a push pin at a position set by moving the push pin in the directions of x and y axes, in consideration of the positions of the recognized ends of the first and second auxiliary substrates.

14. The method of claim 12, further comprising: after forming the push pin region,
  recognizing ends of the first and second auxiliary substrates through an observation apparatus such as a CCD camera; and
  aligning a push pin at a position set by moving the push pin in the directions of –x and –y axes, in consideration of the positions of the recognized ends of the first and second auxiliary substrates.

15. The method of any one of claims 13 and 14, wherein, after a push pin is aligned by recognizing ends of the first and second thin mother substrates or the first and second auxiliary substrates, the edge portion between the second auxiliary substrate and the second thin mother substrate or between the first auxiliary substrate and the first thin mother substrate is detached by moving the aligned push pin in the direction of z axis.

16. The method of any one of claims 13 and 14, wherein, after a push pin is aligned by recognizing ends of the first and second thin mother substrates or the first and second auxiliary substrates, the edge portion between the second auxiliary substrate and the second thin mother substrate or between the first auxiliary substrate and the first thin mother substrate is detached by alternately moving the aligned push pin in the directions of z and –z axes.

17. The method of any one of claims 13 and 14, wherein, after a push pin is aligned by recognizing ends of the first and second thin mother substrates or the first and second auxiliary substrates, the edge portion between the second auxiliary substrate and the second thin mother substrate or between the first auxiliary substrate and the first thin mother substrate is detached by alternately moving the aligned push pin in the directions of z and –z axes, and sequentially increasing a moving distance.

18. The method of claim 11, wherein the edge portion between the first auxiliary substrate and the first thin mother substrate is detached by entering the first and second knives into the knife entry space between the first auxiliary substrate and the first thin mother substrate, and moving the first and second knives from one direction to the other direction of the table.

19. The method of claim 18, wherein air is sprayed through air holes provided in the first and second knives while the first and second knives are moving.

20. The method of claim 19, further comprising attaching the plurality of vacuum pads to a surface of the first auxiliary substrate, after detaching the edge portion between the first auxiliary substrate and the first thin mother substrate.

21. The method of claim 20, wherein an air knife entry space is formed between the first auxiliary substrate and the first thin mother substrate by ascending the vacuum pads or the vacuum pad plate.

22. The method of claim 21, further comprising sensing pressure using a sensor when the vacuum pads or the vacuum pad plate is ascended in the process of separating the second or first auxiliary substrate.

23. The method of claim 22, further comprising deciding whether the pressure sensed by the sensor is abnormal, and when the pressure is abnormal, displaying an alarm that a foreign matter has been generated and occurrence of the foreign matter on a monitor or the like.

24. The method of claim 23, wherein, when a foreign matter is generated, the foreign matter at the portion, where the pressure is abnormal, is removed using laser, and the separation process of the second or first auxiliary substrate is then continued.

25. The method of claim 1, wherein, when the first and second knives are mounted at one end of the table, one edge portion between the second auxiliary substrate and the second thin mother substrate or one edge portion between the first auxiliary substrate and the first thin mother substrate is detached by moving one of the first and second knives in the longitudinal direction of the table, and the moved one of the first and second knives returns to an original position.

26. The method of claim 25, wherein upper and lower edge portions between the second auxiliary substrate and the second thin mother substrate or upper and lower edge portions between the first auxiliary substrate and the first thin mother substrate are detached by moving the first and second knives in the lateral direction of the table, and the moved first and second knives return to original positions, respectively.

27. The method of claim 1, wherein, when two pairs of first and second knives are respectively mounted at front and rear ends of the table, left and right edge portions between the second auxiliary substrate and the second thin mother substrate or left and right edge portions between the first auxiliary substrate and the first thin mother substrate are detached by moving one of the first and second knives at each of the front and rear ends in the longitudinal direction of the table, and the moved one of the first and second knives at each of the front and rear ends returns to an original position.

28. The method of claim 27, wherein upper and lower edge portions between the second auxiliary substrate and the second thin mother substrate or upper and lower edge portions between the first auxiliary substrate and the first thin mother substrate are detached by the first and second knives at each of the front and rear ends by half in the lateral direction of the table, and the moved first and second knives at each of the front and rear ends return to original positions, respectively.

29. The method of claim 1, wherein a foreign matter existing between the second auxiliary substrate and the second thin mother substrate is removed, and simultaneously, the edge portion between the second auxiliary substrate and the second thin mother substrate is detached, by entering a thin film, instead of the first and second knives, into a corner space between the second auxiliary substrate and the second thin mother substrate and moving the thin film from one direction to the other direction of the table.

30. The method of claim 29, wherein a foreign matter existing between the first auxiliary substrate and the first thin mother substrate is removed, and simultaneously, the edge portion between the first auxiliary substrate and the first thin mother substrate is detached, by entering a thin film, instead of the first and second knives, into a corner space between the first auxiliary substrate and the first thin mother substrate and moving the thin film from one direction to the other direction of the table.

31. The method of claim 30, wherein the process of removing the foreign matter and detaching the edge portion is performed by spraying air through air holes provided in the thin film while the thin film is moving.

32. The method of claim 31, wherein the separation of the second or first auxiliary substrate is performed using the thin film and air spray.

33. The method of claim 29, wherein, after the adhesive force of the existing foreign matter is weakened by spraying a cooling material onto a front surface of the second or first auxiliary substrate or a side surface between the second auxiliary substrate and the second thin mother substrate or between the first auxiliary substrate and the first thin mother substrate, the separation of the second or first auxiliary substrate is performed using the thin film and air spray, instead of the first and second knives.

34. The method of claim 29, wherein, after the adhesive force of the existing foreign matter is weakened by spraying a cooling material onto a front surface of the second or first auxiliary substrate or a side surface between the second auxiliary substrate and the second thin mother substrate or between the first auxiliary substrate and the first thin mother substrate and simultaneously applying heat to its lower portion, the separation of the second or first auxiliary substrate is performed using the thin film and air spray, instead of the first and second knives.

35. The method of claim 34, wherein heat corresponding to a temperature ranging from normal temperature to 80° C. is applied to the lower portion including the first and second thin mother substrates.

36. The method of claim 1, wherein the foreign matter is physically removed by moving the first and second knives into a space between the second auxiliary substrate and the second thin mother substrate or between the first auxiliary substrate and the first thin mother substrate along the direction in which the detachment of the edge portion is performed.

37. The method of claim 1, further comprising inspecting a foreign matter along edges of the second auxiliary substrate and the second thin mother substrate or edges of the first auxiliary substrate and the first thin mother substrate.

38. The method of claim 37, further comprising, when a foreign matter is generated, displaying an alarm that a foreign matter has been generated and occurrence of the foreign matter on a monitor or the like.

39. The method of claim 38, wherein a foreign matter at the portion, where the foreign matter is detected, is removed using laser, and the process of inspecting and removing the foreign matter is performed on all the edges of the second auxiliary substrate and the second thin mother substrate or all the edges of the first auxiliary substrate and the first thin mother substrate.

40. The method of claim 39, wherein, after the process of removing the foreign matter is completed, the separation process of the second or first auxiliary substrate is performed.

41. A processing line for fabricating an LCD, comprising:
   an attachment line for first and second auxiliary substrates, configured to respectively attach first and second auxiliary substrates to first and second thin mother substrates;
   a processing line for first and second thin mother substrates, configured to respectively perform an array process and a color filter process on the first and second thin mother substrates having the first and second auxiliary substrates attached thereto;
   an attachment line for first and second thin mother substrates configured to attach together the first and second thin mother substrates on which the array and the color filter process are performed, respectively, to face each other;
   a detachment line for first and second auxiliary substrates, configured to detach the first and second auxiliary substrates from the attached first and second substrates (hereinafter, referred to as a liquid crystal panel); and
   a test line for first and second auxiliary substrates and liquid crystal panel, configured to test the detached first and second auxiliary substrates and the liquid crystal panel,
   wherein the detachment line is configured with an in-line.

42. The processing line of claim 41, wherein the detachment line comprises:
   at least one loader configured to load the liquid crystal panel;
   at least one first detacher configured to detach the first auxiliary substrate from the liquid crystal panel loaded by the loader;

a reverser configured to vertically reverse the liquid crystal panel having the first auxiliary substrate detached therefrom;

at least one second detacher configured to detach the second auxiliary substrate from the reversed liquid crystal panel;

a first unloader configured to unload the first and second auxiliary substrates respectively detached by the first and second detachers; and a second unloader configured to unload the liquid crystal panel having the first and second auxiliary substrates detached therefrom.

43. The processing line of claim 42, wherein the detachment line further comprises a buffer that arbitrarily keeps the first and second auxiliary substrates respectively detached by the first and second detachers before being unloaded by the first unloader.

44. The processing line of claim 42, wherein a transport means such as a conveyor belt is provided inside the detachment line so that a corresponding process is performed by a processing apparatus while the loaded liquid crystal panel and the loaded first and second auxiliary substrates are moved by the transport means.

45. The processing line of claim 42, further comprising a first robot provided between the loader and the first detacher so as to transfer the liquid crystal panel loaded by the loader to the first detacher while moving between the loader and the first detacher.

46. The processing line of claim 45, further comprising a second robot provided among the first detacher, the second detacher and the reverser so as to transfer the liquid crystal panel and the first and second auxiliary substrates, of which processes are finished in each processing apparatus, to a subsequent process while moving among the first detacher, the second detacher and the reverser.

47. The processing line of claim 46, further comprising a third robot configured to transfer the first and second auxiliary substrates and the liquid crystal panel, respectively unloaded by the first and second unloaders, to the test line.

48. The processing line of claim 47, wherein the test line comprises:

first and second cassettes configured to respectively keep the first and second auxiliary substrates and the liquid crystal panel transferred through the third robot; and first and second testers configured to respectively test the first and second auxiliary substrates and the liquid crystal panel, kept in the first and second cassettes.

49. The processing line of claim 41, further comprising a washing line for first and second auxiliary substrates, provided between the detachment line and the test line so as to wash the detached first and second auxiliary substrates.

50. The processing line of claim 49, wherein the detachment line comprises:

at least one loader configured to load the liquid crystal panel;

at least one first detacher configured to detach the first auxiliary substrate from the liquid crystal panel loaded by the loader;

a reverser configured to vertically reverse the liquid crystal panel having the first auxiliary substrate detached therefrom;

at least one second detacher configured to detach the second auxiliary substrate from the reversed liquid crystal panel; and an unloader configured to unload the liquid crystal panel having the first and second auxiliary substrates detached therefrom.

51. The processing line of claim 50, wherein the detachment line further comprises a buffer that arbitrarily keeps a liquid crystal panel having the first auxiliary substrate detached therefrom and a liquid crystal panel having the first and second auxiliary substrates detached therefrom before the liquid crystal panels are respectively transferred to the first and second detachers and the washing line.

52. The processing line of claim 50, wherein a transport means such as a conveyor belt is provided inside the detachment line so that a corresponding process is performed by a processing apparatus while the loaded liquid crystal panel and the loaded first and second auxiliary substrates are moved by the transport means.

53. The processing line of claim 50, wherein the washing line comprises:

a first tester configured to inspect whether a foreign matter remains on the detached first and second auxiliary substrates; and at least one washer configured to remove a foreign matter when the foreign matter remains.

54. The processing line of claim 50, further comprising a first robot provided between the loader and the first and second detachers so as to transfer the liquid crystal panel loaded by the loader to the first and second detachers while moving between the loader and the first and second detachers.

55. The processing line of claim 54, further comprising a second robot provided among the first detacher, the second detacher, the reverser and the unloader so as to transfer the liquid crystal panel and the first and second auxiliary substrates, of which processes are finished in each processing apparatus, to a subsequent process while moving among the first detacher, the second detacher, the reverser and the unloader.

56. The processing line of claim 55, wherein the test line comprises:

first and second cassettes configured to respectively keep the first and second auxiliary substrates and the liquid crystal panel, transferred through a third robot; and second and third testers configured to respectively test the first and second auxiliary substrates and the liquid crystal panel, kept in the first and second cassettes.

57. The processing line of claim 55, wherein the test line comprises:

first and second cassettes configured to respectively keep the first and second auxiliary substrates and the liquid crystal panel, transferred through third and fourth robots; and second and third testers configured to respectively test the first and second auxiliary substrates and the liquid crystal panel, kept in the first and second cassettes.

* * * * *